United States Patent [19]

Maxwell et al.

[11] Patent Number: 4,771,417
[45] Date of Patent: Sep. 13, 1988

[54] HIGH SPEED MODEM

[75] Inventors: Ronald K. Maxwell, Palo Alto; Karl J. Zorzi, Pleasanton; Harunori Yoshikawa, Cupertino; Venkat Prasad, San Jose, all of Calif.; Fred G. Smith, Longwood, Fla.

[73] Assignee: Racal Data Communications, Inc., Milpitas, Calif.

[21] Appl. No.: 909,012

[22] Filed: Sep. 18, 1986

[51] Int. Cl.$^4$ .................... H04B 3/12; H04J 15/00
[52] U.S. Cl. .................................... 370/31; 375/8
[58] Field of Search .................. 370/35, 32, 110.1; 375/8

[56] References Cited

U.S. PATENT DOCUMENTS

| | | | |
|---|---|---|---|
| 4,438,511 | 3/1984 | Baran | 370/60 |
| 4,481,622 | 11/1984 | Cheng et al. | 370/32 |
| 4,653,044 | 3/1987 | Kudo | 370/31 |

OTHER PUBLICATIONS

CCITT Recommendation T.30.
LSI 24/24 Data Modem User Manual, Dec. 1979, Codex Corporation.

Primary Examiner—Douglas W. Olms
Assistant Examiner—Frank M. Scutch, III
Attorney, Agent, or Firm—Arnold, White & Durkee

[57] ABSTRACT

A modem is disclosed having a data transmission protocol involving lower-speed, full-duplex operation during the connect sequence with a remote modem and an automatic switch to higher-speed, half-duplex operation for data transfer. Further, the modem data transmission involves transparently changing between lower-speed, interactive operation and higher-speed operation based upon transmission demands. The operation is controlled by a processor monitoring the contents of a transmit data buffer and providing a mode control command to the modem transmitter. The modem also adapts its speed to the quality of the telephone line by fallback or fallforward to a different speed based upon predetermined data frame retransmission criteria.

9 Claims, 69 Drawing Sheets

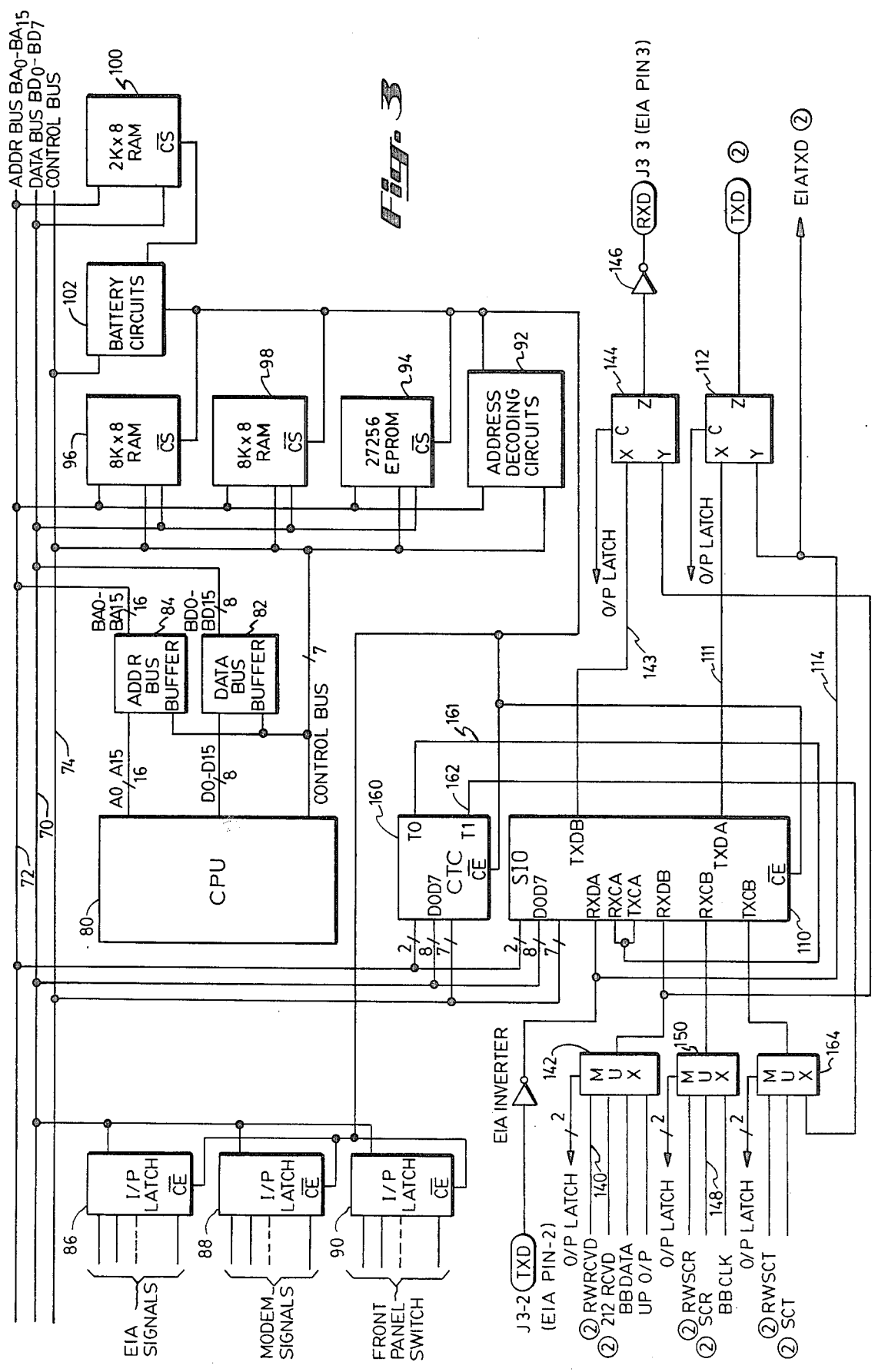

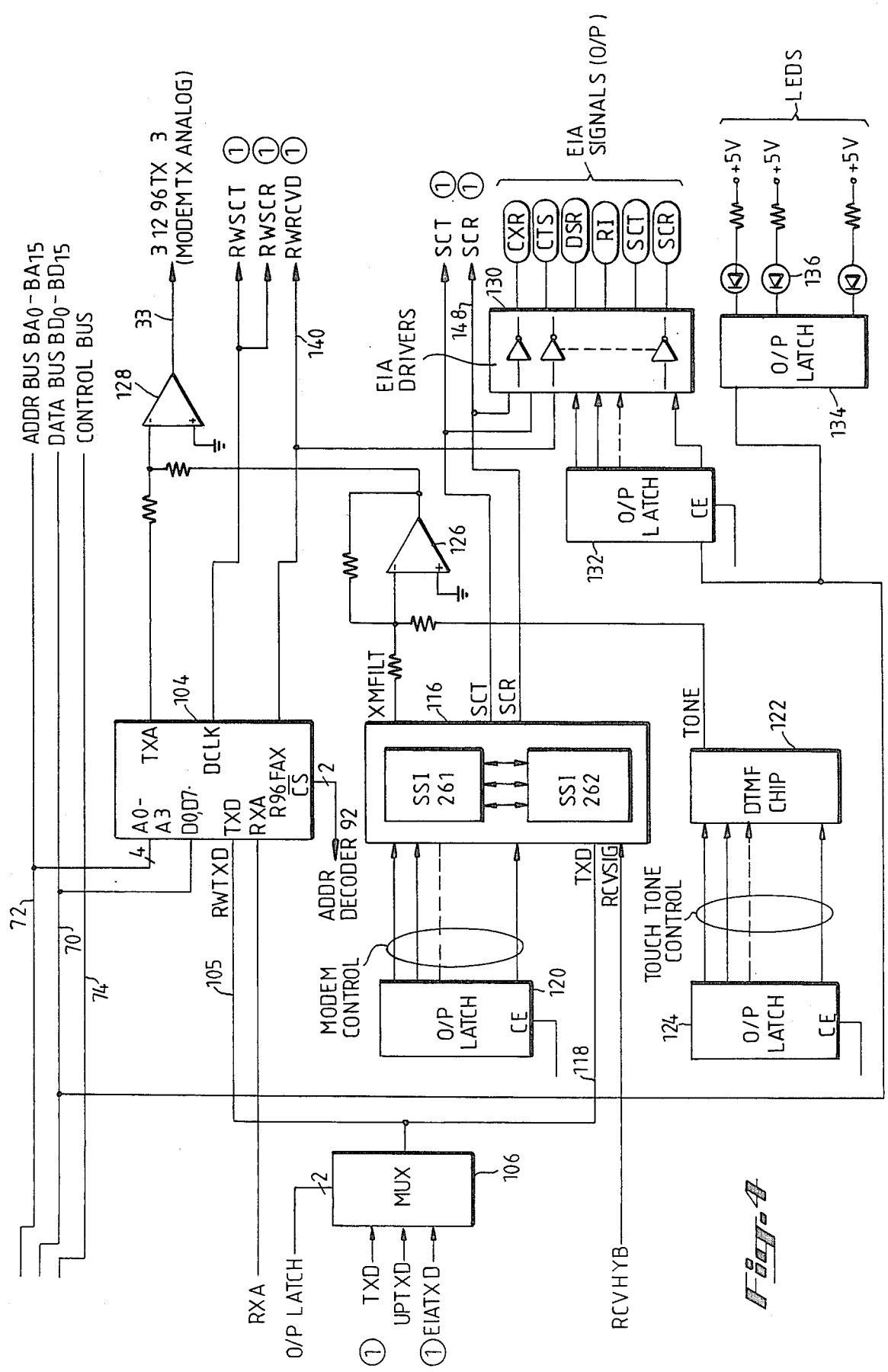

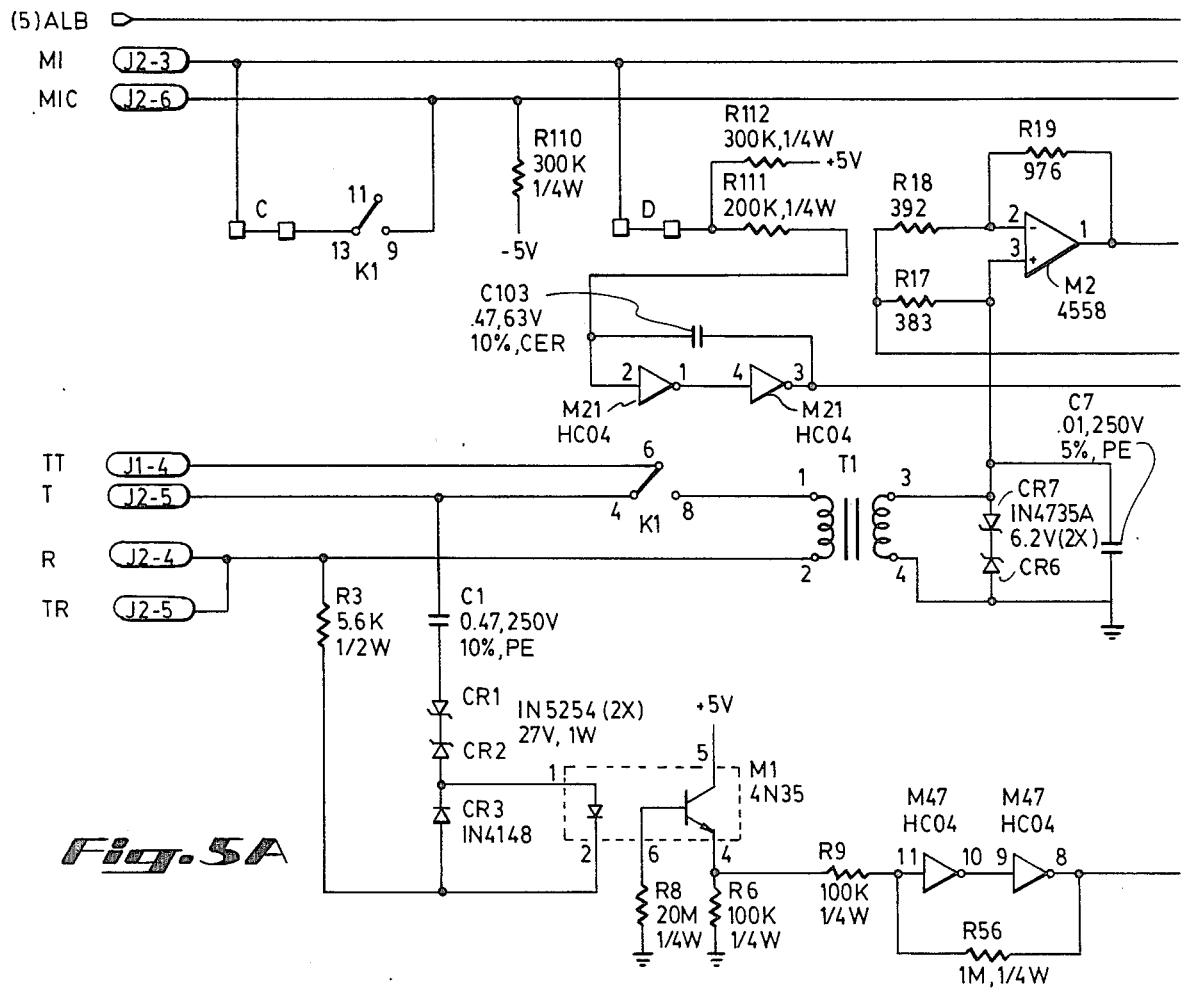
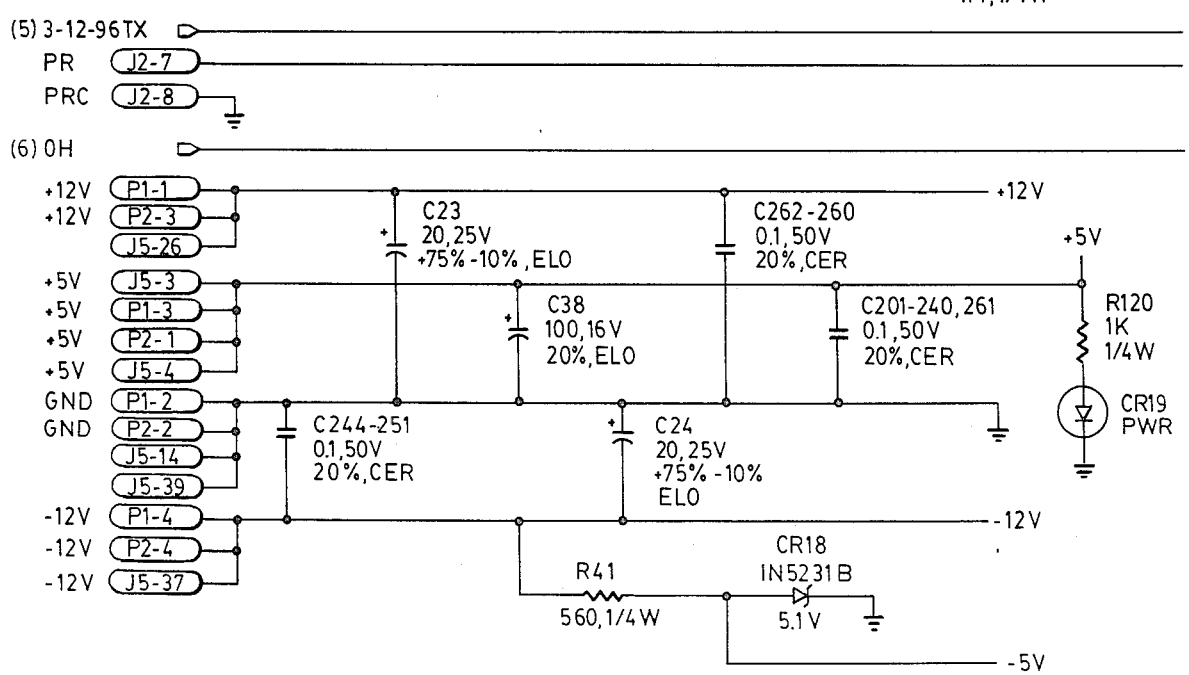
Fig. 5A

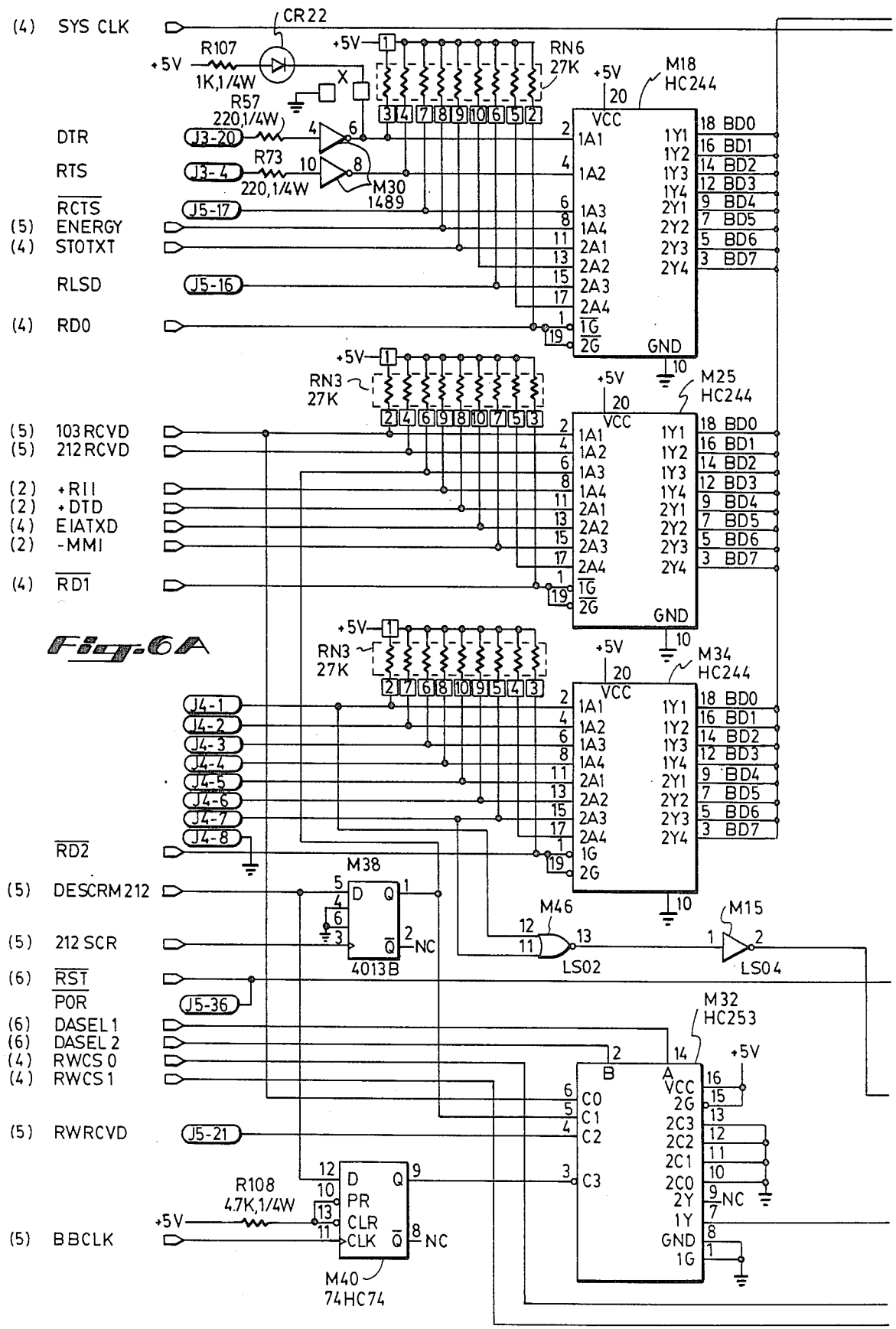

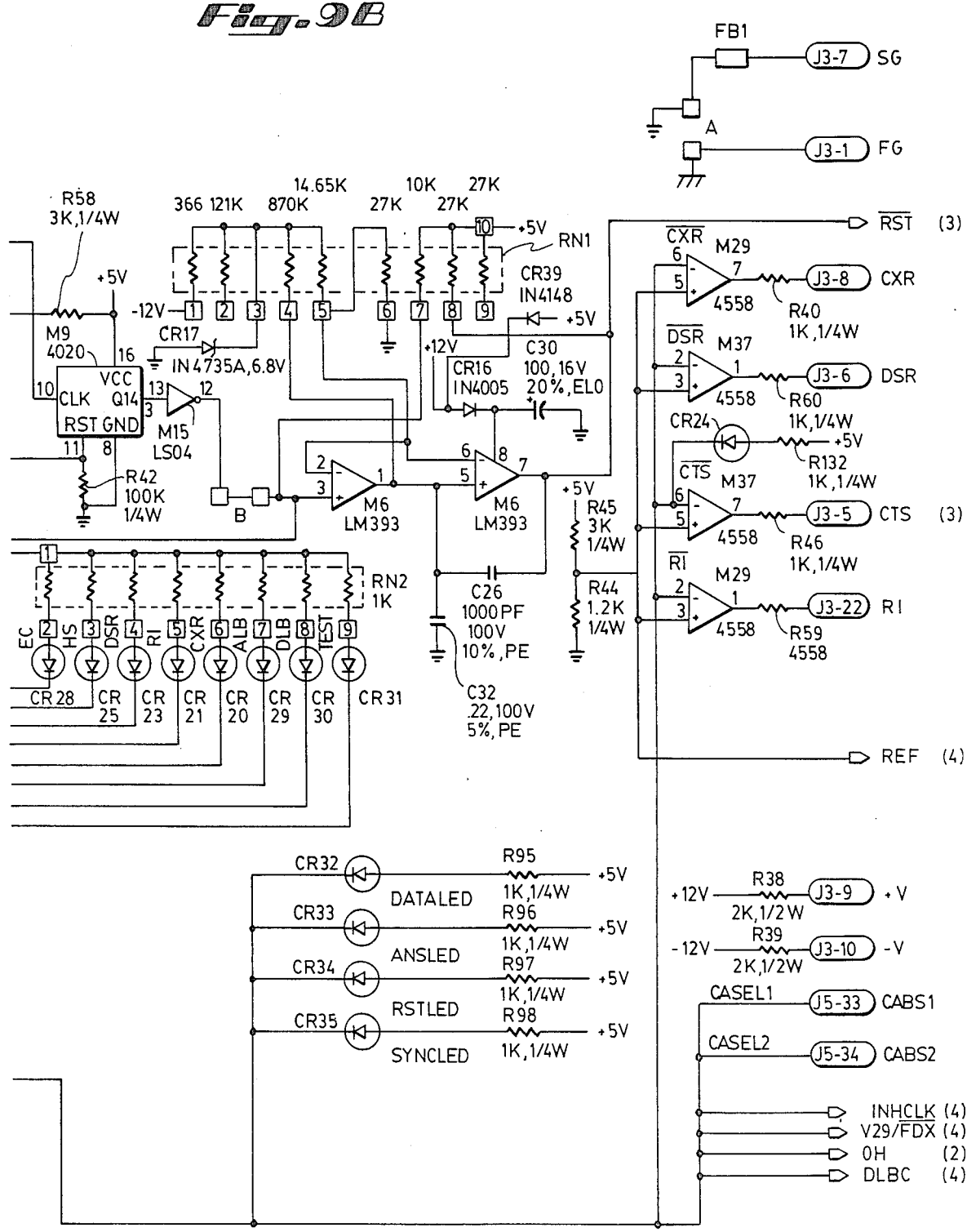

9600vp OBJECT CODE

Fig. 13-1

```
:03000000F3186D85
:0200080018FEE0
:0200100018FED8
:0200180018FED0
:0200200018FEC8
:0200280018FEC0
:0200300018FEB8
:0200380018FEB0
:0200660018FE82
:10007000F32100A0AF771101A001FF3FEDB031FFE8
:10008000DFCDE937CD2A0DCD3C0DCD340DCD3C0D66
:06009000CD2A0DCD3C0D50
:10009600CD340DAF2F32A8DBCDBA38CDA536CD86FF
:0B00A6003721769CCB96CB4E2803CD73
:1000B100CD0BCDCE013A739CB72003CDCF73CD6C60
:0C00C10077F331FFDFCD9B37CDB837114E
:1000CD005721CDD638CD0B0DCD5111CDAD0121CA56
:0E00DD00DBCBDEF33E0132C2DB3EDDED471130
:1000EB003E1CCDCD38117B23CDEA3811B122CDDCAE
:0200FB003811BA
:1000FD004B26CDE338ED5E3EB9D3223A32DB320DDD
:07010D00DBAF32A6DB2F324D
:10011400A8DB2FF64032A7DBCD9D0BFBCDBA38CD43
:06012400833ACDB83ACD8C
:10012A00CF0ECD1439CD2D0ECD440ECD6B0ECD870D
:0B013A0001CDBC013A739CB720DC2112
:10014500ABDBCB46CB86C44D76CD670118CDCDBA9A
:10015500383A008CCB4728F6210C9FCB86C3001A72
:0601650018EC3A008C4783
:10016B003AA6DBA8E601280CCB402809AF3214DBFA
:10017B007832A6DBC93E18CD483A18F43A739CB7CF
:06018B00281F3A008D4719
:100191003AA7DB4FA8E64028127832A7DBCB7028BC
:1001A1000A21C6DBCBEE3333C3DD04C93A769CCBDF
:0601B100472004CDF60C0E
:1001B700C9CDEF0CC921769CCB4EC8CB56C8CDCD47
:0D01C7000B3AC2DBC3B03E3E23CD523A21BD
:1001D400ADDB360AC921ADDB35CAE8013E23CD5279
:0A01E4003AC3703921769CCBD6C3D4
:1001EE0070393A3CDBFE01CA00023A709CFE10C226
:0901FE000004CD6A0DCD760BCD95
:10020700B811F3CD0B0EFB21CEDBCB96CBE6CBDEC5
:1002170023CB86CD7F0CCD530CCDFD0CCD420C3EB0
:06022700B9D3223E18CD00
:10022D006B383E0ACD7C383E36CD8A383E03CD98AC
:0F023D0038CDDD0BCDEB0B3A3CDBFE01204F2122
:10024C00CBDBCB6EC27302CDBA38CD6D0AD2CE02E7
:0A025C00CDBE0AD20603CD2B0BD253
:100266003D0421C5DBCB46CADA04C353023A709C6F
```

Fig. 13-2

```
:09027600FE01C29502CDBA38CD9B
:10027F006D0AD2CE0221769CCB4E20F021C5DBCB6E
:0F028F0046CADA0418E6FE08C2B402CDBA38CD6A
:10029E00BE0AD2060321769CCB4E20F021C5DBCBC5
:0D02AE0046CADA0418E6CDBA38CD2B0BD2C3
:1002BB003D0421769CCB4E20F021C5DBCB46CADA20
:1002CB000418E621CEDBCBCECB9ECDF30BCDFB0BB7
:0302DB003E78CD9D
:1002DE007C38CDBA3821C5DBCB4EC2E302CDEF0C54
:1002EE003E1932C0DBC3A3063E57D3203E12D320A5
:0302FE003E01328C
:10030100759CC3A306CDF30B21CEDBCB9ECBC6CD13
:0C031100FB0B3A3CDBFE01C23204F3118E
:10031D00FA26CDE338FBCD8D0B3A739CB7CAEA03B1
:09032D0021CBDBCB6EC279033A4F
:1003360037DBFE05CACD03FE04CACD033A40DBFE19
:1003460002C2790321C0DBCBF63E57D3203E12D33F
:04035600203E013212
:10035A00759CCD3809CD6C09CD880DCDDB0D21C03A
:0A036A00DBCB76CA8903CD8D0BCDE5
:10037400C545C38C033E57D3203E90D3203E013263
:10038400759CC35C03CD950B3E99CD7C3821C5DBB0
:03039400CB4EC28B
:100397009103CDCF0CCD330CCD6F0C21C0DBCBAE91
:0D03A700CBDE21CEDBCB863A3CDBFE01C273
:1003B400C603CBA6F3113E1CCDCD38FBCD330CC305
:1003C400A107CBE6CDD90C18EB01ED27CD7D25CDCA
:1003D400A80E3A759CFE08CA4203011328CD89254C
:0703E400CDA80EC342032166
:1003EB00C0DBCBDECDF1693A759CFE08CA4203CD6A
:0903FB007079C34203CDB811CDA5
:100404007F0CCDFD0CCD1211CD2211CD1211CDF3E7
:0A0414000B3E0DCD7C38CDBA382127
:10041E00C5DBCB4E20F9CD530CCD371121C0DBCB34
:0D042E00AEC30808CDDF103E0832C0DBC3AE
:10043B008C03CD550B21CEDB36002336003A739C53
:0F044B00B7CAB3043ACBDBCB6FCA7D043E103285
:10045A00759CCDB40921C0DBCBAECDD90CCD330C04
:0A046A003E1ACD3E3AF311B91FCD42
:10047400DC38CDDB0DFBC39807F311FA26CDE33846
:10048400CD8D0BFB3A37DBFE052807FE042803C39A
:100494005C0401FA27CD7D25CDA80E3A759CFE108B
:0704A400CA5C04011328CD1E
:1004AB008925CDA80EC35C04F311FA26CDE338CD14
:0904BB008D0BFB21C0DBCBCECD83
:1004C400F169CDA80E3A759CFE10CA5C04CD707912
:0704D400CDA80EC35C04C3B8
:1004DB00001A3A3CDBFE0128083A709CFE10C2DA87
:0804EB0007CD6A0DCD760B3A36
:1004F300C6DBCB6FCA0105F3CD0B0ECD387DCDB86E
:1005030011FBCD7F0CCD530CCDFD0C3EB9D3223E58
```

Fig. 13-3

```
:0205130018CD01
:100515006B38CDBA3821008CCB5EC2340521769C70
:10052500CB4E20EE21C5DBCB46CADA04C317053E08
:020535005ACD9D
:100537007C38CDBA383A008CCB5F28D43A008DCBC3
:100547004728CD21C5DBCB4EC239053A31DBFE0446
:060557002803CD420C3A1E
:10055D003CDBFE01C210093A739CB728083AC6DB92
:0B056D00CB57CA00093A759CFE10CA6B
:100578008906FE08CA3106CD0B0C21CEDBCBCECBCB
:10058800E6CB9623CB86CDFB0B3E02CD98383E0AB0
:04059800CD7C38CD11
:10059C00BA38CD6D0AD28C0621C5DBCB5ECAB40548
:0905AC00CB46C29B05C3DA042111
:1005B500CEDBCBC6CB8E3AC6DBCB6FC21D063A3E31
:0E05C500DBFE01C21D063EC8CD98383E36CD85
:1005D3008A38CD6D0AD28C06CDBE0AD2B906CDBA01
:0C05E3003821C5DBCB46CADA04CB5EC26F
:1005EF00D50521CEDBCB86CBE6CD550BCD4D0BCD37
:0E05FF00030CCDEB0B3E1ECD7C38CDBA38CDB3
:10060D00090BD2930821C5DBCB46C20906C3DA0418
:0A061D00CDBA38CD6D0AD28C06214B
:10062700C5DBCB46C21D06C3DA04CDA50B21CEDB45
:10063700CBC6CBE6CB9623CB86CDFB0B3E36CD8AFE
:02064700383A3F
:10064900C6DBCB6FC276063A3EDBFE01C276063EBA
:0B065900C8CD9838CDBA38CDBE0AD20B
:10066400B90621C5DBCB46CADA04CB5EC25D06C33C
:0C067400F105CDBA38CDBE0AD2B906217E
:10068000C5DBCB4620F0C3DA04C3F1053E3932C0E6
:0D069000DBCDF60C3E99CD7C38CDBA38217B
:10069D00C5DBCB4E20F921CEDBCB86CB8ECD1E0913
:0D06AD00CD150CCD250CCDC50CC398072133
:1006BA00C6DBCB963A41DBFE03CACF06C3CF06CDD3
:0C06CA00AA09C39807F33A3CDBFE01C20A
:1006D6008D0721C6DBCB6EC25907FBCD330CCDCFC0
:0906E6000C3A739CB7C2F806211E
:1006EF00C0DBCBDECDF169180901ED27CD8925CD12
:0806FF00A80E3A759CFE08CA22
:100707003 7073A739CB7C21A0721C0DBCBDECD701F
:07071700791809011328CD38
:10071E008925CDA80E3A40DBFE02C259073A759CD8
:0A072E00FE10282721C0DBCBF621C6
:10073800CEDBCBA6CD3809CD6C09CD880DCDDB0D30
:0C07480021C0DBCB76CA6907CD8D0BCD3C
:10075400C545C36C073E57D3203E90D320FB3E08CB
:10076400327 59C18CECD950B21C0DBCBEE113E1C0F
:01077400CDB7
:10077500CD38FBCD330CCDF60C3E0FCD3E3AC3A1A3
:10078500007000105 03C0056021C0DBCBDECDDF100E
:04079500C36C07CD5D
```

*Fig. 13-4*

```
:10079900BE0E113E1CCDCD383A008C32A6DB3A0094
:0A07A9008E32A8DB3E013228DB216E
:1007B300D0DBCBC6210EDB36003AC2DBE614CBD747
:0807C30032C2DBAF3226DB3A43
:1007CB00C0DBCB47C22A46CB77C22A46C3191221BC
:0A07DB00CBDBCB462056CDB811CD84
:1007E5007F0CCDFD0CCD1211CD2211CD1211CDF303
:0A07F5000BCDBA383E0DCD7C382143
:1007FF00C5DBCB4E20F9CD3711CD530CCD470DCDE9
:10080F00AD0D06143A709CFE01280B06113A47DB1A
:06081F00FE012802061292
:10082500783204803A0E80F608320E80CDE311C38B
:100835009807CDB811CDFD0C3E14CD6B383E5ACD81
:060845007C38CDBA383A00
:10084B00008CCB5F28F13A008DCB4728EACB4E28A2
:10085B0008CB46C24708C3DA04CDBA383E02CD7C7A
:05086B003821C5DB3A55
:10087000008CCB5F2807CB46CADA0418E7CDBA381C
:100880003A008CCB5F20DDCB46CADA04CB4E20ED9C
:06089000C3050821C6DBD0
:10089600CB96CB6EC2F808CD330CCDD90CCDF60C69
:1008A6003A739CB7200A21C0DBCBCECDF16918097B
:0108B6000140
:1008B700FA27CD8925CDA80E3A759CFE10CAE10806
:0808C7003A739CB7C2D8082166
:1008CF00C0DBCBCECD70791809011328CD8925CD8A
:0908DF00A80ECDB40911B91FCD1A
:1008E800DC38CDDB0DCD330C3E19CD3E3AC398072D
:0908F8003E1032759CC3E1083A80
:10090100709CFE08CA3106FE01CA7F05C389063AFA
:0E091100709CFE10CA3106C31B09C30000CD46
:10091F00580DCD610DCD8D0B21CEDBCBEECBA6C906
:10092F00180404011D03C10564F3212F090E0306EA
:06093F0009EDB3CD6A0DC5
:10094500CD780D11981FCDFF3811B11FCD0D393A56
:07095500C0DBF618E67C325E
:10095C00C0DB11B91FCDDC3811491CCDF838FBC9EF
:0B096C0006093A38DBFE01202178323A
:10097700D1DB3EFF32E0DB32E1DB32D7DBAF32D80F
:02098700DB3261
:10098900DBDB3EE732DADB3EEF32DFDBC9FE02C2F8
:100999009E090418D7FE03C2A6090518CF05051834
:0609A900CBC91804440153
:1009AF001C03C10560F3CD710DCD7F0D3E07D32123
:1009BF003E48D32121AB090E030609EDB33E1C328D
:0509CF00E6DB3EC13231
:1009D400E7DB3E6032E8DB11981FCDFF3811B11F11
:0409E400CD0D393AC2
:1009E800C6DBCB6F203C3ACBDBCB6F20353AA0DBA4
:0E09F800CB57CA530A3A759CFE10C2220A3A27
:100A0600A2DBF62032A2DB32008E3AA1DBF60132FF
```

Fig. 13-5

```
:0D0A1600008D32A1DB3E3232C0DBFBC93A5D
:100A230040DBFE02CA3A0A3E1032759C3E07D320D1
:100A33003E48D320C3050ACD8D0B3E7232C0DBCDB9
:100A4300C545CD6C09118E20CDF838CD7D0BFBC982
:100A53003A40DBFE0220D03E57D3203E12D3203E45
:020A630001325E
:100A6500759CC33A0AC3001A373A008CCB5FCA8813
:100A75000A3A008DCB57C2880A3AC5DBCB4FCA99D3
:060A85000A37C93E0ACD4C
:100A8B007C383AA0DBCB572803CD9B0A37C9B7C9B3
:100A9B00C53AA1DBF62032A1DB32008D0100000E3E
:060AAB001010FE0D20FBFF
:100AB1003AA1DBE6DF32A1DB32008DC1C9373A0052
:100AC1008CCB5F28123A008DCB57280B3AC5DBCB74
:060AD10057281537C9B7D4
:100AD700C93E36CD8A383AA0DBCB572803CD9B0ACF
:100AE70037C93ADCDBFEFF20E63ADDDBFEFF20DF1D
:010AF7003AC4
:100AF800DEDBFEFF20D8C3D80A3E0032DCDBC3D8D9
:100B08000A373A008CCB5FCA240B3A008DCB47CA10
:060B1800240B3AC5DBCB03
:100B1E004FCA990A37C93E1ECD7C3837C9373A00BD
:100B2E008CCB5FCA460B3A008DCB47CA460B3AC5F3
:060B3E00DBCB5FCA990A3F
:100B440037C93E03CD983837C93AA0DBF680C3E4F1
:100B54000B3E05D3033AE8DBF68032E8DBD303C966
:050B64003E05D3033A39
:100B6900E8DBE67F18EF32A1DB32008DC9F31149CA
:0E0B79001CCDF8383E01D3033AE6DBF601321C
:100B8700E6DBD303FBC93AA2DBE6DFC3510D3AA28A
:0C0B9700DBF620C3510D3AA0DBF601C3D1
:100BA300E40B3AA0DBE6FEC3E40B3AA3DBF640C357
:0B0BB3003B0C3AA3DBE6BFC33B0C3A4F
:100BBE00A4DBE6BFC39C0C3AA4DBF640C39C0C3A04
:080BCE00A4DBE67FC39C0C3A96
:100BD600A4DBF680C39C0C3AA0DBF602E6FB32A04F
:0E0BE600DB32008CC93AA0DBE6F7C3E40B3A21
:100BF400A0DBF608C3E40B3AA0DBE6FDC3E40B3A42
:080C0400A0DBF602C3E40B3A89
:100C0C00A0DBE6FCF6C8C3E40B3AC1DBF601180521
:0A0C1C003AC1DBE6FE32C1DBC93A43
:100C2600C1DBF60218F53AC1DBE6FD18EECD970CEE
:0D0C36003AA3DBE6FD32A3DB32008FC93AA2
:100C430031DBFE0328F8CDA20C3AA3DBF60218E849
:100C5300CDA90C3AA3DBE6FE18DE3A30DBFE022018
:030C630001C9CDF7
:100C6600B00C3AA3DBF60118CC3AA3DBE6FBC33B98
:0A0C76000C3AA3DBF604C33B0C3A72
:100C8000A3DBF620C33B0C3A769CCB4F20083AA35B
:0D0C9000DBE6DFC33B0CC93AA4DBE6EF3224
:100C9D00A4DBD340C93AA4DBF61018F33AA4DBE683
```

Fig. 13-6

```
:100CAD00FB18EC3AA4DBF60418E53AA4DBE6F718DA
:020CBD00DE3A1D
:100CBF00A4DBF60818D73AA0DBF610E6DFC3E40B87
:100CCF003AA0DBF620E6EFC3E40B3AA0DBE6CFC396
:100CDF00E40B3AA3DBE6EF18AB3AA3DBF61018A44C
:0F0CEF003AA2DBE6EF185B3AA2DBF61018543A94
:100CFE00A2DBE6F7184D3AA2DBF60818463A709CCE
:100D0E00FE012004CDC50CC9FE082004CDCF0CC9B0
:050D1E00CDD90CC93A1B
:100D2300A4DBE6DFC39C0C3AA2DBF608E67FC351E3
:100D33000D3AA2DBF680C3510DC501000010FE0C75
:050D430020FBC1C93ACC
:100D4800A1DBE6E5F604C36F0B32A2DB32008EC9E5
:100D58003AA1DBF608E6EF18ED3AA1DBF602E6FB6E
:030D680018E43A52
:100D6B00A1DBF60618DD3AA1DBE6F918D63AA1DBD2
:100D7B00F61818CF3AA1DBF610E6F718C6F33E05C6
:060D8B00D3023AE5DBE6AD
:100D91007F32E5DBD3023E01D3023AE3DBF60132D7
:0D0DA100E3DBD302111C1FCDF138FBC93A72
:100DAE00A2DBE6FEC3510DCDB70C3AA3DBE6F7C3CB
:0B0DBE003B0C3AA1DBE6FEC36F0B3AD2
:100DC900A1DBF601C36F0BCDBE0C3AA3DBF608C35A
:0D0DD9003B0CF33E03D3023AE4DBF601329B
:100DE600E4DBD302FBC9F33E01D3023AE3DBE6FEC2
:100DF60032E3DBD3023E03D3023AE4DBE6FE32E41F
:060E0600DBD302FBC9F37F
:100E0C003E03D3023AE4DBE6FE32E4DBD3023E439C
:100E1C00D323FBC9F33E03D3033EC032E7DBD3033A
:060E2C00FB3A30DBFE0181
:100E3200C2390ECD560CC9FE022003C3350ECD5D5C
:100E42000CC93A31DBFE02C2500ECD360CC9FE038C
:060E52002003C34C0E3A20
:100E5800C2DBCB5F2004CD420CC93A31DBFE04284B
:100E6800E318F3E5C53A739CB720093A3CDBFE0169
:050E7800282218293AB0
:100E7D0043DBFE01201F21008CCB4E20183AA3DB53
:100E8D00CB572814060A10FE21008CCB4E2006CD20
:060E9D006F0CC1E1C9CD9C
:100EA300770CC1E1C9E521CADBCB4620FC3E0FCD5F
:100EB3007C3821C5DBCB4E20F9E1C93AC0DBCB47F7
:060EC3002809CD6859CD9D
:100EC9001667000000C921C7DBCB462013AF32C823
:100ED900DB3A008DCB5F2807CBC63E0CCD3E3AC925
:060EE9003A008DCB5F20F2
:100EEF009CB4E28F4CB8E2334C9CB4E20EBCBCE7F
:100EFF002334C93AC8DBFE103816CDB50D3E0DCDE3
:060F0F003E3A21739CCB69
:100F150046C21C0FCD4177C3483921C7DBCB86CBF1
:100F25008E233600C3483921C7DBCB562877CB96AD
:060F3500CB86233600CD3F
```

Fig. 13-7

```
:100F3B00D00D3A44DBFE02CA4C0F3A008CCB472053
:100F4B009C21739CCB46C25F0F21139FCB46C26D76
:020F5B000FC3C2
:100F5D00E80E3AA2DBCB6720823A32DBFE01202C71
:100F6D003A008DCB5F20F9F3CD7F0C11681BCDCDF1
:060F7D00383EB9D3223E0C
:100F830043D323FB3E02CD6B3821C5DBCB4620F98F
:100F9300F33333C3F001FE02CAE80E210DDB35C281
:050FA300B40F3603C38A
:100FA8006D0FCBD63E0DCD3E3AC348393E21CD3EDE
:0A0FB8003A3E0832ADDBC3E80E3A02
:100FC200ADDB3D200E3A32DB320DDB210000360074
:090FD200C3483932ADDB3E21CDEC
:100FDB003E3AC348393A3CDBFE01206BF3CDAE10F1
:0F0FEB0033333A3CDBFE01200D3A709CFE08C206
:100FFA005B103E3832C0DBCD760B21CEDBCB96CBF5
:10100A00C623CB86CD9D0BCDFB0BCD950BCD6C09A5
:01101A003A9B
:10101B003CDBFE012029CD3809CD880DCDDB0D3E03
:10102B0057D3203E90D3203E0832759CF3113E1CC3
:05103B00CDCD38FBCD16
:10104000330C3E0FCD3E3AC3A1073E2832C0DBC36E
:0E1050008D073A709CFE10CAE70FC9FE10C251
:10105E008010F3CDAE10CD950BCD710DCD2A0ACDEE
:10106E00DB0DCD330CCD030CCD9D0BCDEB0BFBC3AC
:10107E009807F3CDAE10CDA50B3E0132759C3E57B1
:10108E00D3203E12D320CD8D0BCDDB0D3E3032C0A2
:05109E00DBCD330CCD99
:1010A3006F0C3E2032C4DBFBC39807CD0B0E21C26D
:0C10B300DBCBE621C4DBCBC6CD7F0CCD2F
:1010BF00530CCD220DCDFD0C11B91FCDDC38C9CD90
:0B10CF00AD0BCDBD0B21C2DBCBE62139
:1010DA00C4DBCBDEC921CEDBCBE6CD6C09CD950BCB
:0D10EA00CD610DCD580DCDAD0DCDC00DCD9E
:1010F700EC0D0E030607218607EDB33E6032E8DBF1
:101107003EC032E7DB3E0532E6DBC9CDBA383E02E8
:01111700CD0A
:101118006B3821C5DBCB4620F9C9CDDD0BCDC00D21
:0C1128003AA0DBCBFF32A0DB32008CCD04
:10113400EB0BC921C0DB36243A709CFE082002CB9D
:0E1144009C6C9AF321ADBC93E17CD663AC93ADA
:101152003CDBFE0128123E0132AFDBCDE10CCD0BB0
:0D1162000ECDEC0DCD7211C9AF32AFDBCD5B
:10116F00E80CC9F5C53A3CDBFE0128353A709CFE08
:10117F0010283106143A709CFE01280B06113A47CD
:06118F00DBFE0128020650
:101195001278320480 3A0580E6BF3205803A0E8027
:1011A500F608320E80CD470DCDAD0DC1F1C9CD5834
:0511B5000D18F5F31117
:1011BA00681BCDCD383E0232C2DBCDA50BCD030C68
:1011CA00FBC9C54F06007F7F10FC0D20F9C1C9E598
```

Fig. 13-8

```
:0611DA0021CADBCB462018
:1011E000F9E1C93A48DBFE022810F53E1FCD663A08
:1011F000F1FE0320063E0A32ADDBC9FE0420043EA8
:061200001418F43E1E1854
:10120600F03A48DBFE0228EC3E20CD663A3E283214
:03121600ADDBC984
:10121900CDBA383A008C473AA6DB4F7832A6DBA91B
:0A122900E64FCA58123220DBDD2127
:1012330020DBDDCB0076C4D813DDCB005EC47D1488
:10124300DDCB0056C41E15DDCB004EC46C15DDCBC3
:061253000046C42816CD80
:101259008815CD13143AC0DBCB47C27812CB77CAB5
:0912690096122101D7C38F123A3D
:10127200C2DBCB67201E2101D7CB46C46116CB4E01
:10128200C4BE16CB56C41C17CB5EC46717CB7ECB2D
:05129200BEC2001A3A83
:10129700C3DBCB47CAB31221008CCB5ECAAE122187
:1012A700008DCB56C2B3123E08CD3E3ACD833ACD20
:0312B700B83ACD75
:1012BA00143921C0DBCB46C25046CB66CA8A1321F9
:1012CA00CFDBCB6EC21713CB5E281BCB4ECA3013B3
:0612DA00CB9ECB8ECB96EB
:1012E0002BCB96CDCE10CD770CCDFB0DAF3212DBD4
:0812F0003AC2DBCB6720393A5A
:1012F800DADBFE0530323EE732DADB3E0ACD3E3A33
:1013080021CEDBCBD623CBDECB8ECBD6C330133A64
:10131800EDDBFE05D2301321CEDBCB9ECBC623CB33
:1013280086CBAE3E13CD3E3A3AD0DBCB472840CBF6
:0613380087CB572816AF19
:10133E0032D0DB3A739CB7CAF8193A39DBFE01C2D8
:0B134E007713C3F819CB5F2806AF32FD
:10135900D0DB181ACB672816AF32D0DBC377133A24
:0C136900C0DBCB4F200821D0DBCBEECD49
:101375000C3DCD92133AC0DBCB47C25046CB77C26A
:0B1385005046C31912CB5EC2C912C350
:1013900019123AC4DBCB4FCAC0133A1ADBB7C2C02A
:0A13A000133AA4DBCB47CAC11321A6
:1013AA00CFDBCB76CAC0133E16CD663A3AA4DBE64B
:0813BA00FE32A4DBD340C93A66
:1013C2001ADBB720F921CFDBCBB63E16CD663A3A0F
:0D13D200A4DBF60118E3E53AC0DBCB67CAE7
:1013DF00021421A6DBCB76C200143AC2DBCB672006
:0C13EF001021C3DBCB4ECA0014CB8ECD06
:1013FB00470DCD150CE1C9CB5FC2001421ACDBCB83
:10140B00CE3E1CCD483A18EDE521C0DBCB6620E57E
:05141B00CB5E20E12181
:101420000584CB762028210EDB360021A6DBCB7687
:1014300020283AA3DBCB4F28C73A0580CB7F20C0BA
:06144000CD330CCD0712B4
:1C144600CD950BCD470D18B2210EDB343E1ABED218
:0F145600001436003AA3DBCB4F209FCD8D0BCD7A
```

Fig.13-9

```
:10146500420CCDE3113A4ADBFE01200A3E1DCD5266
:091475003A21ACDBCBD618833A16
:10147E00A6DBCB5FCACB14AF3218DB3AC0DBCB474F
:09148E00CA9F143AC2DBCB6FCAFD
:10149700A9143E08CD3E3AC9CB5FC2AA14CB4FC2AE
:1014A700C514C921C4DBCB5ECAC514CB9E21C2DBE0
:0314B700CBA6CDF4
:1014BA00B50BCDC50BCD6F0CCDDB0D21CFDBCB969C
:0714CA00C93AC0DBCB47CAA1
:1014D100F014CB5FC2E5143AC2DBCB6FC2E114C991
:0C14E100AF3212DB3E0ECD5C3A3E1932F9
:1014ED002BDBC93AC0DBCB5FC2FE14CB4FC2061556
:0A14FD00C93AC4DBCB5FC21615210B
:10150700CFDBCBD63E0ECD5C3A3E01322BDBC93E5C
:0E15170015CD3E3AC30615E521C0DBCB46CA12
:101525003F1521A6DBCB56C23A15CD470DCD250C6F
:10153500E1C9CD770CCD2C0CE1C9CB6620FACB5E89
:01154500C2E3
:101546003D153AA6DBCB57C25E153A008CCB4F2031
:10155600E63E1ECD3E3A18DFCD770C3AC0DBCB6FA8
:04156600C23D15C3AA
:10156A003D15E521C0DBCB66CA7715E1C9CB5EC262
:10157A0075153E1BCD3E3A21ACDBCBC618EDE521F5
:10158A00C0DBCB662048CB5E204421ACDBCB4620B7
:10159A00DA3AA6DBCB4FC218163A0580CB7FC27562
:0615AA0015CB56C27515B9
:1015B0003A008CCB7728BE3A0580473A4ADBFE01D9
:1015C000782804F6801802F684E6BF3205803A0EC9
:0615D00080F608320E80D7
:1015D600189D3A43DBFE01209621C4DBCB5E202F0B
:1015E600CB56202B21C0DBCB462017CB7620133AD7
:0615F600A6DBCB4F20062E
:1015FC00CD6F0CC37515CD770CC375153A3FDBFE5B
:10160C00032806FE04280218E0C375153A0580CBA2
:06161C007FCA7515E67F90
:101622003205803C375153AA6DBCB47C23516AF32F9
:0D16320018DBC9CD4216D83E10CD5C3A320F
:10163F0026DBC93A44DBFE02281021C0DBCB46284B
:10164F000B3A3FDBFE042802AFC937C9CB7620F136
:06165F0018F6F3CB86E54E
:10166500CD1C0CCD2C0CCD550B21CEDBCBAEFB3AD6
:0816750028DBB7CA8516AF326D
:10167D0028DBCD6F0CCD330CCD030C21C0DBCB9E05
:10168D003E03CD3E3AE1C93E143204803A0E80F657
:05169D0008320E803A46
:1016A2000580F680320580C348393E12C396163E45
:1016B20011C396163E09C39616C34839F3CB8EE57D
:0616C200CD1C0CCD2C0C28
:1016C800CD550B21CEDBCBAEFBCD030C3E0BCD3E77
:0716D8003A3AC0DBCB9F3260
:1016DF00C0DB3A28DBB72807AFCD330CCD6F0CE159
```

*Fig. 13-10*

```
:1016EF00C93E143204803A0E80F608320E80CD4780
:0516FF000DC348393A5B
:101704000D84F620320D843E12C3F2163E11C3F24C
:10171400163E0918D9C34839F3CB96E5CD1C0CCD38
:061724002C0CFB3A0580CD
:10172A00E67F320580CD030C3E06CD3E3A3AC3DB56
:0B173A00E6FE32C3DBE1C9CDFB0B2152
:101745000CEDBCBC6CBE6CD640B3AC2DBF66032C24C
:07175500DB3AC3DBF60132B1
:10175C00C3DBCD580DCD610DC34839F3CB9EE5CD20
:06176C001C0CCD2C0CCD7D
:10177200640B21CEDBCBC6CBE6FBCD030C3A058056
:0E178200E67F3205803AC2DBF62032C2DB3A47
:10179000C3DBF60132C3DBE1C9AF3222DB2F3223D8
:0917A000DB3A008E2F3221DBC37D
:1017A90034393A008E2FB7C2BE17AF3222DB2F323F
:0B17B900A8DBC334393E02CD343AC334
:1017C4004839FD2170D6FDCB1766C29416FDCB17A0
:0917D4005EC2AC16FDCB1756C233
:1017DD00B116C3B616E521008CCB56C2F517E1CD77
:0F17ED00470DCD250CC34839C3F517C34117C3AA
:1017FC005C39F33AC2DBCB77C21518CDFB0B3E0933
:0A180C00CD483ACD150CC32418CDC9
:10181600150CCD250C21CEDBCBEECB86CBA63AC262
:07182600DBE69F32C2DB3A52
:10182D00C0DBF60832C0DB3AC3DBE6FE32C3DBCDEC
:03183D00580DCD76
:10184000610DFBC34839F3CD250C21CEDBCB86CB14
:10185000EECBA6FBC35C3921CEDBCB9623CB9ECB54
:021860008ECD2B
:10186200770CCDCE10C3483921C3DBCBCEFD21701E
:06187200D6FDCB1766C293
:10187800F016FDCB175EC20317FDCB1756C2101723
:09188800C315173AC4DBCB47C2BB
:1018910084393A2BDB3DC2A4183E093209D7210015
:0918A1001AE3C9322BDB3E0ECD27
:1018AA005C3AC3843921CEDBCB86CD6F0CC3483971
:0A18BA00AF3226DB3A008CCB47CAA0
:1018C40084393AC0DBCB47200521001AE3C921C182
:0F18D400DBCBD6C921D0DBCBC6CB8EC37039217D
:1018E300CEDBCB9E23CB86CB96CD6F0CCDC50BC366
:0E18F300483921CEDBCB8623CB96C33E19218C
:10190100D0DBCB6E2837CBAEF32A18DDE511FA26F2
:0B191100CDE338CD8D0BFB013C29CD50
:10191C007D2521CADBCB4620F906000E1E10FE0DDC
:10192C0020FBF3E12218DD3AC0DBCB77C23E19CDA8
:04193C00950BFBCD3F
:101940006F0CCDBD0B21C4DBCBE621C2DBCBE6C3E4
:061950004839CD6F0CCDFB
:10195600FB0BC348393A008CCB5FC26619C34839C2
:10196600AF3218DBC3AA14C9C39839AF3202803E1E
```

```
:06197600103203803E80E8
:10197C003204803A0E80F608320E803A0580F680EA
:10198C00320580C3983921ABDBCBC6C35C39CD6F34
:05199C000CC34839CD29
:1019A1006F0CC348393AACDBCB8732ACDBC3483967
:0119B1003AFB
:1019B200ACDBCB8F32ACDBC35C393AACDBCB9732DE
:0319C200ACDBC3D8
:1019C5007039CD950BCD6F0CC348393AADDB3D2051
:0719D5000521001AE5C932EB
:1019DC00ADDB3E1FCD663AC93AADDB3D200521009B
:0E19EC001AE5C932ADDB3E20CD663AC9F33AAA
:1019FA00739CB7CA1E1BF321ABDBCB4ECB8EC21E28
:0C1A0A001B21C3DBCBFE21C2DBCBFE3A6C
:101A1600A0DBF6CEE6FE32A0DB32008C3E0A32A117
:101A2600DB32008D3AA2DBF608E6DF32A2DB3200BB
:021A36008E3AE6
:101A380043DBFE012803CD770C3AA3DBF608E69FCB
:0B1A4800473A769CCB4FC2121B78324D
:101A5300A3DB32008F3AA4DBF6FF473A769CCB4FE9
:0A1A6300C2181B7832A4DBD340CD7B
:101A6D001138F311FA26CDE338FBCDD9113E28CD2F
:091A7D00CC113A739CB72005CD91
:101A86005879181621C0DBCB462809CD3E7DCD59A5
:081A96007DCD077C01F528CD90
:101A9E007D25CDD9113E64CDCC11CD420CCD5D0C42
:041AAE00CD0B0E3A14
:101AB2003IDBFE0228083A30DBFE01C2C91A060BEE
:101AC2003EFACDCC1110F9F321C0DB0630360023EB
:061AD20010FB2100A0360C
:101AD800001101A0012F3BEDB021C0DB360011C180
:101AE800DB013F01EDB0AF32AADB32ABDB32ACDB5E
:061AF80032ADDB32AEDB73
:101AFE003A739CB72803CDA53621CADBCBDEC3C211
:0E1B0E0000C3000078F620C3521A78E67FC3A9
:101B1C00671A11FA26CDE338CD8D0B21C2DBCBFE33
:061B2C003E28CDCC112182
:101B3200CADBCBDEFBCD78733E28CDCC1121CEDBC8
:081B4200CBC63AA0DBF68032AD
:101B4A00A0DB32008C117B23CDEA3811B122CDDC27
:071B5A003821C2DBCBFE21A4
:101B61000C9FCBC6C353010008D921C5DB5E210000
:101B7100DBCB43CA881B35C2881B36C82335C288D4
:051B81001BCB837B3249
:101B8600C5DBCB4BCA9A1B2102DB35C29A1BCB8B1A
:0A1B96007B32C5DBCB53CAAC1B2128
:101BA00003DB35C2AC1BCB937B32C5DBCB5BCAC539
:101BB0001B2104DB35C2C51B360A2335C2C51BCB2E
:031BC0009B7B32DA
:101BC300C5DBCB63CADE1B2106DB35C2DE1B360455
:0C1BD3002335C2DE1BCBA37B32C5DB3AFE
```

```
:101BDF0044DBFE02CA081C3A26DBB7CA0D1C3A27A3
:061BEF00DB3D3227DBC2E2
:101BF500081C3E0A3227DB3A008CCB47C2221CAFB9
:101C05003226DBD908FBED4D3A008CCB47CA1F1CA9
:061C15003E013226DB3E19
:101C1B000A3227DBC3081C3E003226DB3A739CB723
:0B1C2B0028DB3AC3DBCB7FC2081C2182
:101C36006A0AE3D908FBED4D00083E0132C9DB080C
:101C4600FBED4D08D93E10D30321E2DBDB0347AEA3
:051C56007047200D3A6B
:101C5B00C0DBCB47C2EC5AD908FBED4DCB58C27455
:101C6B001CCB68C2D41DC35A1C21C4DBCB5E201E07
:011C7B002147
:101C7C00CEDBCB46C2A41CCB4E2019CB56C2011DC9
:101C8C00CB66C20D1DCB6EC2181DC3201D3ACDDB19
:061C9C00CB472004B7C392
:101CA200A51C373AD3DB1732D3DB3AD4DB1F32D44D
:021CB200DB3A1B
:101CB400D5DB1732D5DB21D4DBAE1FE6012BAE32E8
:071CC400D3DB1FDADA1C3A42
:101CCB00CEDBCB5FC2DA1C3AA0DBE67FC3DF1C3A6C
:0D1CDB00A0DBF68032008C32A0DBCB46C2CD
:101CE800F01C2B3600C36C1C2B34CB76CA6C1C360C
:101CF80000237EE6FE77C36C1C7EEE8077CB7FC226
:061D0800A41CC3A01C3A5C
:101D0E00008DCB6FC2A41CC3A01C3A008CCB67C342
:101D1E00121D3AC0DBCB77C29A1DCB76CA771D3A1D
:061D2E00D8DBB7C2451D21
:101D3400CBB63AD6DB32D7DB3AD1DB32D8DBC3A021
:021D44001C3A47
:101D4600D8DB3D32D8DBCA341DC3651D3AD9DBB7B3
:061D5600C2611D3E0732D0
:101D5C00D9DBC3341D3D32D9DB3AD8DB3D32D8DB7D
:021D6C00373A04
:101D6E00D7DB1F32D7DBC3A51C3AD8DBB7CA8D1D14
:061D7E00FE01C2651D3AE2
:101D8400D9DBB7CA651DC3611D3AEFDBCB47CAA4D3
:0B1D94001CCBCEC3A41C3AD8DBB7C2A6
:101D9F00681D2A1EDC7CB5CACE1D2B221EDC2A3AFA
:101DAF00DC7E32D7DB237DFE0020087CFEB62003CD
:041DBF002100A62237
:101DC3003ADC3AD1DB32D8DBC3A01C21CEDBC38D96
:071DD3001D3A008D1F1FDA0D
:101DDA00F01D21CFDBCBCE3EE732DADB3E0032AE5E
:0C1DEA00DB1819F1181621DADB35F521A1
:101DF600AEDB34CB76CAED1D360021DEDBCB86F1B9
:081E06003ADCDB1732DCDB3AA9
:101E0E00DDDB1F32DDDB3ADEDB1732DEDB21DDDB35
:061E1E00AE1F2BAE1F21D8
:101E2400CDDB360030013423CB6EC23B1ECB66CAF9
:101E3400591E23CB462027DA511E23CB56200E3AB7
```

Fig. 13-13

```
:051E4400A0DBE6BF3247
:101E4900008C32A0DBC35A1C3AA0DBF640C3481E03
:101E590023CB46C2621EC3871EDA6F1ECB7ECA7DA4
:041E69001ECBBEC30B
:101E6D00761ECB7EC27D1ECBFE21EDDB35C35A1C0B
:0E1E7D00CBF621EDDB36FFC35A1CDAE61E3A27
:101E8B00DBDBB7CA9B1E3D32DBDBC2AE1EC3C01E03
:0B1E9B003ADFDBCB5FC2A81E3EEF3237
:101EA600DFDB3AD1DB32DBDB3ADFDB21E0DBA677B7
:011EB6003AF1
:101EB700DFDB0732DFDBC35A1C3ACFDBCB67C2D786
:071EC7001ECBE732CFDB3A2E
:101ECE00DFDB0732DFDBC3A81E3E0032E1DB3ADB8D
:031EDE00DB3C32B8
:101EE100DBDBC3B61E3ADBDBB7C2FD1E3ADFDBCB61
:071EF1005FC25A1C3EEF32F4
:101EF800DFDBC3B61E3D32DBDBC2B61E3ACFDBCB1F
:051F0800A732CFDB3A17
:101F0D00DFDBCB5FC2B61E3EEF32DFDBC3B61E0892
:101F1D00D93E10D3023E38D30221A9DBDB0247AEF6
:061F2D007047CA681FCBDB
:101F33006FCA631F21DFDB373AE0DB1F32E0DB3A96
:041F4300E1DB1F328D
:101F4700E1DBDA6D1F3ACFDBCB57201A3AA0DBE68D
:0F1F5700BF32008C32A0DBCB5EC2741FCB78C2CE
:101F6600791FD908FBED4D3AA0DBF64018E4CB0EFD
:101F7600C3631F21A9DBCB7EC28E1F21EFDBCB867D
:011F86002139
:101F8700CEDBCB8EC3681FDB0021EFDBCBC6C3687C
:101F97001F08D9DB01473AC0DBCB77280B21C2DB0F
:031FA700CB7EC22C
:101FAA00AF1F78D30018B708D93E30D30318F60804
:101FBA00D9DB005721EFDBCB46C2012021C4DBCBA2
:061FCA006ECAD01FD30017
:101FD00032D6DB21CEDBCBF63E11CD523A3A739CA2
:101FE000B728673AD0DB5FCB4B2827CB8BCB43C2DC
:101FF00001207ACBBFFE04282AFE122833FE0928CE
:102000003CAF32D0DB21C0DBCB76C26845D908FBC0
:06201000ED4DCB4328EB6F
:10201600CB837ACBBF3229DBCBCB7B18DF3A29DBEC
:10202600FE03C20120CBD37B18D23A29DBFE0CC2B9
:062036000120CBDB7B184A
:10203C00C53A29DBFE12C20120CBE37B18B83AD09B
:10204C00DB5F3A62DD42CBB8B8C26F203AAADBB78D
:01205C00C2C1
:10205D007620CB43CA6F20CB833E0132AADB7BC3F4
:10206D000220AF32AADBC30220CB43C26F203C3229
:10207D00AADBFE03C20120AF32AADBCBD37BC302A6
:10208D002008D93E10D30321E2DBDB0347AE7047B6
:06209D00C24D21C35221D7
:1020A30021ECDB7EB72046360321C4DBCB4E284030
```

Fig. 13-14

```
:1020B30021CEDB3E80AE77CB7F20073AA0DBE67FE5
:0620C30018053AA0DBF64F
:1020C9008032A0DB32008C3A008DE6010F4721CF28
:1020D900DBAECB7F2002CBF6CB782007CBBED9086D
:0620E900FBED4DCBFE18DB
:1020EF00F73518F421D8DB7EB7281F35373AD7DB01
:1020FF001F32D7DB380D3AA0DBE67F32A0DB320090
:04210F008C18D53A19
:10211300A0DBF68018F12A1EDC3E00BD2005BC20A2
:102123000218EC2B221EDC2A3ADC7E32D7DB237D1D
:06213300FE0020087CFE06
:10213900B620032100A6223ADC3AD1DB32D8DB37BC
:0E2149003FC30321CB58C2A320D908FBED4DA4
:1021570008D93E97D3233E24D323116C21CDD638FB
:10216700D908FBED4D08D93A008DCB6FCA99213EAE
:062177000132EBDB3E57D4
:10217D00D3203E12D320AFCBFF3229DB3E07322CCA
:10218D00DB114722CDD638D908FBED4D11A221CD5B
:06219D00D638C3942108AE
:1021A300D93E97D3233E48D3233A008DCB6FCAC47D
:1021B300213E0232EBDB3E57D3203E24D320C383A0
:0521C3002111CA21C337
:1021C8009C2108D93E97D3233E98D3233A008DCB40
:1021D8006FCAEC213E0432EBDB3E57D3203E48D396
:0521E80020C38321115A
:1021ED00F221C39C2108D93EB7D3233E13D3233A02
:1021FD00008DCB6FCA14223E0832EBDB3E57D32045
:05220D003E90D320C348
:1022120083213EB7D3233E4AD323112222C39C21DA
:1022220008D93EB7D3233E4AD3233A008DCB6FCA97
:0522320044223E1032C1
:10223700EBDB3E17D3203E48D320C38321C3922232
:1022470008D9212CDB3A008D1717173A29DB1F32E3
:0422570029DB35C288
:10225B008D223A29DBE67FFE05C29D223E03D32366
:10226B0011E422CDDC383E01D3023AE3DBF61A321D
:06227B00E3DBD3023E0389
:10228100D3023AE4DBF60132E4DBD302D908FBEDF9
:102291004D3E03D32321C200E5FBED4DCB77280250
:0522A100CBAFFE41C2BD
:1022A60092223A29DBCD3B26C3672208D9DB0032CE
:1022B60029DBE67FFE05281ECB772802CBAFFE4141
:0622C60020173A29DBCDD0
:1022CC003B26211CDD11E422732372D908FBED4D52
:1022DC00C3CE22D908FBED4D08D9DB00322ADBE650
:0622EC007FF53A29DBE654
:1022F2007FCB772802CBAFFE41282EF1FE0D204C7A
:102302003AEBDB32759CAF3C32739C115E26CDDC1E
:052312003811FA26CD90
:10231700E338CD8423CDCC23D9083333E521F32308
:10232700E3FBED4DF1CB772802CBAFFE54202C21F8
```

Fig. 13-15

```
:05233700239FCB863A54
:10233C00EBDB32759C3A2ADBCD3B26AF32739CC368
:03234C000D23213D
:10234F00C2DBCB7ECA9222211CDD11B12273237214
:0B235F00C3DF22FE2F20E83AEBDB3248
:10236A00759C3A2ADBCD3B263A739CB720D6C30D1F
:10237A0023083E30D30208FBED4D3A29DB373F17DD
:01238A00D280
:10238B009D233F3A2ADB17DA99233E0118133E04AB
:10239B00180F3A2ADB17D2A8233E0218043E08185E
:0623AB0000F53A29DBCB2E
:1023B100BFFE41FE61200FF1FE04280BFE08280735
:1023C100EE0332749CC9F132749CC92160DB225C3A
:0623D100DB3ACADBCBE79A
:1023D70032CADBC93A2ADBE67FFE2F200E2B225CAE
:0E23E700DB3ACADBCBA7CBAF32CADBC9F3119E
:1023F500681BCDCD383EB9D322FBCDA50B3A739CD6
:0A240500B7CA74683E0832C2DBCD8E
:10240F000F373A31DBFE042003CD360CCDBA38CD71
:09241F00A50BCD030CCD03260131
:102428007027CD7D2521CADBCB4620FC3A37DBFE61
:102438000012006018027CD892521CADBCB4620FC57
:032448003E78CD0E
:10244B006B38CD6B0ECDBA38CD3F25D2B22421CA15
:0B245B00DBCB7E2813CBBE018D273A9F
:1024660037DBFE01C2F224CD0326C3F224CB6E2055
:10247600103AC5DBCB4720CF018427CD8925C394ED
:0524860024F3CBAE21A0
:10248B0060DB225CDBFBC33424CDBA3821CADBCB47
:0D249B004620F9CB5E28FC3E0ACD7C38219E
:1024A800C5DBCB4E20F9F3C3C200CDBA38CD6843A3
:1024B800210F25010C00EDB1CAFF24CD4631DAEC1D
:0324C80024F33AC0
:1024CB00CADBCBF732CADBFBCDEE30DAEC24CD4FD7
:0C24DB0031FE00CAEC24FE10D2EC2432CA
:1024E7000EDBC3E931CD0326015A28CD7D253ACA33
:1024F700DBCB4720F9C3912E210C00373FED42E596
:0625070029C1090118259D
:10250D0009E94344494D4F503F524C165354C38C27
:10251D0032C36D31C3A62EC30E2EC37F2FC3722EB1
:06252D00C3722EC3383218
:10253300C37A35C37336C39479C3B42EF3E5D52A6E
:0E2543005CDB3ACADB5FCB63C26C25CB73CA8C
:102551005625CBB32B237E225CDBFE0DCA702537BB
:102561003F577B32CADB7AD1E1FBC937C3622521F0
:0325710060DB220A
:102574005CDBCBEBCBE3C36C253AAFDBB720572155
:0C258400CADBCDDD253AAFDBB7204B21D0
:1025900000CADB3A37DBFE032841FE012804FE042093
:1025A00001030A03CB4620FCCB5E28FCED43E9DBAC
:0625B000CBC6181DF53A30
```

*Fig. 13-16*

```
:1025B60037DBFE03CADB25F1F53AAFDBB72016F1B0
:1025C60021CADBCB4620FCCB5E28FCCB9ECBBFCD05
:0625D6001226D300C9F13A
:1025DC00C93A739CFE00281D3A37DBFE032815FE12
:1025EC000228113A37DBFE03280A3E0ACDBE253EEF
:0625FC000DCDBE25C9C98A
:10260200C9E53A37DBFE01200521ACDBCBC6E1C9C7
:10261200E521749CCB462013CB4E2017CB56200FBE
:05262200CB5E2003C3A4
:102627003526CBBFE1C9B7E22B26CBFFE1C9B7EA15
:102637002B2618F6473A33DBFE012804FE0228034F
:0626470078D300C908F57C
:10264D003E28D3023ACADBCBDF32CADBF108FBED01
:10265D004D08D93ACADB5FCB63DB00CAD6262A5CAC
:03266D00DBE52189
:10267000739CCB46CAEC26E1F5CD3B26F1E67F778D
:1026800023225CDBFE0DC29C26CBA3CBB3215FDBF8
:012690002227
:102691005CDB7B32CADBD908FBED4DFE08C2BC26F0
:0A26A1002A5CDB2B225CDB373F01D3
:1026AB0061DBED42DAB6262A5CDB2B225CDBC393C3
:0726BB00262A5CDBE5C121CA
:1026C2009DDB373FED42D29326CBFB2160DB225CC0
:0D26D200DBC393263AC6DBCB5728B67B321C
:1026DF00CADBD908216F433333E5FBED4DE1E67FCC
:1026EF0032249F21239FCBC6C3932608D93ACADB36
:0426FF005FCB43CAA0
:102703004E27CB53C25727CB4BC266273A37DBFE44
:1027130001C23227ED4BE9DB0A03ED43E9DBB7F2F4
:1027230044273AACDBCB47CB8732ACDBC266273ED0
:102733000ACBD3CD1226D3007B32CADBD908FBEDFB
:062743004DFE2AC23627FC
:10274900CBCBC33627CBDB3E28D302C33B27CB9366
:10275900CBCB3E0DC336273A63DDC33427CB8BCBB6
:0527690083C34E27C3ED
:10276E003B27C848454C4C4F3A49274D20524541CE
:10277E004459FF0A0D2AD454494D45204F5554CD86
:06278E004D454D4F52596C
:10279400204F564552464C4F57CE4E554D4245520A
:1027A4003FC44449414C494E472E2E2EC54E4F201E
:0627B4004449414C205491
:1027BA004F4E45D54E4F5420464F554E44C2425572
:1027CA00535921C1414E53574552205544F4E45D279
:0627DA0052494E47494E32
:1027E000472E2E2ECC4F4E204C494E4507B24F4E11
:1027F000204C494E452031323030B14F4E204C49AB
:062800004E45203330308C
:10280600B54F4E204C494E452039363030BF5345E2
:102816004C4543544544205350454554420554E416C
:062826005641494C4142FD
:10282C004C45AB4552524F5220434F4E54524F4C95
```

Fig. 13-17

```
:10283C00A14E4F204552524F5220434F4E54524FAF
:06284C004CA65245515557
:102852004553542052444C42C3494E56414C49447C
:1028620020434F4D4D414E44C64641494C454420BC
:0628720043414C4CC94932
:10287800444C45D14E554D424552204F4620524575
:1028880054524945533FCF4F5054494F4E204E550F
:062898004D4245523FD302
:10289E00414444524553533FD9434C454152204E37
:1028AE00554D4245523FD9434C45415220414C4C27
:0628BE00204E554D42457D
:1028C40052533F2028592F4E29D74D454D4F525929
:1028D40020434C4541524544C74C494E4B494E4711
:0628E4002E2E2ECA4C4905
:1028EA004E4B204E554D424552533FC04449534FE7
:1028FA004F4E454354FF0AD39363030566500A72
:06290A000D3136303430BF
:102910002D3030330A0D30352D30342D38370A0D37
:1029200043504F5952494748542031393835 0A0DE0
:06293000524143414C2D11
:102936005641444943 3FF9A52455154553542052F6
:10294600444C42FF0A0D4D4F44454D20434F4D4DDB
:06295600414E44533A20FB
:10295C00202020202020202020202020206B
:10296C004D454D4F525920434F4E54524F4C3A0AFD
:06297C000D4920202020 7F
:1029820020202D49444C45204D4F444520202020F5
:1029920020202020202020204D2020202008
:0629A2002D444953504C86
:1029A8004159204D454D4F52590A0D43544C20452D
:1029B800 20202D494E544552414354495645204DF7
:0629C8004F4445202020D1
:1029CE002020202043202020202D4348414E4708
:1029DE00452F434C454152204D454D4F52590A0DFE
:0629EE0043544C20432C71
:1029F400442D444953434F4E4E4543542020 2020F8
:102A040020202020202020202043544C20462D0C
:062A1400435552534F52DE
:102A1A00205249474854 0A0D502C3F202020202D8F
:102A2A00444953504C415920434F4D4D414E44 5314
:062A3A00202020202020D6
:102A400020 2043544C20482D4241434B535041 4396
:102A500044 50A0D532020202020202D535441 544955
:062A6000535449435320CA
:102A660020202020202020202020202043544CDD
:102A760020442D44454C45544420434841520ADB7
:062A86002020202020208A
:102A8C002020202020202020202020202020203A
:102A9C00202020202020202043544C20422D78
:062AAC00424C414E4B209C
:102AB2004C494E450A0D2020202020202020 2095
```

Fig. 13-18

```
:102AC002020202020202020202020202020204
:062AD2002020202020203E
:102AD8004C202020202D4C494E4B204E554D4245 30
:102AE80052530A0D4155544F204449414C494E47 D1
:062AF8003A0A0D44202003
:102AFE00202020202D4449414C0A0D44585858 207E
:102B0E0020202D42415443483204449414C0A0D3166
:062B1E002D3135202020BE
:102B24002D4449414C2053544F524544204E554D59
:102B34004245520A0D5220202020202D52454487
:062B440049414C0A0D4B53
:102B4A00202020202D504155534520464F5209
:102B5A00204449414C20544F4E450A0D43544C20C1
:062B6A004820202D42412D
:102B7000434B53504143450A0D0A4F5054494F4E61
:102B800020434F4E54524F4C3A0A0D542020 2020DF
:062B900020202D4C4953EA
:102B960054205354455454494E47530A0D4F20 2084
:102BA60020202D4348414E47452 04F5054494F41
:062BB6004E530A0D4F58BA
:102BBC00585820202D42415443483204348414E30
:102BCC004745204F5054494F4E53FF5354414E44A8
:062BDC00415244204F505D
:102BE20054494F4E2020202020FF44535220434F 6F
:102BF2004E54524F4C0A0DFF43585220434F4E54 ED
:062C0200524F4C2020207F
:102C0800202020202020FF4155544F20414E5 376B
:102C180045520A0DFF4C4F43414C20434F50592019
:062C2800202020202020E6
:102C2E00202020FF4449414C204D4F4450450A0DFFC2
:102C3E00424C494E44204449414C202020202023
:062C4E0020202020FF43BE
:102C540041 4C4C205052 4F47524553 530A0DFF529A
:102C6400455350 4F4E5345204D4F444520 20207E
:062C7400202020FF434870
:102C7A004152 204C454E4754480A0DFF444953439C
:102C8A004F4E4E45435420 4354524C20202020 7E
:062C9A00FF2A2A4E4F54F0
:102CA000205553 3544442A 20A0DFF2A2A4E4F542004
:102CB0005553 3544442A2020202020202020FF414F
:062CC00053594E432F534F
:102CC60059 4E430A0DFF4155544F205245444 9 4140
:102CD6004C2020202020202020FF5350 45454412
:062CE6002053454C45435C
:102CEC00540A0DFF464C4F5720434F4E54524F4CF5
:102CFC002020202020 2020FF53504545442043F5
:062D0C004F4E56 45525 3E4
:102D1200494F4E0A0DFF2A2A4E4F54205553354441F
:102D2200 2A2A20202020202020FF2A2A4E4F5409
:062D320020555335442A20
:102D38002A0A0DFF43 54 532 0434F4E54524F4C2000
```

Fig. 13-19

```
:102D4800202020202020FF44545220434F4E92
:062D580054524F4C0A0D1D
:102D5E00FF44544520505052F544F434F4C20202097
:102D6E002020202020FF2A2A4E4F54205553454420
:062D7E002A2A0A0DFF5392
:102D8400594E432046414C4C2D4241434B20202078
:102D9400202020FF53594E43204E4F204143544995
:062DA4005649545920437A
:102DAA0054524C0A0DFF2A2A4E4F5420555354447B
:102DBA002A2A20202020202020FF455854454E32
:062DCA00444544205351172
:102DD000554544348FFD72BEC2BFA2B0F2C1D2CC1
:0A2DE000322C3E2C532C632C782C6F
:102DEA00862C9B2CAA2CBF2CCC2CE12CF02C052D4C
:042DFA00182D2D2D36
:102DFE003C2D512D5F2D742D832D982DB02DC52D6D
:082E0E00CDBA38CDEF25DD211E
:102E16007098DDE51140000E0179320DDBCDFA34F4
:102E2600DD460078B7CA512EDD23DD7E00CDBE25F6
:062E360010F6DDE1DDE510
:102E3C00DD7E3DFE2B200ECDBE25DD7E3EB727323E
:102E4C00DDBCD2B2FCDF6250C3E10B9CA672ECD40
:062E5C00BA38DDE1DD19CA
:102E6200DDE5C31F2E3A37DBFE01CAD42FC3912EF4
:102E7200CDBA38014A290ACB7F200ACDBE25CDBA68
:062E820003803C3782E3A6C
:102E880037DBFE012803CDF625F33ACADBCBAFCBFF
:082E9800E732CADB2160DB22F6
:102EA005CDBFBC3342421CADBCBA6017628CD7DB5
:0B2EB00025C39424CDBA38CDDD2511D8
:102EBB000698061C0E01CDBA3879B727CD2B2F3EBD
:102ECB002ACDBE251AF630CDBE253E20CDBE2579A6
:062EDB008721D42D856F54
:102EE10030012400D55E2356EBD1007EFEFF280879
:102EF100E5CDBE25E12318F3100E3A37DBFE01CAFA
:062F0100912ECDF625C360
:102F0700912E130C3E0FB9D2C12E3E19B9DA202FDC
:102F17003E0681CDBA38C3C52E79B727C606CDBAC6
:052F270038C3C52E2196
:102F2C00DDB77ED677EE60FF630E5CDBE25E17E55
:102F3C00ED677EE60FF630CDBE25C904040504040A
:062F4C0004030304020360
:102F52000101030403070301010303030103050144
:102F620003010102010101010101010101014C
:062F720001060101014E
:102F78000101010101010101CD3F25CD4631DAF62FCE
:102F8800CD8E2FC3D42F061C0E00110698FE0DCA35
:062F9800AE2FCD4631DA38
:102F9E00AE2FE60FCAAC2FCDBB2FD2AC2F12100125
:102FAE00C9130CC5D5CD3F25D1C1C3952FF52147EA
:062FBE002F7D81D2C52F1A
```

Fig. 13-20

```
:102FC400246FF1BEC9FE0DCAD42FCDDB30C3F62F5A
:102FD400CDA536CD440ECD2D0ECD6B0ECDDB303AC6
:102FE40037DBFE01CA87243E2ECDBE25CDF625C390
:102FF4004124018E28CD7D2521CADBCB4620F9CD85
:10300400DB30CDAB30D21530C3D42FB727C606186A
:1030140023CDEE30DAC92FCD4F31320EDBFE1DD277
:03302400CE2FCDDF
:10302700DD253A0EDBFE0F3808FE1AD20F30B7C681
:1030370006B727CD2B2F3E2ACDBE253A0EDB21051D
:06304700988 56F7EF63053
:10304D00CDBE25CDF625CDDB30CDAB30DAD42FCDB1
:0D305D00EE30DAD42FCD4F31F521462F3A59
:10306A000EDB16005F19F1BED2C92FB7CAC92F21CC
:10307A00059819777BFE01CACE2FCD8A30C3CE2F91
:05308A00E5D5C5F521AC
:10308F00069811632F061C1ABEC2A130231310F825
:10309F0018053E02320698F1C1D1E1C93E78CD6BD9
:0530AF0038CDBA38CD58
:1030B4003F25301D21CADBCB6EC2D23021C5DBCB0C
:1030C4004620E93333018427CD7D25C39424CBAE38
:0230D400C92110
:1030D600CADBCBF6C9F33ACADBCBAFCBE732CADBE6
:0930E6002160DB225CDBFBC9CD9B
:1030EF003F25FE20CAEE30CD4631D2FD30C9E60F66
:1030FF00210DDB77CDBA38CD3F25FE20CA0331FE37
:05310F000DCA3231CDB4
:103114004631DA3431210DDBCB0ECB0ECB0ECB0E88
:10312400E60FB6320DDBCD3F25FE0DC23531373FFC
:06313400C937C9FE4B2063
:10313A0001C9FE232001C9FE2A2001C9FE3A38022C
:10314A003FC9FE30C9E53A0DDBE60F320FDB3A0D17
:06315A00DB210DDBED6737
:103160007EE60F0777070786232386E1C93A28DB27
:10317000B72035CD3F25CD37313028CD6843FE50BF
:06318000282 1FE54281D69
:10318600F32161DB225CDB21CADBCBE6CBAEFB01A4
:0B3196009D27CD7D25AF3C3228DBC318
:1031A100412421CADBCBF6AF3228DBCD3F25FE0D12
:0A31B100CA912EF33ACADBCBF732C5
:1031BB00CADBFB2131980E00CD3F25FE0D2805778C
:0D31CB00230C18F479323098AF326D982142
:1031D800CADBCBA6CBAECD2632F5CDEF25F1C33D6C
:1031E8003FDD21309811400047DD1910FCDD7E00DD
:0631F800FE00CA3F323266
:1031FE003098DD23DDE5E11131984F0600EDB0DDAD
:10320E007E3CFE2BC21D32DD7E3D326E983E2B3251
:06321E006D98CD2632C3BD
:10322400F13E3A3DDBFE01CA3732FE023E04CA37A4
:0F323400323E0AC93A3098B7C2573201BD27CD92
:103243007D2521CADBCB4620FC3ACBDBCB47C2A290
:0C3253003CC3912EAF326D98017B28CD5A
```

Fig. 13-21

```
:10325F007D2521CADBCB4620F9CDDB30CDAB30D27B
:0E326F0076323E01C3F13ECDEE30DA8632CD2E
:10327D004F31FE0A3003C3F13EC3EC24C338320193
:0F328D009D28CD7D25CDDB30CDAB30D29E32C319
:10329C00D42FCDEE30DAB732CD4F31320EDBFE000B
:0C32AC00CAF532FE10D2F532C3FB32CD61
:1032B8006843FE43C2F53201A628CD7D25CDDB301B
:0D32C800CDAB30DAD42FCDEE30DAD732C3E3
:1032D500E232CD6843FE43CAA134C3F532CD4F3146
:0E32E500320EDBFE00CAF532FE10D2F532C307
:1032F3008134CDDB30C3EC24320DDBCDDA34CDDDCC
:0833030025CDFA343A0EDB215E
:10330B0070980140003DCA183309C310337EE5DDC8
:10331B00E123E5FDE147FE00CA41332B237EE5CDDA
:06332B00BE25E110F7DDF4
:1033310046003E0DCDBE253A0EDB320DDBCDFA3413
:10334100CDBA38CDEC34DA4133E67FFE06CA4934D2
:03335100FE08CAA9
:10335400CA33FE04CAEF33FE02CA5A34FE0DCAE56C
:1033640033CD6A35DA413332729CDD7E00B7C286D2
:02337400333AEA
:10337600729CFD7700FD23DD3400CDBE25C34133AD
:10338600FE3CD29433CD0D35DA9C33C375333E07FC
:06339600CDBE25C341334A
:10339C00CD0D3579320DDB11309CFDE5E1EDB03A08
:0E33AC00729CFD7700FD23FDE5D121309C3A97
:1033BA000DDB4F0600EDB0DD3400CD2535C34133BA
:1033CA00DDE5E123FDE5C1373FED42C2DB33C394BE
:0633DA00333E08CDBE25C4
:1033E000FD2BC341333E30D302CDE334C38C32DDF9
:1033F0007E00FE00CA9433CD0D35DA0534FD2BCDA9
:063400002535C341330B2A
:10340600729320DDBB7CA343411309CFD23FDE5E17A
:10341600EDB02B36203A0DDB4F0600FD2BFDE5D136
:0634260021309CEDB0CD49
:10342C002535DD3500C34133FD360020CD2535DD96
:10343C003500CA4133FD2BCD2535C34133CD0D3578
:06344C00C25234C39433A8
:10345200FD23CD2535C34133DD7E00B7CA94334702
:10346200DDE5E123E5FDE13E20772310FACD2535A8
:06347200DD360000DD362E
:103478003D00DD363E00C341332130981140047FE
:10348800191 0FD3600E5DDE1DD363D00DD363E0094
:0634980001CD28CD7D25C9
:10349E00C3D42FCDDA3401B428CD7D25CDEC34DA6A
:1034AE00AA34E67FCBAFFE59CABF34CDE334C3D4C2
:0234BE002F21BC
:1034C0003098114000060F193600E5DDE1DD363D8C
:1034D00000DD363E0010F0C3B9343E01D3023E0297
:0634E000D302C93E01D336
:1034E600023E1AD302C9DB02CB47C2F53437C9DB29
```

Fig.13-22

```
:1034F60000373FC93A0DDBB727CD2B2F3E3ACDBE5D
:06350600253E20CDBE258C
:10350C00C9DD4E000600DDE5E12309FDE5C1373FCD
:10351C00ED42E5C1CA243537C93E0DCDBE253A0E64
:05352C00DB320DDBCDD8
:10353100FA34DD4600DDE5E1237EE5CDBE25E1106F
:10354100F73E0DCDBE253A0EDB320DDBCDFA34DD73
:06355100E5E123FDE5C1E8
:10355700E5373FED42E1CA69357EE5CDBE25E1C3DA
:103567005335C9FE20D27035C9FE7FC2773537C9BA
:06357700373FC901E728FF
:10357D00CD7D25CDDB30CDAB30D28C35C3D42FCD29
:0E358D003F25CD4631DA6136E60F3229DBCD1F
:10359B003F25CD4631DAF0352129DBCB0ECB0ECBD7
:1035AB000ECB0EE60FB63229DBCD3F25FE2FC261C7
:0535BB0036CD3F25CDD7
:1035C0004631DA6136E60F322ADBCD3F25CD463172
:1035D000D2DA35FE0DC26136181DE60F212ADBCB8B
:0635E0000ECB0ECB0ECB5A
:1035E6000EB6322ADBCD3F2518E321CADBCBF6180F
:0C35F600BD3A29DB320DDBCD4F3167CD33
:103602006636DA61363A2ADB320DDBCD4F316FCDC9
:0B3612006636DA6136BCCA6136DD2185
:10361D00309811400044DD1910FCDD7E00FE00CA1B
:10362D005136DDE5FDE1DD21309811400045DD1914
:06363D0010FCDD7E00FE22
:1036430000CA5136FD363D2BFD753EC3D42F01BD57
:1036530027CD7D2521CADBCB4620F9C3D42F015AC0
:063663002818EEFE00CA6B
:103669007136FE103002B7C93FC90101290ACB7F63
:103679002007CDBE2503C376363A37DBFE0128067F
:06368900CDF625C3912ED1
:10368F003E07CD9736C3D42FCD7C38CDBA3821C560
:10369F00DBCB4E20F9C9AFCBDF32CADB2100983E1E
:0636AF0055EDA120163EBE
:1036B500AAEDA120103EF0EDA1200A3E0FEDA120BC
:1036C50004CD0F37C9CDD036C3C636AF210098110A
:0636D500019801FF0777D8
:1036DB00EDB0210098365523 36AA2336F023360F4A
:1036EB00210698AF3C77110798011C00EDB032739F
:0636FB009CCD2F793E0179
:10370100327 09C3E023208983E06321698C9CD436B
:0D371100793A0698FE012819FE0228492188
:10371E000698061C2B23360110FB3E023208983EFB
:0B372E0006321698CD4D371131DB211B
:1037390030DB3601011A00EDB03E023231DB3E06C4
:10374900323FDBC9210698AF3C77110798011C006D
:05375900EDB03E02325C
:10375E0008983E06321698C91130DB210798011BD6
:10376E0000EDB0C918044603C005EA011A1802108C
:06377E000400010403C079
```

Fig. 13-23

```
:103784000562CD9337CDB837CD1138CDE937C93E71
:1037940057D3203E12D3203E57D3213E90D3213E0F
:0637A40037D3223E6CD376
:1037AA00223ECFD3233E01D3233E00D320C9217B1F
:1037BA00370E03060BEDB33E0432E6DB3EC032E7BA
:0637CA00DB3E6232E8DB89
:1037D0002172370E020609EDB33E1A32E3DB3EC01A
:1037E00032E4DB3EEA32E5DBC93EDE32008C32A059
:0637F000DB3E0A32008DF1
:1037F60032A1DB3E8932008E32A2DB3E1F32008FC1
:1038060032A3DB3EFFD34032A4DBC93E0032058043
:063816003E143204803A6A
:10381C000D84F600E68F320D843A0F80E67F320F6E
:10382C00803E22320F843A0E84E6FB320E843A0E2E
:06383C0080E6FBF60832F5
:103842000E80C9AF21CEDB77CBD62377CBC6114909
:103852001CCDF838CD9D0BCDFB0B3E01D3033AE6D0
:04386200DBF601325E
:10386600E6DBD303C9F3E52101DB772B36C821C597
:10387600DBCBC6E1FBC9F3E52102DB7721C5DBCB58
:06388600CEE1FBC9F3E5F1
:10388C002103DB7721C5DBCBD6E1FBC9F3E52105B1
:10389C00DB772B360A21C5DBCBDEE1FBC9F3E52157
:0638AC0007DB772B360458
:1038B20021C5DBCBE6E1FBC9F53AA2DBF6403200DB
:1038C2008E000000E6BF32008EF1C9E52104DD73EF
:0638D2002372E1C9E521AB
:1038D80006DD18F5E5211CDDC3D138E52118DDC367
:0738E800D138E5211EDDC30C
:1038EF00D138E5211ADDC3D138E52112DDC3D13836
:0938FF00E52114DDC3D138E521F7
:1039080010DDC3D138E52116DDC3D1383AC9DBB79C
:06391800CA98393E00329E
:10391E00C9DB3A10DBB7CA34393D3210DBC2343959
:04392E003A11DBC3AC
:103932009939 3A12DBB7CA48393D3212DBC24839EB
:073942003A13DBC399393A87
:1039490014DBB7CA5C393D3214DBC25C393A15DB8A
:04395900C399393A9B
:10395D0016DBB7CA70393D3216DBC270393A17DB48
:04396D00C399393A87
:1039710018DBB7CA84393D3218DBC284393A19DB06
:04398100C399393A73
:103985001ADBB7CA98393D321ADBC298393A1BDBC4
:10399500C39939C94707804F060021A43909E9C3EE
:1039A5009917C39917C3AB17C3C617C3E217C3E269
:0239B50017C336
:1039B700F817C3FB17C3FE17C34618C35718C36AC4
:0239C70018C323
:1039C90020FC32C0FC38B18C3AF18C3BA18C3D8BF
:0239D90018C311
```

Fig.13-24

```
:1039DB00E218C3F518C35219C35B19C36D19C36E33
:0239EB0019C3FE
:1039ED009219C39A19C3A019C3A619C3B119C3BC9F
:0239FD0019C3EC
:1039FF00C719C3D019C3E419C3C10FC37764C3D99F
:103A0F0001001E1E0A360F0A280A0E360864C8C89F
:063A1F00990AC8C832102C
:103A250012280D02505001021A01C8C8C8C83270
:103A350011DBCD703A3210DBC93213DBCD703A326F
:043A450012DBC93295
:103A490015DBCD703A3214DBC93217DBCD703A324F
:043A590016DBC9327D
:103A5D0019DBCD703A3218DBC9321BDBCD703A322F
:083A6D001ADBC9C5DDE5DD210E
:103A7500103A06004FDD09DD7E00DDE1C1C93A22BD
:103A8500DBB7C2A93A3A008E4F3AA8DB477932A88C
:063A9500DBA8CAA93A3AC1
:103A9B0023DBB7C2AA3A3E013222DBCD343AC9AF9F
:0A3AAB003223DB2F3222DB3E02CD76
:103AB500343AC93A22DBB7C2EE3A3A23DBB7C2EE53
:0A3AC5003A2121DB7EB7CAEE3A2158
:103ACF00CBDBCB56C2EF3A060C21703BBEC2E93AB4
:103ADF00235E2356EBAF3221DBE923232310EDC9FD
:063AEF00FE42C22D3B3A2D
:103AF500CCDB320DDBCD4F3132CCDBFE00C20F3BD0
:053B0500AF32CBDB3202
:103B0A0021DBC3953CFE10D2053B333311681BCD34
:073B1A00CD38AF3221DB21A1
:103B2100CBDBCB96CBA63ACCDBC3E93121CBDBCBCC
:103B310066C2673B21943B060ABECA453B2323105C
:023B4100F8C3C7
:103B4300673B237EF521CCDBCB0ECB0ECB0ECB0E0E
:103B5300B677F1F630CDBE2521CBDBCB5ECA6C3B0D
:063B6300CBE6CB9EAF3261
:103B690021DBC9CBDE18F711A03E12A83B147A3E1F
:103B790018153C21663C22E73C24D33E280C3D41E4
:103B8900B93D42BC3D44BC3D48BD3D110612071438
:103B990008180921012202240328044400480553A8F
:063BA900C2DBCB47282D12
:103BAF003A709CFE01C2C33B3E1032709CCDD90CC3
:0C3BBF00CD7211C9FE08C2D23B3E01329B
:103BCB00709CCDC50C18ED3E0832709CCDCF0C18F7
:093BDB00E33AC4DBCB4728DF3AD2
:103BE400C2DBCB5728D83A31DBFE012815FE042866
:0F3BF400113E013231DB3208983E02320698CD85
:103C0300420CC93E023231DB320898320698CD3677
:033C13000CC93A9F
:103C1600C2DBCB47CA653C3A3CDBFE01CA453C3EAB
:0A3C260001323CDB3213983E0132FC
:103C300030DB3207983E023231DB320898CDE80C97
:013C40002162
```

*Fig.13-25*

```
:103C41000000E5C93E02323CDB3213983E013231BD
:073C5100DB3208983E03324C
:103C580030DB3207983E02320698CD5111C9003A3E
:053C6800C2DBCB47CADE
:103C6D00D43C3333CD0B0ECDAE3C3ACBDBCBC73290
:073C7D00CBDB3A3098B7CA17
:103C8400953C11681BCDCD38AF326D983E01C3F120
:083C94003E01BD27CD7D252175
:103C9C00CADBCB4620F901000010FE0CC2A53CC3C8
:103CAC0000003A759CFE10CABD3CFE08CADE3C18EA
:063CBC00183E17D3203E64
:103CC20048D3202172370E020609EDB311FA26CD30
:103CD200E338C93E57D3203E12C3C33C3E57D320DC
:063CE2003E90C3C33C004C
:103CE8003AC2DBCB47CAD43C3ACBDBCBD7CBC732C3
:083CF800CBDB3E0032CCDBCD3A
:103D00000B0ECDAE3C019D28CD7D25C921C2DBCB5C
:0A3D100056CA333DCB66C2693D215F
:103D1A00C0DBCB662005CB5ECA333DCB4E200BCB36
:103D2A0046C24E3DCB5EC24F3DC9CD770C21C4DBA6
:033D3A00CBD621C4
:103D3D00C2DBCBE6CDC80DCDAD0BCDBD0BCDFB0D97
:103D4D00C9C921CEDBCBDE23CBC6CBD6CBEE3E1203
:013D5D00CD98
:103D5E003E3ACD770C3EFF32EDDBC921C4DBCB56AC
:0F3D6E002005CB66201FC9CB9621C2DBCBA62137
:103D7D00C0DBCB762803CDC00DCDB50BCDC50BCD9E
:073D8D006F0CCDDB0DC92115
:103D9400C0DBCB5E2001C921D0DBCBAE3E14CD3ECF
:0B3DA4003ACD030CCD770CCDC50B21F0
:103DAF00C4DBCBA621C2DBCBA6C9C30000C93AC274
:073DBF00DBCB57CA4E3E2189
:103DC600C4DBCB4EC2063E3AC0DBCB472031CBCE5E
:103DD600CDCD0B21CEDBCBD623CBC6CBB6CD770C48
:013DE60021BB
:103DE700C0DBCB4E2818CB762014F3118E20CDF8EC
:0B3DF70038CD7D0BCD640BCDC00DCD91
:103E02008D0BFBC9CB8E21CEDBCB9623CB86CBB6DB
:103E12003AA4DB21C0DBCB4E201ECB46C2363EF697
:023E220001326B
:103E2400A4DBD340CD6F0C21769CCB4E2003CDD5A3
:103E34000BC9E6FE18E9CB7620E3F3CDC80DCD958A
:023E44000BCDA4
:103E4600550BFB3AA4DB18D3CB4728B321769CCB82
:103E56004E2019CBCECBD6CDCD0B3E023244DB3233
:103E66001B983206983239DB321098C9CB8ECB9626
:053E7600CDD50BC93A97
:103E7B00C2DBCB47C2833EC93AA2DBCB67280BCD53
:0F3E8B00EF0CE521769CCBC6E1C9CDF60CE52105
:103E9A00769CCB86E1C93AC2DBCB47C2B03E3E082C
:0E3EAA003209D7C3001ACB87CBCF32C2DB3A26
```

Fig.13-26

```
:103EB800A2DBCB67CAC93E21C6DBCBEE3333C3DDF9
:0C3EC8000421CBDBCBEE3333C3F0013A16
:103ED400C2DBCB47C2E93E21C4DBCB46C2EC3ECBBE
:0D3EE4006EC2EC3EC9C3E00F3333C3001AB9
:103EF100DD21F0DBDD770A21CADBCBA6CBAE21C603
:0F3F0100DBCB76CBB62003CDDD253A30984711C8
:103F100031981ACDB4251310F93A6D98FE2B20155F
:0A3F2000CDB4253A6E98B727F53AA4
:103F2A0037DBFE03CA3A3FF1CD2B2FCDEF25180A16
:0E3F3A00F11807DD21F0DBDD770ACDA50BCDF8
:103F4800387DCD7F0CCD530CAF3C3228DB3AC6DB35
:033F5800CBD73292
:103F5B00C6DB3A309847213098222E98CD97433EB6
:023F6B0005CD82
:103F6D006B38CD2842CDBA38CD4F4221C5DBCB467B
:103F7D00CA9940DDCB0646CA723FCB86DDCB06869D
:013F8D003AF9
:103F8E0028DBB7CA2D40AF3228DBC501A527CD8966
:0A3F9E002521CADBCB4620F9C12122
:103FA800C6DBCB8E3A34DBFE022809FE01207621DF
:0E3FB800C6DBCBCE21C6DBCBC62A2E98232239
:103FC6002E987ECD6843CD3C31381CCD7D421057AE
:0B3FD60021C6DBCB86CDBA383E01CD02
:103FE1006B3821C5DBCB4620F9C3BC40FE3BCABCC4
:103FF10040FE50CA0B40FE54CA1740FE42CC544307
:06400100FE25CA23401059
:10400700B4C3BC4021C6DBCB8ECB8610ADC3BC404E
:1040170021C6DBCB8ECBC6109CC3BC4021EEDB3662
:0640270000CBC6C35E40A1
:10402D0021C6DBCB4EC256412A2E9823222E987ED6
:0B403D00CD6843CD37313033FE3BCA65
:104048005E40FE50CA6840FE54CA7140FE42CA63D0
:1040580040FE25CA234010CDC3BC40CD544318F6BA
:0640680021C6DBCB86CB74
:10406E008E18ED21C6DBCBC618F5FE4BC2D13F1024
:10407E0003C3BC403A35DBFE0228083E14CD6B3834
:06408E00C3C1403E05CD58
:104094006B38C36F3F3A35DBFE02280C01B027CDE5
:0940A400DD25CD9941C3AB413A81
:1040AD0028DBB72003C32D40AF3228DBC3983F3E3A
:0D40BD003CCD6B383E32CD7C38CD2842CD55
:1040CA004F4221C5DBCB46200ECD4842C5016A28A6
:1040DA00CD9941C1C3AB41DDCB06462809DDCB06EC
:0640EA00863E00B82060D4
:1040F00078FE0020223A008CCB5F28373A008DCB27
:1041000047CA334121C5DBCB4E2030CD484201CDDB
:0541100027CD9941C319
:10411500DD04FE0120182A2E98237EFE3B28D1FEC1
:1041250025280218091EEDB3600CBC618C2CDBA08
:06413500383E32CD7C385B
:10413B00DDCB065E2888DDCB069EC501D927CD9940
```

Fig.13-27

```
:10414B0041C1C3C940CD4842C3A73F21C6DBCB8E7B
:05415B00CBC63E04CDBF
:104160006B38CD2842CD4F4221C5DBCB462006CD52
:104170004842C32D40DDCB064628EADDCB06862A21
:054180002E98237ECD06
:104185006843FE4B2003C32D402B7E21C6DBCB8627
:0F41950004C3D13F3A36DBFE02280ACD8925212B
:1041A400CADBCB4620F9C9CD4842CD870CCD2D0EB4
:0F41B400AF3228DBDD21F0DBDD350A201FAF3213
:1041C300C6DB3A6D98FE2BCAE6413ACBDBCB47C23E
:0841D300D841C3912ECB8732C5
:1041DB00CBDBC3A23CCD1842C3FF3E3A6E98F50130
:0341EB00DC283A93
:1041EE0037DBFE012805CD8925181121C6DBCBF65C
:1041FE00030ACB7F200DCDBE250318F521CADBCBDC
:06420E004620F9CD184224
:10421400F1C3E931CDBA383E04CD6B3821C5DBCBCF
:0D4224004620F9C9C5DD21F0DBAF060921F8
:10423100F0DB2B237710FC11B643CDD6383EA7D344
:10424100233ED8D323C1C9F33E23D323FBC93A3636
:06425100DBFE012019DD77
:104257007E05FE033812DDCB064E200DDDCB06565C
:104267002007DDCB06662001C9C501C727CD9941C7
:06427700C13333C3AB416B
:10427D00C521C6DBCB46C2E242CD46313002C1C9B3
:10428D00F53EB7D3223E15D322F1E60FFE002002F4
:06429D003E0A47CDBA38CD
:1042A3003E28CD7C38CD7F0C21C5DBCB4E20FCCD09
:0B42B300BA38CD870C3E40CD7C38218E
:1042BE00C5DBCB4E20FCCD7F0C10D7CDBA383E4D92
:1042CE00CD983821C5DBCB5E20FC3EB7D3223E6CA9
:0642DE00D322C1C9F53E28
:1042E400B7D3223E15D322F1CD3C3138E7FE2A2044
:1042F400053E0AC30043FE2320023E0BE60F21AA1B
:064304004385 6F30012427
:10430A003AA1DB320EDB7E32A1DB32008DCDBA3828
:09431A003E46CD7C38CD41432123
:10432300C5DBCB4E20FCCD4D43CDF30BCDBA383E90
:0C43330046CD7C3821C5DBCB4E20FCC3FE
:10433F00D8423AA1DBF68032A1DB32008DC93A0EAA
:10434F00DBE67F18F2F5E5CDBA383E05CD6B3821A7
:10435F00C5DBCB4620F9E1F1C9CB772802CBAFC93A
:10436F00F3CD4842CD870CCD2D0EAF3228DB3EB7B3
:06437F00D3223E6CD322A4
:10438500FBCD030CCDF30B21EEDB3600000000C3A3
:10439500912E0E000D0C237EFE3B2806FE252802DD
:0643A50010F30C41C93DBC
:1043AB007675736E6D6B5E5D5B3E3B08D9F5DD21FB
:1043BB00F0DB3A008DCB672870DDCB03462808DD98
:0643CB00CB0386DDCB03ED
:1043D100CEDD3400DD7E00FEFA2029DDCB0386DD53
```

Fig. 13-28

```
:1043E100CB038EDD7E04E618202EDD360401DD369A
:0643F1000901DD7E09DD7B
:1043F700BE04201EDD3405DD7706DD360000F1D969
:1044070008FBED4DFE042003C38144DD360802C3DB
:064417002344DDCB035637
:10441D0020ECDDCB03D6DD7E09DD7704DD3605002E
:10442D00DD360900C3FE43DDCB034E285A3E05DDC4
:06443D00BE0030C43E1475
:104443000DDBE0030B9DDCB038EDDCB03863E78DDE8
:10445300BE00381C3E50DDBE00380E3E28DDBE00D7
:064463003815DD360902E8
:10446900C3F343DD36090AC3F343DD360908C3F351
:1044790043DD360904C3F343DDCB0396DD3608007B
:06448900DD360428DD36DB
:10448F000928C3F343DD34013E0ADDBE01DDCB0352
:10449F00C6D201443EB4DDBE01300EDD360100DD73
:0644AF00360500DDCB0420
:0A44B5006620BBDD360900C3FE439C
:1044BF002117DCCB6E28102A1EDC7CFE0830087D0D
:1044CF00FE803003CD2445C31912F5E53A3FDBFEDC
:0644DF0001283F3A17DC42
:1044E500CB6F20383A1DDCCB6728153A18DCCBBFDB
:1044F500CD1226CDEF633A17DCCBEF3217DC18155A
:014505003A7B
:10450600A3DB673E04B432008F32A3DB3A17DCCB61
:10451600EF3217DC2122DC34200135E1F1C9F5E563
:014526003A5A
:1045270017DCCB6F28383A1DDCCB6728153A19DC26
:0E453700CBBFCD1226CDEF633A17DCCBAF32EF
:1045450017DC18153AA3DB673EFBA432008F32A3B4
:0A455500DB3A17DCCBAF3217DC2194
:10455F0023DC34200135E1F1C9DB0047CBBF4F2A03
:10456F001EDC7CFE0F38057DFEFF304323221EDC50
:06457F002A0CDC78772312
:104585007DFE0020087CFEB620032100A6220CDC5F
:104595002A1EDC7CFE0F38117DFE80380C2117DCCD
:0545A500CB6E2005CDE6
:1045AA00D944180B3A33DBFE03200478CDEF6308B5
:1045BA00D9FBED4D3EFF3239DC18F42100BA110166
:0645CA00BA01001EAF77EC
:1045D000EDB02100A01101A0010016AF77EDB021D0
:1045E00000DC1101DC01FF00AF77EDB02100A62255
:0645F0000CDC223ADC2184
:1045F6001DDCCBE63A3FDBFE012004CBA6180EFEFF
:10460600002280AFE052806FE062802CBA63E13321D
:0546160018DC3E11322A
:0F461B0019DCCD80582130572206DDCD8C58C9CF
:10462A0021C0DBCB46CA1912CD625DCD785DCD03C0
:10463A00592108D7CB8621C0DBCB6E2806CD69531A
:04464A00C36559C328
:10464E0065593AC0DBCB77C2BF4421C1DBCB5628BC
```

Fig.13-29

```
:10465E000D3E073209D7328CD62134D7CBE6CDF2B8
:06466E00533A08D7CB67A8
:10467400C22355CB6FC2194FCB77C29647CB57C2D3
:10468400BF55CB5FC25D55A7C293473A1CD7E6031B
:06469400C29347212ED75E
:10469A00CB56C293473A33D7CB5FC293473A2ED70A
:1046AA00CB4FC293473A33D7CB4FC24E47CB772033
:0646BA001E3A33D7CB6766
:1046C0002837CBA73233D73E03320AD7CD6E5121DC
:1046D00008D7CBE6CB9EC393473A1CD7CB672007BE
:0546E0003A23D7A7C238
:1046E500BB46CD6E512108D7CBE6CB9E2133D7CB28
:1046F500B6C393473A34D7CB57C293473A33D7CB50
:0547050047C27F472AB6
:10470A0005D7CB7E28252A1EDC7CA7C293477DFECF
:10471A00503803C39347CD6752A7C29347212ED778
:06472A00CBEE2108D7CB05
:10473000E6CB9E185E2134D7CB6628333A09D7FEE4
:10474000052804FE07204C2133D7CBD61845CD4190
:06475000532108D7CBE65F
:10475600CB9E3A49D7FE1130093287D6329FD632E0
:1047660097D62133D7CB8E18242134D7CB76281D64
:05477600CBB63E20322D
:10477B0049D71800CD1D532108D7CBE6CB9E21334B
:10478B00D7CB862134D7CBDEC36559CDDE57CD6D64
:06479B005D3EBFCDDE55BE
:1047A1002108D7CBB6AF3236D7211DD7CB56C2BCE5
:1047B10055CB7E20052100D318032100D27E3D3D3B
:0647C100320BD723233A5E
:1047C70075D6FE02C2D4477EFE0BC3D7477EFE08CE
:1047D700D2BC55CB275F1600220CD7216A5A195E27
:0547E7002356EBE92A56
:1047EC000CD73A0BD74F230D7EFE01C27B552323EA
:1047FC000D0D3A1BD746B8CA9948E52134D7CBC61C
:06480C00E13A40D6A7CA04
:10481200029497EE52140D6CDCA54E1D22949E53A5B
:1048220075D6FE02CABC492A10D7AF47093E17BC4B
:064832003805 3EFFBD3019
:1048380004E1C39F492214D7E13A5CD73D20057EA5
:104848003DCDFE54ED5B16D77E3218D7E52100D555
:06485800E63FCB27CB2751
:10485E006F2219D7237123732372E1237E12231340
:10486E007BFE0020087AFED220031100BA0D20EC48
:05487E00ED5316D72ADE
:1048830019D7CBFE2A14D72210D73A18D72160D6CE
:10489300CD9D53C39F49E53A75D6FE02CA194A2AEC
:0648A30010D7AF47093EEB
:1048A90017BC38053EFFBD3014E17EE52140D6CD69
:1048B9009D53E13A1BD73C321BD7C39F493A31D7A5
:0648C900FE3230E53C3236
:1048CF0031D72214D7E1ED5B16D77E3218D7E52109
```

Fig. 13-30

```
:1048DF0000D5E63FCB27CB276F2219D72371237340
:0648EF002372E1237E129A
:1048F50023137BFE0020087AFED220031100BA0D97
:1049050020ECED5316D72A19D7CBFE2A14D722103F
:05491500D73A18D7217C
:10491A0060D6CD9D533A1BD73C321BD7C39F497EE5
:10492A00E5215DD7CDCA54E130092160D6CD9D532A
:06493A00C39F49E5C547DB
:104940003A1BD70E0D3CB828150D20F93A1BD7900D
:10495000FE4C3842C1E1C37B55C1E1C39F493A7562
:06496000D6FE02C27549FB
:1049660078211BD7962131D786FE18D2594978C1AE
:104976002140D6473A1BD7CD9D53E52131D734E1A7
:054986003CB820F332F3
:10498B001BD72134D7CBC6E1C3994878C1E121604D
:10499B00D6CD9D53CDDF4D3A1CD7CB4F200D212EBD
:0649AB00D7CB4E200621CF
:1049B10026D7C3A856CDF357C365592214D7E13A78
:1049C1005CD73D20057E3DCDFE54ED5B16D77E3292
:0649D10018D7E52A0ED7FD
:1049D70023234690CB27CB272B2B85FE60DAE9498B
:1049E700D6602100D56F2219D723711E0057CB2A15
:0649F700CB2A2100BA19D1
:1049FD00EB0600E123EDB02A19D7CBFE3A18D721EB
:104A0D0060D6CD9D53C39F49E1C39F493A31D7FE2F
:064A1D0018D2154A3C32DC
:104A230031D72214D7E17E3218D7E52A0ED72323B4
:104A330046902B2BCB27CB2785FE60DA434AD660E3
:054A43002100D56F22E7
:104A480019D723711E0057CB2ACB2A2100BA19EB9C
:104A58000600E123EDB02A19D7CBFE3A18D721601A
:054A6800D6CD9D533A7C
:104A6D001BD73C321BD7C39F493A1CD7CB7FC27B88
:104A7D00553AC0DBCB6FCAA24ACDF55B3A09D7A731
:064A8D002032CDE84ACD05
:104A9300330CCD6F0CAF320AD7CD6E51C3DB4ACD89
:104AA300F55B3A09D7A72016CDE84ACD330CCD6F75
:054AB3000C2170D62269
:104AB80002D73E183204D7181A2188D62323232375
:104AC8003E02772188D62202D73E053204D7210834
:064AD800D7CBFECDDF4D3F
:104ADE002108D7CBE6CB9EC36559211CD7CBFECD83
:104AEE006D5DCD330C3A739CB7CA434B21C0DBCB03
:064AFE006E282221C6DB38
:104B0400CB6E200BCD454BCDBF67AF3235D7C93EF9
:104B140057D3203E12D3203E0132759CC30B4B2148
:064B2400CBDBCB6E20E9A3
:104B2A003A37DBFE042003C3384BFE0520DBCD45B4
:104B3A004B3E28CDCC11C3134B18F33A739CB728BC
:064B4A001F3A37DBFE03F9
:104B50002810FE02CA634BFE05CA634B214F68CD85
```

Fig. 13-31

```
:104B6000CA63C9216D68CDCA63C9CDF169C92A0C70
:064B7000D73A0BD74F23DA
:104B76000D7EFE01C2F44BAF3237D73E033239D732
:104B86003A1CD7CBE7321CD7E5212ED7CBA6E13A84
:064B960020D6A720102329
:104B9C000D7EA72805230D3D20FB230DC3FB4B23C6
:104BAC000D7EA728F547230D7EE52120D6CDCA54CE
:064BBC003003CDB554E109
:104BC2000520ED3A20D6A72816E52120D65F16004B
:104BD200197E473A07D790FE033803CDE54BE12310
:064BE2000D18162120D67B
:104BE8001100D646047E12231310FAC9E5212ED7E8
:104BF800CBE6E17EFE02C27B55230D230D7E3213E8
:064C0800D7A72009E521F9
:104C0E0017DCCBCEE11807E52117DCCB8EE179A7B7
:104C1E00CACC4CAF3237D7237EFE0320233E03325D
:064C2E0039D73A1CD7CB78
:104C3400E7321CD723237EFE012816FE02CA944CB9
:104C4400FE03CAC24CFE06CAD14DAF320AD7C3A175
:064C54004D3A2ED7CB4FB4
:104C5A00201D3A34D7CB5F2029CB5720153E02328C
:104C6A000AD73A1CD7E6F0CBCF321CD7C3A14DC323
:064C7A00864D21C0DBCBDA
:104C80006EC2524D2134D7CB96C3674C3E03320AD5
:104C9000D7C3A14D2134D7CB96CDDF4DC3A34F3A17
:064CA0001CD7E6F0CBC7B3
:104CA600321CD7CD575DCD1C0CCD5958CDB65321EE
:104CB60001D7CBC62108D7CBC6C3C64DE52134D70D
:064CC600CB96E1C3864D10
:104CCC003A2ED7CB67281C3A37D73C3237D73A39EC
:104CDC00D7A7280F3D3239D7A720083A1CD7CBA726
:064CEC00321CD73A33D759
:104CF200CB5FC2554C3A13D7A7CA864D3A00D6A706
:104D0200204E3A2ED7CB67287B2A05D7CB7E285454
:054D12003A38D7473AD2
:104D17007D790FE0CF5D4E54BF13A33D7CB4720B4
:104D27005E30282A1EDC7CA720217DFE50301C3AED
:064D37002ED7CB4F2049EE
:104D3D00CD6752A72043212ED7CBEE2108D7CBE646
:104D4D00CB9EC3C64D3A2ED7CB4F202D3E01320AF6
:064D5D00D72134D7CBD6AC
:104D6300C3A14D2120D67EA72819473A37D7FE0481
:104D73003811AF3237D71100D6047E122313052022
:054D8300F918CCAF326D
:104D88000AD7212ED7CB562010CB76200ACD4458EF
:104D98002133D7CBF61827CBB63A2ED7CB4F280BD3
:064DA8002133D7CBF6AF6A
:104DAE003223D71813CD6E512108D7CBE6CB9E21D7
:104DBE0033D7CBB6AF3223D7CDDF4D212ED7CBA6EF
:064DCE00C36559CDDF4D65
:104DD400212ED7CBF62126D7C3A856211DD7CB7EAB
```

Fig. 13-32

```
:104DE4002004CBEE1802CBF6C93E063209D7218C3B
:064DF400D6772134D7CB75
:104DFA00E6C3574F2A0CD7237EFE01C27B552323D5
:104E0A003A4AD746B828083DB8C27B55324AD71124
:064E1A000400197EFE03F6
:104E2000C27B5523237EFE1130223249D7212ED753
:104E3000CB4E203DCD41532108D7CBE6CB9E3A49FE
:054E4000D73287D632D5
:104E45009FD63297D6182AFE20C27B553249D721E4
:104E55002ED7CB4E2011CD41532108D7CBE6CB9E83
:064E65002134D7CBEE184A
:104E6B000A2134D7CBEE2133D7CBCECDDF4DC36563
:104E7B00592A0CD7237EFE01C27B5523233A4BD7ED
:064E8B0046B8C27B55236E
:104E91007EFE02C27B5523237EFE1130263249D786
:104EA1003287D6329FD63297D62134D7CB9E214B2B
:064EB100D7342100D406F5
:104EB700401104007EE6F0771910F9180EFE20C2A3
:104EC7007B552134D7CB9E214BD734CDDF4DC365DE
:064ED700592A0CD72B2B19
:104EDD00220CD73A0BD7C605320BD73601237E36B7
:104EED00013D237716005F1923360223360123 3641
:054EFD000CC36E4B2AFE
:104F02000CD73A0BD74F0D23C3FE472A0CD73A0BC7
:104F1200D74F0D23C3FE47CD6D5D2108D7CBAECB56
:054F22007EC2574F2183
:104F27001CD7CB46C2A34FCB4EC218513A2ED7CB74
:104F37006FC23E513A1CD7E6F0321CD7AF3232D798
:064F4700CDDE57212ED73C
:104F4D00CB562803CDC758C365592134D7CB662816
:104F5D00373A1ADCCB6F200ACB772814CB7F20F1A0
:064F6D001808CB7F280AA2
:104F7300CB7720E7CD9F62CDD8622A2BDCCB7E286E
:104F83006CD2660C35E4F211ADCCB7E20CDCB76C7
:064F930020C92101D7CB6B
:104F9900FECD6966C31912C365593A00D7FE0ED210
:104FA9006 5503A34D7CB4FC265503A00D6A7286925
:054FB9002148D734215E
:104FBE0008D7CBC6CD785D2A2FD7237CB520012B01
:104FCE00222FD72100D6237E2BCDCA542100D4E622
:064FDE003FCB27CB276F3B
:104FE4007E3CE6EF77E60FFE0C38193A97D6FE02C0
:104FF400C21C50E52133D7CBD62134D7CBE6E13ED2
:06500400013209D7237EF2
:10500A003204D7CD7C7D237E3202D7237E3203D76A
:10501A00180C7EE6F07718E6CD6752A7203D21C02E
:06502A00DBCB5E281ECD69
:105030002C0CCD1C0CCD59582101D7CBC63A1CD70E
:10504000E6F0CBC7321CD7CDB653CD575D2108D77C
:06505000CBE6CB9ECBC6AF
:105056002132D7342100D7342147D734C3655921AB
```

Fig. 13-33

```
:1050660034D7CB4E200CCBCE3E06320AD7CD6E516E
:0550760018B0CB8E21F3
:10507B002ED7CBD6CD1C0CCDB653CD80582101D716
:10508B00CBDE3A1CD7E6F0321CD7AF3232D7CD622B
:06509B005D2108D7CBDE09
:1050A100CBA6CB86AF3200D73232D73A47D7FE19DB
:1050B100381E3A48D7FE083027FE0230343A97D6D8
:0650C100FE10282DCB2794
:1050C7003249D72133D7CBC61821FE053002182223
:1050D7003A48D7FE043003C3F9503A97D6FE022860
:0650E7000ACB2F3249D76D
:1050ED002133D7CBC6AF3247D73248D7CDDE57C3E2
:1050FD006559C50E042A02D7237DFE0020087CFECB
:06510D00B620032100A6FC
:105113000D20EFC1C92108D7CBC6CD575DCD1C0CDF
:105123002101D7CBCECD59582108D7CBDECBA6CD85
:06513300DF4DCDB653CDA7
:10513900DE57C365592A1EDC7CA720217DFE50302D
:105149001C212ED7CB4EC26559CD6752A7200E21FF
:055159002ED7CBEE2172
:10515E0008D7CBE6CB9E1805212ED7CBAEC365590B
:10516E00E5D5C5F53A33D7CB572807F1C1D1E1C301
:05517E004F5206022162
:10518300A0D6233605233A60D6A728403601230448
:10519300E52134D7CB462004AF325DD7C5D5215D99
:0651A300D71160D61A4787
:1051A900131ACD9D530520F8D1C1E1115DD71A4FCE
:1051B900772304131A7723040D20F8AF3260D6E55C
:0651C9002134D7CB86E182
:1051CF003E027723043D7723043A34D7CB67200F71
:1051DF003A75D6FE02CAF1513A1DDCCB772831AFB2
:0651EF0018313A31D7FE31
:1051F5001230F678FE04CA1F523A0AD7A7201B3A86
:10520500A3D63C32A2D63E0832A3D678D6043204C1
:05521500D721A2D62202
:10521A0002D7C348523A12D77723043A0AD7A728A3
:10522A00133E037723043E017723043A0AD777040F
:06523A00AF320AD7783202
:1052400004D721A0D62202D73D77F1C1D1E1C921EF
:105250008CD63A09D7772188D62202D73E05320468
:06526000D72108D7CBFEA8
:10526600C92134D7CB56C2E652211CD7CB7ECAE61B
:10527600523A38D7473A07D790FE0F305F2A05D7FC
:06528600CB7ECADE52AF30
:1052BC003237D7E5237E3204D7237E3202D7237EF2
:10529C003203D7233E00BD20083ED5BC200321009D
:0552AC00D42205D72A01
:1052B10002D7232323237CFEB62003CDFF503A07D8
:1052C100D7772120D6CD9D533C3207D7E17EE6F03A
:0652D1003C773A75D6FEA1
:1052D70002CAE952AF180A3E0418063E0218023EF7
```

Fig. 13-34

```
:1052E70001C923E52A02D723237CFEB6200226A67E
:0652F70036032202D7235A
:1052FD007CFEB6200226A636093A04D7D602320421
:10530D00D7E177233A02D777233A03D777C3DB5216
:06531D003A49D73256D7D1
:10532300218DD6114CD7ED5302D7010A00EDB03EC3
:105333000B3204D73A4BD73250D73291D6C9219882
:06534300D6114CD7ED531A
:1053490002D7010700EDB03A49D73253D73E0832A8
:1053590004D73A4AD73250D7329CD63C324AD7C9B9
:065369003A35D7C64032C0
:10536F0035D7300A3E033209D7CD4F52180B217073
:10537F00D62202D73E183204D73A1CD7E6F0321C99
:05538F00D7CD625D2195
:1053940008D7CBE6CB9ECB86C9E5F57EA7280DF1D1
:1053A400F5CDCA547EA72804233D18F923F177E1EB
:0653B40034C9F5E5C52136
:1053BA001CD7CBAECBB60E03F33E03ED793AE7DB4F
:1053CA00CB8732E7DBED793E05ED793AE8DBCB9F17
:0653DA0032E8DBED793E34
:1053E00001ED793AE6DBE6E532E6DBED79FBC1E19A
:1053F000F1C93A75D6FE02CA5E542A0ED7CB7E2872
:065400003ACB762836E5E8
:10540600237E2A10D72F5F16FF13192210D73A31A1
:10541600D73DFEFF2001AF3231D7E17EE63F77234D
:06542600232323E00BD1C
:10542C0020083ED6BC20032100D5220ED718C23A44
:10543C0034D7CB67201B3A31D7FE3230143A12D70F
:06544C00A7200E2A10D774
:105452001100E91938053E0C3212D7C92A0ED7CBF2
:105462007E282DCB762829E523237EC618773A316C
:06547200D73DFEFF200102
:10547800AF3231D7E17EE63F77232323233E60BD59
:1054880020032100D5220ED718CF3A34D7CB672076
:065498001B3A31D7FE0CA7
:10549E0030143A12D7A7200E2A10D71100E9193866
:1054AE00053E0C3212D7C9E5F52100D4E63FCB27D5
:0654BE00CB276F7EE6F033
:1054C400CBF777F1E1C9F5C5D5E5477EA7282132A9
:1054D4005CD77806004E23EDB12015545D1B3A5C71
:0654E400D791325CD70CE9
:1054EA00EDB0E135D1C1F1371809AF325CD7E1D15E
:1054FA00C1F1B7C9F5C5D5E5215DD7477EA72814FF
:06550A004F78060023EDBE
:10551000B1200B115DD77912A7280313EDB0E1D1AB
:10552000C1F1C921C1DBCB4ECA77462108D7CBA632
:05553000CB4728113AF1
:105535032D7FE0338193EDFCDDE55CD935A181507
:10554500212ED7CB56280BCD0359CD0A581806CD99
:06555500A158CDFF57C371
:10555B00655921C1DBCB46CA8B462108D7CB9ECBE5
```

Fig. 13-35

```
:10556B00472007212ED7CB562803CDC758C36559E3
:06557B00CDDF4DCD785D8F
:10558100211CD7CB4E202B21C0DBCB6E2815AFCDF4
:10559100DE55320AD7CD6E512108D7CBE6CB9ECB53
:0555A100861815AFCDD6
:1055A600DE552108D7CBDECBA6CB861806CDF35722
:1055B600CDDE57C36559C37B552108D7CB96212627
:0655C600D7CB7EC2F455B4
:1055CC00CB6EC20457CB66C21557CB76C2A856C356
:1055DC008646C5F547F33A2DD7A0322DD73A26D7B4
:0655EC00A03226D7FBF1FE
:1055F200C1C9CBBECD785DAF3232D73A36D73CFE89
:105602000C380D3E043209D72134D7CBE6C3574FAD
:065612003236D7CD995895
:10561800211CD7CB7ECA2A4621C0DBCB6E283F3A55
:1056280036D7FE033007CD0359CB5E2013CD1C0CB3
:06563800CD80582101D7CE
:10563E00CBD6CDB653212ED7CBD63A1CD7E6F032E9
:10564E001CD7CD625DAF320AD7CD6E512108D7CBB4
:06565E00E6CB9ECB86C3E3
:1056640065593A36D7FE03300DCDC758CDA1582120
:10567400C0DBCB5E2013CD1C0CCD80582101D7CBD1
:05568400DECDB653214C
:105689002ED7CBD63A1CD7E6F0321CD7AF322AD761
:10569900CD625D2108D7CBDECBA6CB86C36559CBBE
:0656A900B6212ED7CB4E06
:1056AF00CAB856CDF357C36559CB76CAB256CD9902
:1056BF0058AF320AD73A1CD7E6F0321CD7CD625D0D
:0656CF00CD6E5121C0DB8D
:1056D500CB5E2013CD1C0CCD8058CDB653212ED7D3
:1056E500CBD62101D7CBD62108D7CBE6CB9ECB860F
:0556F500AF3232D73294
:1056FA0023D72133D7CBB6C36559CBAECD99583A08
:10570A0004D7A72803CD935AC36559F5E5CBA63E1E
:05571A00EFCDDE55217A
:10571F0008D7CBEE212ED7CB8ECDDE57E1F1C3D6F6
:10572F0055E5F5212DD73A1ED73D321ED7A7200DAF
:06573F002126D7CBFE215C
:10574500008D7CBD6212DD7CB7628173A1FD73D3290
:105755001FD7A7200D2126D7CBF62108D7CBD621D9
:065765002DD7CB6E2817C2
:10576B003A20D73D3220D7A7200D2126D7CBEE21CB
:10577B0008D7CBD6212DD7CB6628143A21D73D326B
:06578B0021D7A7200A212E
:1057910026D7CBE62108D7CBD63A22D7A720173A6E
:1057A100E5DBCB672814CBA732E5DB3E05D3023A14
:0657B100E5DBD302180441
:1057B7003D3222D73A23D7A728043D3223D73A24AC
:1057C700D7A728043D3224D73A25D7A728043D3246
:0657D70025D7F1E1FBED16
:1057DD004D3A3FD721C0DBCB6E2802D60A321ED7F9
```

Fig. 13-36

```
:1057ED00212DD7CBFEC93A40D7321FD7212DD7CB8C
:0657FD00F6C93A08D7CB03
:105803004720043E0118033A41D73220D7212DD730
:10581300CBEE212ED7CBCE212DD7C93A08D7CB47F4
:06582300C231583A1CD707
:10582900CB4F20043E0118033A42D73221D7212D0C
:10583900D7CBE6C93A43D73222D7C93A44D732231C
:06584900D7C93A45D73231
:10584F0024D7C93A46D73225D7C92187D6CB662860
:10585F000521625A181ECB5E2805215A5A1815CBFE
:06586F0056280521525AE3
:10587500180CCB4E2805214A5A180321425A010813
:1058850000113FD7EDB0C93EA7D3233EC0D3233E79
:0658950000D320C9AFCDD5
:10589B00DE55CDDE57C9211CD7CBF60E03F33E05E3
:1058AB00ED793AE8DBCBDF32E8DBED793E01ED79E0
:0658BB003AE6DBCBCF3220
:1058C100E6DBED79FBC9CDB6530E03F3211DD736C7
:1058D100603E03ED793AE7DBCBC732E7DBED793E9A
:0658E10001ED793AE6DB5F
:1058E700CBE732E6DBED79FB211CD7CBEEAF322AD3
:1058F700D7CD315D77DB01DB01DB01C9E5F5C50EEE
:0659070003F3AFED79325D
:10590D003AD73E04ED793E20323CD7ED793E07ED96
:10591D00793E7E323ED7ED793E03ED793AE7DBF6FF
:06592D00D932E7DBED7941
:105933003E05ED793AE8DBF66932E8DBED793E01C5
:10594300ED793AE6DBF61F32E6DBED79211DD7363A
:0659530060FB211CD7CB14
:10595900EECBF6212ED7CB96C1F1E1C9C3835D21E8
:10596900C0DBCB46CA0C5ACDA57B2100BA1101BABE
:0659790001001EAF77EDF6
:10597F00B03E60321DD73E013207D7321BD7324BB4
:10598F00D7324AD72100BA2216D72100D423232396
:06599F00232205D73E188B
:1059A5002162D52B2B2B3D77C2A85936182323E3
:1059B500220ED72130572206DD3A415A3212D7211D
:0659C5000D5A1170D6011D
:1059CB003500EDB021805A1110DD7E1223137E12AB
:1059DB002313232313133AC0DBCB7720087E122328
:0659EB00137E12180223D6
:1059F1001323137E1223137E12CD8058CD9958CDD7
:105A0100885ACDB653CD8C58CDC50CC917010201AA
:065A110006020F0F0F0F4B
:105A1700FE02010403010C040200FE05011004024A
:105A27000101000A0601010102010203011007033
:065A370001010102011053
:105A3D00040502010CFF3206041E390271FFAF0688
:105A4D00041E390271FF5803031E390271FF420211
:065A5D00021E390271FF78
:105A63002C02021E390271BC55764AED4DBC55EB32
```

Fig.13-37

```
:0B5A7300476E4BFE4D7C4ED84E014F9D
:105A7E000D4FBB5AEC5A395BA05B2100D2222BD7BB
:105A8E00AF322AD7C9212ED7CBCEF33E80D303FB1C
:065A9E002A02D77E23CD91
:105AA400475D2202D72104D735F3D3013EC0D30387
:105AB400FB212ED7CBDEC908D93A04D7A7200F2162
:065AC4002ED7CB46281985
:105ACA00CB86CD1E58C3E35A3D3204D72A02D77E6D
:105ADA00D30123CD475D2202D73E28D30308D9FB41
:065AEA00ED4DDB0347CB8C
:105AF0007F2828181C211DD7CBE6CBC63E10D30328
:105B00001819211DD7CB462812CB86CBA63E10D321
:065B100003AF322AD7DBCF
:105B160001DB01DB013A04D7A72013212ED7CB5E88
:105B2600280C78CB772807212ED7CBC6CB9E08D951
:065B3600FBED4D08D93A19
:105B3C00C1DBCB472830212AD73EFFAE2008211DE0
:105B4C00D7CBD6C3725BAFB62037211DD7CB96CB44
:065B5C007E201ACB66C298
:105B6200725BCB762004CBE618062100D2231818EC
:105B7200DB01CD785D1822CB66C2725BCB6E20044E
:055B8200CBE618EC2148
:105B870000D323222BD72A2BD7DB017723222BD72E
:105B9700212AD73408D9FBED4D08D9211DD7CB666B
:065BA70020163E01D303AD
:105BAD00DB03CB67200CCB6F2008CB7F2804CB7792
:105BBD002809DB01212AD73600181FDB01DB01DBA9
:065BCD00013E00D303219C
:105BD3002AD77E3DF5AF77F1CD315D77CD1F5D21BE
:105BE30008D7CBF6211DD7CBA63E30D30308D9FB6C
:065BF300ED4D211DD7CB92
:105BF900CECD315DEB237E23B74FCA365CCD1A5D1E
:105C0900282B7E3D28093D28062109D73602C9CD12
:065C19001A5DCA3C5C7E2E
:105C1F003DCA485C3DCA795C3DCA935C3DCAC15CD4
:105C2F003DCAFA5CC33C5C2109D73603C9211DD795
:065C3F00CB4E20F3AF3252
:105C450009D7C9CD1A5DCA365C7EFE06C2125CCD87
:105C55001A5DCA365C06053A75D6BEDA675C7E32D1
:065C650075D6CD1A5DCAE0
:105C6B00365C10F8E5211DD7CB8EE1C3185CCD1A3D
:105C7B005DCA365C7E3DC2125CCD1A5DCA365C7E57
:065C8B00FE04C2125CC31E
:105C9100185CCD1A5DCA365C7E3DC2125CCD1A5DC0
:105CA100CA365C7E47E521A4D67E90D2B35CE1C3BF
:055CB100185C78B7CA81
:105CB600BD5C77E1C3185CE1C3365CCD1A5DCA36BC
:105CC6005C7E3D3DC2125CCD1A5DCA365C7EFE40EE
:065CD600CAE75CCD1A5D77
:105CDC00CA365C7EB7CAED5CC3185CCD1A5DCA3699
:105CEC005CE5211DD7CB66E1CA125CC3185CCD1AEA
```

Fig. 13-38

```
:065CFC005DCA365C7E3D2E
:105D0200C2125CCD1A5DCA365C7E47E52187D67E1B
:105D120090D2B35CE1C3185C0D2379B7C9211DD7BA
:065D2200CB7E2006CBFE43
:105D2800CBB61804CBBECBAEC9211DD7CB7E20087D
:105D38002100D21100D3180611000D22100D3C9F5D1
:065D48007DFE0020087C36
:105D4E00FEB620032100A6F1C93AA4DBCB8F32A404
:0D5D5E00DBD340C93AA4DBCBCF32A4DBD3AA
:105D6B0040C93AA4DBCB8732A4DBD340C93AA4DBCE
:065D7B00CBC732A4DBD30C
:025D810040C917
:105D8300CD405ECD075F3A16DCFE0120113C321692
:105D9300DC2A00DC7CB52806CD575FC33A5E3A1691
:065DA300DCFE02205A3C68
:105DA9003216DC3A1ADCCB6F200ACB772814CB7F6A
:105DB90020471808CB7F280ACB77203DCD9F62CD9D
:065DC900D8622A2BDCCB9E
:105DCF007E2806CD2660C33A5E2134D7CB6E2823BA
:105DDF003A1ADCCB7F201CCB772018CBAECD3D58A9
:065DEF00F33AE5DBCBE70F
:105DF50032E5DB3E05D3023AE5DBD302FB3A1DDC97
:105E0500CB7F281E2A00DC7CB520173A24D7A72093
:065E1500113A1CD7CB4737
:105E1B0020073A37DCFE043003CD4A633A16DCFE2A
:105E2B000320073A13DCCB7F28003E013216DCC37C
:065E3B003D5EC319123A9E
:105E4100AADBFE03C2CB5E3A25D7B7C2685EAF328A
:0D5E5100AADB2134D7CBE63E053209D73A53
:105E5E00739CB7200521ABDBCBCE2134D7CB66208C
:105E6E000F3A75D6FE02CA815E3A17DCCB4F280375
:065E7E00CDEC622A2DDCD0
:105E8400CB7E284DCB7628493A38D73C3238D7E5F3
:105E9400237E2A1EDC2F5F16FF13193A75D6FE02E5
:065EA400C2A95E2B2B22B7
:105EAA001EDC2137DC35E1CBBECBB6232323233ED0
:105EBA0000BD20083ED5BC20032100D4222DDC18C9
:065ECA00B9DA685EAF3298
:105ED000AADBC3685E3A17DCCB6F282A3A75D6FE78
:105EE00002CAEB5E3A17DCCB4F201B2A00DC7CFE9B
:065EF0000020137DFE4DB1
:105EF600300E2A1EDC7DFE807CFE053003CD6966F1
:105F0600C93A3CDCCB47C2565F3A1DDCCB7720064C
:065F1600CB5F203C1815D2
:105F1C00CB6720363A008C473A38DCA0202CE521A0
:105F2C001DDCCBB6E12A06DC7CB5201BCD9F62A71D
:065F3C002015F33E10D316
:105F4200023E28D3023E30D302211DDCCB9EFB1839
:105F520003CDD862C93A1DDCCB7F200BCD7D603AE0
:055F62001DDCCB7FCA2D
:105F670025602A04DC46F3ED5B00DC1BED5300DC07
```

*Fig.13-39*

```
:105F7700FBED5B14DC13ED5314DC237DFE002008DE
:065F87007CFEA6200321B0
:105F8D0000A42204DC78CDF760CB47284C2A0CDC2A
:105F9D007023220CDCF57DFE00380B7CFEB620064E
:065FAD002100A6220CDC1D
:105FB3002A0ADC342A1EDC23221EDCF1CB4F2823E1
:105FC3002A0CDC7123220CDC7DFE00380B7CFEB630
:065FD30020062100A622B9
:105FD9000CDC2A0ADC342A1EDC23221EDC2A0ADC19
:105FE9007EFEFD3805CD4A6318102A14DC7DFEFAC1
:065FF90038087CFE0120C7
:105FFF0003CD4A632A1EDC7DFEF838127CFE0E3874
:10600F000DCDEC627CFE0F38057DFEFB30082A00BB
:06601F00DC7CB5C2575FF6
:10602500C93A75D6FE02CA63602A2BDC237E321C70
:10603500DC237E320EDC237E320FDCCD62613A1A20
:06604500DCCB6F200ACB4A
:10604B007F2014CB7728101808CB77200ACB7F281A
:10605B0006CD9F62CDD862C92A2BDC237E321CDC95
:06606B002B551E00CB2A9C
:10607100CB2A2100BA19220EDCC34060F5E5C53AEE
:1060810037DCFE32D2F36001000F2A1EDC7CB83807
:066091000479BD385D2119
:1060970037DC342A29DC2220DC233E0677220ADC7F
:1060A700233A0CDC77233A0DDC77AF3214DC321558
:0660B700DC0606211D6855
:1060BD007EE52A0CDC7723220CDC7DFE00380B7C80
:1060CD00FEB620062100A6220CDCE1230520E12AE4
:0660DD000CDC2B2234DC78
:1060E3002A1EDC0E06060009221EDC211DDCCBFE67
:1060F300C1E1F1C9472112DCCB7620183A32DCB872
:066103002024CB7E283CA5
:106109003A36DC3C3236DCFEFA2846AF184ACBB6C2
:106119003232DC3E023233DCAF3236DC3E01183833
:0661290078CB7E28EBCBD1
:10612F00BE4F3232DC3A36DC473E023233DCAF321E
:10613F0036DC3E03181C3A33DC3D3233DCA7200734
:06614F00CBFE2A34DCCB7C
:10615500C63E01180747CBBECBF63E01C9AF474F38
:106165003A1ADCCB6F20092100A2ED5B0EDC180783
:056175002100A0ED5B1C
:10617A000EDC3A1CDC3D321CDC1A322FDC13E52122
:10618A0000D27BBD20077ABC20031100BAE13A2F66
:06619A00DCA7CA3B623ADB
:1061A0001CDCA7CA5B621A322FDC3A1CDC3D321CB5
:1061B000DC13E52100D27BBD20077ABC200311004F
:0661C000BAE13A1ADCCB43
:1061C60067205737A2FDCD5573A30DCBAD120523AFD
:1061D60031DC3D3231DCA720533A2FDC7703231A1A
:0661E600322FDC3A1CDC44
:1061EC003D321CDC13E52100D27BBD20077ABC209C
```

Fig. 13-40

```
:1061FC00031100BAE13A2FDCA7280F3A30DC7723E1
:06620C00033A2FDC3D32D5
:106212002FDC18EEE5211ADCCBE6E1C39F61E52114
:106222001ADCCBA6E13A2FDC3230DC3E023231DC22
:066232003A30DC77230383
:10623800C39F611A771323033A1CDC3D2815321CCF
:10624800DCE52100D27BBD20077ABC20031100BA0F
:06625800E118E0211ADC50
:10625E00CBE6CB6E2008ED4326DCCBF61806ED43DD
:10626E0024DCCBFECD987C2A2BDCCBF623232323F8
:06627E003A75D6FE02CACB
:106284009762 3E00BD20083ED6BC20032100D522E3
:106294002BDCC93E60BD20F718F2C9211ADCCB6E95
:0662A4002018CBBECB76F2
:1062AA00282ACBEE2A26DC2206DC2100A22208DCE0
:1062BA003EFF1819CBB6CB7E2812CBAE2A24DC229D
:0662CA0006DC2100A02209
:1062D00008DC3EFF1801AFC92A08DC46232208DC8F
:1062E0002A06DC2B2206DC78CDEF63C9F5E53A3FC0
:0662F000DBFE0128523A1A
:1062F60017DCCB6F204BCD2C7D3A1DDCCB672828D5
:10630600CB5F20123A18DCCBBFCD1226CDEF63212E
:0663160017DCCBEE182499
:10631C003A18DCCBBFCD12263228DC211DDCCBD6C3
:10632C0018E73AA3DB673E04B432008F32A3DB21BB
:05633C0017DCCBEE218F
:1063410022DC34200135E1F1C9F5E5211DDCCB7EEC
:10635100CAC763CDFA7CCDAA7C3A12DCCB7F283D3B
:066361002A34DCCBCE2A39
:106367000CDC3A36DC7723220CDC7DFE00200B7C2C
:10637700FEB620062100A6220CDC2A1EDC23221EE4
:06638700DCAF3236DC320F
:10638D0014DC3215DC2A0ADC343A12DCCBBF3212B3
:10639D00DC3A12DCCBF73212DC211DDCCBBE2A201D
:0663AD00DCCBFE2A29DC16
:1063B300232323233E00BD20083ED5BC2003210018
:1063C300D42229DCE1F1C9AF3206DC3207DC4623F3
:0663D3007ECDDA6310F933
:1063D900C9F5DB02CB5728FAF1CBBFE5C5CD1226AB
:1063E900C1E1CDEF63C9F5E5211DDCCBDEE1F1D3D8
:0663F90000C9F5C5E53AFC
:1063FF003CDCCB47C2A1643A1DDCCB77C2A164CB96
:10640F006720173A008C473A38DCA0280D3A1DDC7C
:06641F00CBF7CD327D3207
:106425001DDC18783A1DDCCB57280CCB97321DDCC8
:106435003A28DCD30018762A06DC7CB5284E2A08D3
:06644500DC46232208DC06
:10644B002A06DC2B2206DC78CBBFFE05280578D389
:10645B000018543A45DBFE0220F43E22CD663A3E4C
:05646B000A32ADDB2147
:106470003CDCCBC6C359643AADDB3D32ADDBCA89E7
```

Fig. 13-41

```
:10648000643E22CD663AC39839213CDCCB86C39862
:06649000393A1ADCCB6F63
:106496002004CBBF1802CBB7321ADC3E10D3023E23
:1064A60028D3023E30D302211DDCCB9EE1C1F1FB95
:0664B600ED4D08D9DB00EA
:1064BC00472117DCCB56C2D4652134D7CB66C2D466
:1064CC0065CBBF4F3A1DDCCB6728503A18DCB9209E
:0664DC00263A3FDBFE053D
:1064E200200D3A1DDCCBF7CD327D321DDC1836FE95
:1064F2000620323A1DDCCBF7CD327D321DDCC3D40F
:06650200653A19DCB92026
:106508001E3A3FDBFE0228173A1DDCCB77CAD4655A
:10651800CBB7321DDC3A3FDBFE05C2D46518003A22
:0565280045DBFE02CA84
:10652D00F4653A739CB7CA38663A25D7A7283779E8
:10653D00FE0420242117DCCB46281DCB863A39DBFF
:06654D00FE0120383E03B0
:1065530032AADBC389652134D7CBE63E053209D79E
:10656300186F2117DCCB86AF32AADBCD5258181631
:066573002117DCCB86AF0E
:1065790032AADBCD525879FE0320052117DCCBC6A0
:106589002A00DC7CFE0138057DFEFF305423220001
:06659900DC2A02DC787729
:10659F00237DFE0020087CFEA620032100A42202FA
:1065AF00DC2A00DC7CFE0138117DFEAA380C211795
:0665BF00DCCB6E2005CDCF
:1065C500EC62180B3A33DBFE03200478CDEF633A17
:1065D5001CD7CB4720053A45D718023E0C3224D7A5
:0665E500D908FBED4D3E5C
:1065EB00FF3239DCCD267D18E03E05B928083E0682
:1065FB00B92829C32F653A1DDCCB5F200F3E06CD92
:06660B001226211DDCCB6C
:10661100DED300C32F653E06CD12263228DC211DB4
:10662100DCCBD6C32F65213CDCCB46CA2F65CB869C
:05663100AF321ADBC3CB
:10663600D4653A25D7B7CA5D663AAADB57B7CA59B1
:0E664600663A62DDB9C25966147A32AADBCD1B
:106654005258C38965AFC350663A62DDB9C2596600
:106664003E01C35066F5E52101D7CB7E200F2134CE
:04667400D7CB66C258
:10667800C9663A17DCCB6F28483A1DDCCB67282857
:10668800CB5F20123A19DCCBBFCD1226CDEF6321A8
:0666980017DCCBAE182454
:10669E003A19DCCBBFCD12263228DC211DDCCBD63D
:1066AE0018E73AA3DB673EFBA432008F32A3DB214F
:0566BE0017DCCBAE214A
:1066C30023DC34200135E1F1C9F5E601C6024F3E72
:1066D30004ED79F1F5CB3FCB3FE60BF644ED793E84
:0666E30003ED79F1F5CB97
:1066E9004F3E012802F6C0F640ED793E05ED79F1FD
:1066F900F5CB4F3E8A2802F660F620ED793E01ED92
```

Fig.13-12

```
:0667090079F1CB7F3E0098
:10670F0028023E17ED79C92100A01101A001001642
:10671F00AF77EDB02100DC1101DC01FF00AF77EDA9
:05672F00B021FB632214
:1067340018DD21CD67221ADD21B864221CDD210079
:106744006 8221EDD2100D4232323232229DC222DC9
:06675400DC2100D5232327
:10675A002323222BDC2100A42202DC2204DC2100D8
:10676A00A6220CDC2100A02208DC3E013216DCAF96
:06677A00CBF73212DCAF88
:106780003238DC211DDCCBE63A3FDBFE012004CBB6
:10679000A6181CFE022818FE0320093E023238DC2F
:0667A000CBA6180BFE045D
:1067A60020073E013238DCCBA63E133218DC3E1100
:1067B6003219DC3E82CDCC66C93AA3DB673EFBA428
:0667C60032008F32A3DB5C
:1067CC00C9F5DB02CB7F280A3A17DCCBD73217DCB2
:1067DC0018143A17DCCB57280FCB973217DC3A3406
:0667EC00D7CBF73234D7D1
:1067F200DB003E30D3023E10D302F1FBED4DF53EFD
:1068020030D3023E10D302F1FBED4D078307300770
:066812000C070607034716
:1068180010470C470604040101000000E0A0D444904
:1068280053434F4E4E4543540A0D020A0D0D45522F
:06683800524F5220434FB5
:10683E004E54524F4C0B4F4E4C494E45203936302C
:10684E00301D4F4E204C494E4520393630300A0D02
:06685E004552524F52208A
:1068640004434F4E54524F4C0A0D06350A0D2B0A0D58
:106874003A2ADBE67FFE2FCA8468CDB370DAE1687A
:106884003EFFCDBD73AF32079FCD1073380718108C
:06689400CD1073300B3E35
:10689A0064CDBD73CD7873C3E16821E768FE262015
:1068AA000BCD1073DAD868213069180CFE2A20083B
:0668BA00CD107338192116
:1068C0005869477EFEFF2002180EB82006235E237B
:1068D00056EBE923232318EBCD7273CD8473C3E108
:0568E00068CDCF73C379
:1068E500C20020EF6D2FEF6D41776943EF6D44686E
:0B68F5006A45A66D46286E48BD6D4C3C
:1069000 0E96D4DF56D4F8D69506A6E51846E5386F9
:0E6910006C54776E569B6E58B26E493F6E59AE
:10691E001A6F5A486F3D3F6D3F386D42316F0D947F
:0F692E0068FF4DC66F54AD7050AF6F4316704485
:10693D0048705A737046A17057A77058F56F5298EA
:0C694D006F4C6A6F4A816F472D70FF4845
:10695900EB7543D475448475459A7546C6754C26BE
:02696900765066
:10696B00B07552027653EE76543D76FF210C9FCBD9
:08697B0046C28A69CDCF7321E9
:10698300CBDBCBAEC3F001C39468210C9FCB46C2D3
```

Fig.13-43

```
:09699300A669CDCF73CD2E792148
:10699C00C6DBCBAECDC269C3DD0421C0DBCB46C2A6
:0969AC009468C39468CDF169CD33
:1069B500D46921C0DBCB46CA9468C39468217BDDCA
:1069C500CB462005CB4E2001C93E02323CDBC9C96E
:0469D50021EA74CD72
:1069D9007B73C9CD4842CD870CCD2D0ECD030CCD8F
:0669E900F30BCDD569C3DC
:1069EF00E1682177DDCB8ECB96CB9E3A76DDE670D4
:1069FF00FE00285821C0DBCB4E200DCB46202ACBE2
:066A0F005E281021017554
:106A1500180321F774CD7B733E1ECDBD7321C0DBFA
:106A2500CB462009CB4EC02177DDCBD6C92177DDFA
:066A3500CBDEC921317522
:106A3B00E5210C9FCBEEE1CD7B73217CDDCB76CAC0
:0E6A4B00536A217375CD7B73210C9FCBAEC3B4
:106A59001D6A21C0DBCB4628B521F774C33B6A21E7
:0D6A69000C9FCB46C2D868CB9ECD0977218B
:106A76006EDDCB6E21C6DBC2856ACBC6C3876ACB09
:0B6A860086CD1073D2936ACD7F0CC345
:106A9100F46AFE53C2AB6A214E9FCD566C214E9FC4
:086AA100CD766CAF32079FC3F4
:106AA900BF6A210C9FCB4EC2BB6AFE3BC2BB6AC305
:0D6AB900946821079F35CD306CD2D46ACD92
:106AC6007F0C3A66DDCD9C73DA1C6CC3EE6ACD7F13
:056AD6000C3A66DDCD65
:106ADB009C73DA1C6CCD9677DA1C6C210C9FCB5611
:0A6AEB00CAF16BCD1073D21F6B21AE
:106AF5000C9FCB5E20053E0DCDF176CDE677DA1CF9
:0A6B05006C210C9FCB56CAF16B21E6
:106B0F00C6DBCBD6CD560CCD2E79CDCF73C38D69C9
:086B1F00210C9FCB5E2003CD89
:106B2700F176CD9173D2E26BFE232003C3E26BFEB5
:106B37002A2003C3E26BFE202003C3EE6AFE28204F
:066B470003C3EE6AFE2903
:106B4D002003C3EE6AFE2D2003C3EE6AFE50200D16
:106B5D00216EDDCBEE21C6DBCB86C3EE6AFE542063
:066B6D000D216EDDCBAE30
:106B730021C6DBCBC6C3EE6AFE2C2009CD436CDAFB
:106B83001C6CC3EE6A210C9FCB4E2013FE3B200FDF
:066B930021 0C9FCB5E20E7
:106B9900053E0DCDF176C39468FE522003C37F698B
:106BA900FE212006CD4A6CC3EE6AFE572010CD9611
:056BB90077DA1C6C21DD
:106BBE000C9FCB56C2EE6A182AFE402010CD9A7852
:0E6BCE00DA1C6C210C9FCB562819C3EE6A21ED
:106BDC00079F35C3F46ACD7D42CDBA38CD2079DA22
:066BEC001C6CC3EE6ACD33
:106BF2003377210C9FCB4EC2001ACB5E2003C3E138
:0E6C0200683A0E9FA728F73D320E9F3E05CD43
:106C10009C73DA006CAF32079FC3BF6ACD33772114
```

Fig. 13-44

```
:086C20000C9FCB4EC2001A21AB
:106C2800EA74CD7B73C3E1683A76DDE670FE20CA6C
:106C38003F6CFE40C2416CB7C937C93A68DDCD9C8C
:036C480073C9CD40
:106C4B00870C3EFACDBD73CD7F0CC9C53A6EDDCB3B
:0E6C5B0057CA746CCD44723A63DD477EB8CAE6
:106C6900716CCD40732318F5CD4472C1C90122005E
:106C790011269FEDB03A63DD21469F77C9CDA972F0
:016C8900DA30
:106C8A009A6CA747DE1CD2466D7818014732119FCD
:106C9A00CD1073DA9968FE3DC20E6DCDA9724F7898
:066CAA00FE05200679FE44
:106CB000FFCAD06C216E6D160058B7ED5A7E3200B7
:106CC0009F218A6DED5A7E32019FCDE971DAD86835
:066CD00078A7200979C23B
:106CD600DD6C2171DDCBD678FE0D2007216DDD71CF
:106CE600C3946878FE03200E21259F16003A109F54
:066CF6005FB7ED5A2371A7
:106CFC002160DD160058B7ED5A7178FE172000C3DD
:106D0C009468FE3FC2316D216EDDCB5ECA1E6DCD27
:066D1C0044722160DD1647
:106D22000058B7ED5A7ECD1872CD4472C3946821D3
:0E6D3200079F35C394683A119F47C3136D3A0B
:106D4000119F47C3A56C7832119FCD1073DA9968F3
:0E6D5000FE3DCA5D6DFE3FCA636DC3316DCD61
:106D5E00A972C39468CDA972CD44723E00C3286D4A
:106D6E00000000000000000010001010000000012
:066D7E000000000000000F
:106D8400000000000000FFFFFF7F7F7FFFFFFFFF89
:106D9400FFFFFFFFFFFFFFFFFFFFFFFFFFFFFFFFFF
:066DA400FFFFCDA97221E2
:106DAA006EDDA72004CB8E1807FE01C2D868CBCEB1
:106DBA00C39468CDA972A7201BCD3377210C9FCB32
:056DCA0046CA9468CDEB
:106DCF007873210C9FCB863EAA32A69FC3001AFE72
:0B6DDF0001C2D868CD7F0CC39468CDC2
:106DEA00A972C39468CDA972C39468CDA972216EA1
:106DFA00DDA72007CBB6CBBEC39468FE012007CB24
:066E0A00F6CBBEC3946844
:106E1000FE02C21C6ECBB6CBFEC39468FE03C2D882
:106E200068CBF6CBFEC39468CDA972216FDDA72095
:066E300004CB9E1807FED2
:106E360001C2D868CBDEC39468CDA972A7200DCD58
:106E460044723E7BCD1872CD44721815FE01200C9B
:066E5600CD44723EFFCDA9
:106E5C00BD733ECE18E8FE02C2D868C39468216E9A
:106E6C00DDCBEE21C6DBCB86C39468216EDDCBAEC9
:016E7C0021F4
:106E7D00C6DBCBC6C39468CDA972216EDDA72004F5
:106E8D00CB961807FE01C2D868CBD6C39468CDA99E
:026E9D00722160
```

Fig. 13-45

```
:106E9F006EDDA72004CB9E1807FE01C2D868CBDE9B
:106EAF00C39468CDA97247216DDDA72009CB8E3A17
:066EBF0076DDE68F184AA3
:106EC500FE01200BCBCE3A76DDE68FF610183BFEA1
:106ED500092805FE05D2D868CBCEFE0220093A76F0
:066EE500DDE68FF6201827
:106EEB0023FE0320093A76DDE68FF63018163A7644
:106EFB00DDE68FF6403276DD78FE09200A217CDD57
:056F0B00CBF61808326E
:106F100076DD217CDDCBB6C39468CDA9722175DD09
:106F2000A72004CBBE1807FE01C2D868CBFEC394CD
:026F300068CD2A
:106F3200A972217BDDA72004CBB61807FE01C2D8B7
:106F420068CBF6C39468CD3377CD3871CD4D71CD12
:036F520078732130
:106F55000C9FCB46CAE16821EA74CD7B73210C9F57
:096F6500CB86C37000CDA9722196
:106F6E007BDDA72004CB961807FE01C2D868CBD6CE
:106F7E00C39468CDA9722175DDA72004CB861807AE
:066F8E00FE01C2D868CB31
:106F9400C6C39468CDA9722175DDA72004CB9618C9
:106FA40007FE01C2D868CBD6C39468CDA9722176F6
:066FB400DDA72004CBBEA6
:106FBA001807FE01C2D868CBFEC39468CDA9722116
:106FCA007BDDA72006CB86CB8E181DFE012006CBC3
:066FDA00C6CB8E1813FE69
:106FE000022006CB86CBCE1809FE03C2D868CBC6DA
:106FF000CBCEC39468CDA972217BDDCBA6CBAEA747
:067000002002180FFE0142
:107006002004CBE61807FE02C2D868CBEEC394680C
:10701600CDA9722175DDA72004CBAE1807FE01C2EB
:05702600D868CBEEC3A9
:10702B009468CDA9722177DDA72006CBB6CBBE180D
:10703B0009FE012805FE02C2D868C39468CDA97267
:06704B002175DDCB9ECB98
:10705100A6A720021819FE012004CBDE1811FE029A
:107061002004CBE61809FE03C2D868CBDECBE6C309
:067071009468DD214E9F32
:107077003E2132069FCD10733817FE2828F7FE29C8
:1070870028F3FE2D28EFDD7700DD233A069F3D200C
:06709700E43A63DDDD7741
:10709D0000C39968CD3871C39468CD8A71C3946863
:0C70AD00CDA972C39468AF32069FDD21AC
:1070B900259FDD233A63DD473A64DD4F3A65DD57A5
:0470C900CD527332FF
:1070CD000D9FBA202E3A069FFE002005CD3F721867
:1070DD00EB21069F35DD2BDD7E00CB6F200CCB77B2
:0570ED0020083E1CCD4F
:1070F2004073C3C970CD3672CD3A72C3C970FE20D7
:10710200CAC9703A069FFE29200821DB74CD4B7252
:0371120037C93A40
```

Fig. 13-46

```
:107115000D9FDD7700DD2321069F34B82803C3C901
:0F7125007021069F35DD2B78DD77003A069F320B
:10713400109FB7C9CD41712171DDCBD6C9012200A1
:1071440021C7711160DDEDB0C901050021149F1143
:1071540060DDEDA021159F116EDDEDA021169F11BC
:0571640072DDEDA02129
:10716900179F1175DD010300EDB0211A9F1179DD1B
:09717900010300EDB0211D9F117E
:107182007CDD010600EDB0C901050011149F2160EC
:0C719200DDEDA011159F216EDDEDA011B8
:10719E00169F2172DDEDA011179F2175DD010300F1
:0671AE00EDB0111A9F2153
:1071B40079DD010300EDB0111D9F217CDD01060086
:1071C400EDB0C900002B0D0A08021E02060E46325D
:0671D400A0AA3B00E4004C
:1071DA000000004617000500000000000005000079C5
:1071EA0021009F96380B7921019F9628023002B719
:0671FA00C937C906304848
:1072000050FE64DA0B7204D66418F6FE0ADA1572C0
:107210000CD60A18F68257C9C5D5CDFD7178CD4078
:067220007379CD40737A82
:10722600CD4073D1C1C93A63DD18103A64DD180B3D
:107236003E2018073A65DD18023E07C34073CD2C81
:0672460072CD3172C92275
:10724C00089F210C9FCB4E201C216EDDCB5EC444CD
:08725C00722A089FCD7A72CD61
:107264002C72216EDDCB5ECA7172CD3172CDBA380B
:0A7274003E64CDBD73C922089F21BE
:10727E006EDDCB5E28162A089F23237EFE2020017A
:10728E00237EFEFF2814CD40732318F52A089F7E17
:05729E00FE202806CDD2
:1072A30040732318F5C9AF32069FCD1073DA037309
:1072B300CD9173DA0373D630573A069FA7CADD72AE
:0172C3003A90
:1072C400039FCD0A738232039F21069F347EFE03FF
:0772D400C2E5723A039FC3FB
:1072DB00F4727A32039F21069F34CD1073DAFA725F
:0A72EB00CD9173DAFA72C3B9723A5A
:1072F500039FC301733A039F21079F35B7C9AF2188
:0D730500079F3537C9875F878783C9C5217A
:10731200079F347E06004FB721259FED4AC17EFEAE
:107322002028EB2163DDBE28062164DDBE20023762
:06733200C9CD3873B7C994
:10733800CB77CA3F73CBAFC9E5210C9FCB6E28052D
:10734800CDDA631803CDBE25E1C9CDBA3821239F14
:06735800CB4628F6CB86AF
:10735E003A249FE67F216EDDCB4ECA7073F5CDBE0B
:0E736E0025F1B7C9CD107330FBC921D6743A92
:10737C006EDDCB57CC4B72C93A76DDE670CA83739F
:10738C0021DB7418EAFE3A3005FE303801C937C9E2
:06739C00C5D5470E64CDCB
```

Fig. 13-47

```
:1073A200BA383E0ACDBD73CD2079DAB9730DC2A1C8
:1073B2007310EAB7D1C1C937C3B673C5470EAF0060
:0673C20000000DC2C173C2
:1073C80010F5C1CDBA38C9DD2160DDFD2130DBFD06
:1073D800360301DDCB0E4E2003FD3403DDCB0F5EFB
:0673E8002004FD36030342
:1073EE00FD360003DD7E20FE022006FD360001186C
:1073FE0008FE002004FD360002FD361301DDCB151C
:06740E00562803FD3413B3
:10741400FD360101DDCB156E2004FD360103DDCB05
:1074240017A6DDCB17AE21749CCB4E201ACB5E2859
:0674340006DDCB17E6188F
:10743A0010CB462806DDCB17EE1806DDCB17E6186B
:10744A00F4FD360E01DDCB1C6ECA5974FD340EFDF7
:06745A00360C01DDCB1B26
:10746000462009DDCB1B4E2003C36C74FD3614018E
:10747000DDCB155EC28174DDCB1566C28174FD342F
:0674800014FD361101DDD0
:107486007E1DA7C29374DD361103C39C74FE02C22F
:107496009C74DD361102FD361001DDCB1C66CAAACE
:0674A60074FD3410DD7ED0
:1074AC001F3CFD770FFD361501DDCB1C7ECAC07469
:1074BC00FD361502FD361601FD360801210698 36FB
:0674CC0002210C9FCBAE73
:1074D200CD6C77C930204F4BFF34204552524F526A
:1074E200FF322052494E47FF33204E4F2043415234
:0674F20052494552FF3132
:1074F80020434F4E454354FF3520434F4E4E4593
:1075080043542031323030FF36204E4F2044494119
:067518004C544F4E45FFEC
:10751E00372042555359FF38204E4F20414E535776
:10752E004552FF393620434F4E4E4543542039368F
:06753E003030FF39372058
:1075440053454C45435445442053504545442055E8
:107554004E415641494C41424C45FF3938204E4F2B
:0675640020455252524F5277
:10756A0020434F4E54524F4CFF3939204552524F07
:0A757A005220434F4E54524F4CFF75
:10758400CDA9722180DDA72809FE012805FE02C2CB
:10759400D86877C39468CDA972217DDDA72809FE38
:0675A400012805FE02C2F1
:1075AA00D86877C39468CDA972217EDDA72809FE21
:0D75BA00012805FE02C2D86877C39468CD91
:1075C700A972FE06D2D868327FDDC39468CDA9724E
:0D75D700217CDDA72004CBA61807FE01C211
:1075E400D868CBE6C39468CDA972217CDDA72004BA
:0F75F400CBBE1807FE01C2D868CBFEC39468CD8A
:10760300A972210C9FCB46C2D868A728013D320E30
:077613009F210C9FCBDE213B
:10761A00779FCD766CAF32079FC3BF6ACDA972211F
:10762A007CDDA72004CBAE1807FE01C2D868CBEEDA
```

Fig. 13-48

```
:10763A00C39468CDA972C39468210C9FCBCECB9E0C
:01764A00C37C
:10764B00986A3A7BDDE603FE03C25B76F1C34376B1
:0E765B00C932009F2A089F7EFEFF20182322BE
:10766900089F3A009FCD1872CD2777D0CD3672CDBD
:037679003672CD99
:10767C003672C9CD2777DC40732318DA32009F2A83
:0C768C00089F7EFEFF200E2322089F3A7C
:10769800009FCD1872CD1677C9CD2777DC407323AC
:1076A80018E4A728093E31CD4073CD1677C93E307E
:0676B80018F5A728063EAC
:1076BE0031CD4073C93E3018F87EFEFFC8FEFEC8BD
:1076CE00CD40732318F32A089F7EFEFF2804FEFE8A
:0676DE00200523220 89F95
:1076E400C9CD2777DC40732318E9C3D868C53205B0
:0C76F4009F3A0F9F4F060021779F093A34
:10770000059F77210F9F34C1C93E0D32779F32A06C
:087710009FAF320F9FC9E53263
:10771800059F216EDDCB5EC444723A059FE1C937EF
:0C772800E5216EDDCB5E2001B7E1C9CD8C
:10773400870CCD5D0CC9CD7F0CCD560CC921E374EB
:04774400CD7B732165
:1077480061DD34210C9FCB6620183A129FA7200ECA
:087758003A60DD3D32129F2171
:10776000139FCBC637C93D32129FB7C921139FCB98
:0977700086210C9FAF3261DD3A65
:1077790075DDCB6720113A60DDA728073D32129FDE
:0F778900CBA6C93D32129FCBE6C9CD7F0CDD21C7
:10779800F0DB2167DD7ECD6B38CD2842CDBA38CD00
:0377A8002079DA6B
:1077AB00DD7721C5DBCB46CACF77DDCB0646CAA436
:1077BB0077210C9FCBD6B721C5DBCB86DDCB0686DD
:0177CB00CDF0
:1077CC004842C9211075CD7B73210C9FCB96C3C148
:0877DC0077210C9FCB9637C307
:1077E400C277DD21F0DB3A67DDCD6B383E0ACD7C14
:0577F40038CD2842CD54
:1077F900BA3821C5DBCB46C21378CD484221EA7499
:04780900CD7B73219F
:10780D000C9FCB96B7C9CD5878D21F78CD7178DA49
:10781D004C783A008CCB5FCA397821C5DBCB4EC290
:03782D003E78CDD5
:10783000484221 0C9FCBD6B7C93E0ACD7C38CD201B
:0D78400079DA4778C3F877CD484237C9CDD3
:10784D004842211E75CD7B73C30C78F5E53A76DD84
:10785D00E670FE40CA6D78FE30CA6D78E1F1B7C9A9
:05786D00E1F137C93A0A
:1078720036DBFE01C29678DD7E05FE03DA9678DD00
:10788200CB064EC29878DDCB0656C29878DDCB0681
:0678920066C29878B7C938
:1078980037C93E0032A59F210C9FCBF621A49FCB70
```

Fig. 13-49

```
:0978A8008EDD21F0DB3A67DDCD35
:1078B1006B38CD2842CDBA38CD2079DAE77821C5A9
:0778C100DBCB46CAF378CDD2
:1078C8007178DA4C7821A49FCB4EC2DB78CDFF7853
:0778D800C3B678CD48422140
:1078DF000C9FCBB6CBD6B7C9CD4842210C9FCBB6A8
:0E78EF00CB9637C9CD4842212575CD7B73C39A
:1078FD000C783E1ECDBD733A008DCB67CA12793E12
:10790D000032A59FC921A59F343EC8BEC021A49FAA
:04791D00CBCEC921E3
:10792100239FCB46CA2C79CB8637C9B7C9C9CD4D60
:0F79310079CD3871CD8A7121239FCB863E0032EC
:10794000A69FC9CD4D79CD3871CD4D71C921009F0C
:0E795000AF0611772310FCC93AA69FFEAAC20B
:10795E0066793E0032A69FC93E1ECDBD7321EA74E4
:0D796E0018203E1ECDBD73217CDDCB76CAF6
:10797B009379214175180E3E1ECDBD7321D674CD62
:09798B007B7321EA74CD7B73C902
:107994003ADF9EFE5A2006CDA57BCD077C21BF7D14
:1079A400CDDB7BCDDB30CDAB30F5CDF625F1FE3133
:0679B400200D211B7EDD09
:1079BA0021009ECDE77BC3912EFE332005CDB37BFC
:1079CA001807FE322803C3912E21F37DDD21889EFC
:0679DA00CDE77BC3912EF6
:1079E000CDED7919EBCDED79ED4A4D44C9DD6E0051
:1079F000DD23DD6600DD23C9CD587AE521DE9E3624
:067A0000206960CD587AF8
:107A0600E5CDCB7AE1CD587AE5CDCB7A3E30213A39
:107A16003F22DC9ECD9F7ACDCB7A0DCDCB7A280C3A
:067A260021DE9EFE30206F
:107A2C00037E18023630CDBE25E17EFE2C2806FEE4
:107A3C00FF281418C223E521DE9E7EFE2028023E7C
:067A4C002CCDBE25E1185F
:107A5200B0CDF625E1C94E234623C9DD7E03DDB64E
:107A620027280FDDE5CDC27B012000DD09CDC27BD9
:067A7200DDE1AFCDCB7A8F
:107A7800DD4E24B1DD4625B0CDCB7ADD4E26B1DD15
:107A88004627B0F5DDE5CD417BDDE1F128053E6314
:067A9800DD9600DD770021
:107A9E00C9FD21DC9ECDBB7AD83CFDBE002004FD85
:107AAE007E01C9EBCDCB7AEBCDCB7A18E8626BCDEC
:067ABE00CB7A626BB7ED0C
:107AC40042CDCB7AED42C9DDE5C5D5E5ED4BD49E7B
:107AD400ED5BD69E2AD89EDDE1DD22D89EDDE1DD78
:067AE40022D69EDDE1DD6B
:107AEA0022D49EDDE1C9DD7E03DDB607DDB60BDDFE
:107AFA00B60F2810DDE5CDC27BCDC27BCDC27BCDD2
:057B0A00C27BDDE1017A
:107B0F000000110000DDE5CDE079CDE079CDE07921
:107B1F00CDE079AFB0B1B2B320011CD5CDCB7AC1D6
:067B2F00CDCB7ADDE1CDB3
```

Fig.13-50

```
:107B3500417BCD417BCD417BCD417BC9CDCB7AC549
:107B4500DD5E00DD5601DD4E02DD4603CD937BCDC6
:067B5500937BDDE5DDE598
:107B5B00DDE5CDE079DDE1CD937BCD937BCD937BE3
:107B6B00CDE079DDE1CD937BCDE079DDE1C1E5CDF4
:057B7B00CB7AD1AF211F
:107B8000646322DC9ECD9F7A0604DD7700DD23AF9F
:107B900010F8C9B7DDCB0016DDCB0116DDCB021620
:067BA000DDCB0316C9E570
:107BA600C521DF9E365A21009E06441807E5C521E9
:107BB600449E069036002310FBC1E1C9010408B7B4
:067BC600DDCB031EDDCB48
:107BCC00021EDDCB011EDDCB001E10EDDD09C97ED2
:107BDC00FEFF23C8E5CDBE25E118F4CDDB7BCDF946
:057BEC007BCDF97BCD0B
:107BF100F8797EFEFF20EFC9CDCB7ADD5E00DD2373
:107C0100DD5600DD23C9F5C5D5E5DDE521DF9E366D
:057C11000021049E119A
:107C1600409E010400EDB0DD21009E01040ACDC5A1
:107C26007B060ACDC57B3E11DD21009EDD5E44DD6F
:067C36005645DD4E46DD5F
:107C3C004647CDE079300206FFDD7340DD7241DD51
:107C4C007142DD70433D20DE21449E11909E014423
:057C5C0000EDB0DD2188
:107C61001C9ECD5D7ADD21AC9ECD5D7ADD21209E0D
:107C7100CDF07ADD21B09ECDF07ADDE1E1D1C1F127
:067C8100C9E52187D6CB06
:107C87006620 38CB5E2042CB56204CCB4E2056E1A7
:107C9700C9CD827CE52A009E0922009E21029E30E2
:067CA7007C1872E5C5ED3A
:107CAD004B14DCCD827C2A049E0922049EC1210640
:107CBD009E3064185A2A209E0922209E21229E3031
:067CCD0056184C2A249E0B
:107CD3000922249E21269E3048183E2A289E0922E6
:107CE300289E212A9E303A18302A2C9E09222C9E47
:067CF300212E9E302C182A
:107CF90022E52A0ADCC506064E0D10FD2A1C9E093E
:107D0900221C9EC1211E9E3012180834200D2334D6
:067D1900200923342005BF
:107D1F002334200135E1C9E521109E18E8E521083B
:107D2F009E18E2E5210C9E18DCE521889E18D6E509
:067D3F00218C9E18D0F11A
:107D4500E521349E18C9F1E521389E18C2F1E521D7
:107D5500309E18BBF53A09D7FE0128E3FE0428E654
:067D6500FE0528E9FE0600
:107D6B0028E5FE0728E1FE0828DDF1E5213C9E18F9
:107D7B0098F5D603CD917DF1C506004FCD827CC120
:067D8B00E521149E18839F
:107D9100E521189E8677308BC3177D980080960F5A
:107DA1000040422C0100A086000010270000E803DB
:057DB1002C000064003D
```

Fig. 13-51

```
:107DB60000000A0000000100FF0A0D312E204C4190
:107DC60053542043414C4C0A0D322E2053554D4DF1
:067DD6004152590A0D3371
:107DDC002E2052455345540A0D57484154204E55B8
:107DEC004D4245523F20FF0A0D415454454D5054CD
:067DFC0045442043414C08
:107E02004C5320FFA57D434F4D504C4554454420D3
:107E120043414C4C5320FFA57D0A0D4B204259543F
:067E2200455320524356B7
:107E28004420202020FFA57D4B2042595445532053
:107E380053454E5420202020FFA57D44434520462D
:067E48004C4F5720434E91
:107E4E00544CFF9C7D44544520464C4F5720434E86
:107E5E00544CFF9C7D42595445204F564552464C3A
:067E6E004F57FF9C7D52FE
:107E74004554582046652414D45532020FF9C7D5285
:107E840045545820425954455320202020FF9C7D439B
:067E94004F4D50524553312
:107E9A0053494F4E2025FF9C7D25204F46204259AD
:107EAA005445532041542039363030FFAD7D2520CA
:067EBA004F46204259541E
:107EC00045532041542037323030FFAD7D25204FBF
:107ED0004620425954455320415420343830 30FF15
:067EE000AD7D25204F4698
:107EE60020425954455320415420323430 30FFAD9E
:107EF6007D4E4F524D414C20444953434F4E4E45C3
:067F0600435420FFAD7D95
:107F0C00382052455458204F4E20312046652414D76
:107F1C004520FFAD7D4E4F20524553504F4E53459B
:067F2C002054494D4552AE
:107F320020FFAD7D4F54484552202020202020 94
:107F420020FF9C7DFFC9C9C9C9C9C9C9C9C9C9 55
:057F5200C9C9C9C9C93D
:00000001FF
```

HIGH SPEED MODEM

BACKGROUND OF THE INVENTION

The present invention relates to apparatus for communicating data over a telephone line; and more particularly, it relates to apparatus employing a communication protocol involving both higher-speed, half-duplex and lower-speed, full-duplex operation based upon data flow demands.

Communication of data over a telephone line is accomplished by devices that transform a typical two-level digital computer signal into a form suitable for transmission over the telephone network. For example, the two-level signal is converted into a two-frequency sequence of signals. The conversion involves modulation at the transmitting end of the line and demodulation at the receiving end of the line. Devices providing these modulation/demodulation functions are referred to by the acronym "modem".

A modem is typically inserted between a data terminal and the telephone line. A modem is, therefore, a two-port device having a first interface to the data terminal and a second interface to the telephone line. Control of the modulator/demodulator functions can be by a control circuit on either side of the interface to the data terminal. Control codes for modem operation may be provided from the data terminal to a control circuit via the interface. Typically, the control codes will be embedded in the serial data stream from the data terminal. A control circuit coupled to the interface receives the control commands and acts based upon them to generate control signals for the modulation/demodulation functions. Alternatively, the data terminal may generate the control signals for the modulation/demodulation functions.

In order to send digital data between transmitting and receiving locations, a carrier signal is modulated based upon the data values to develop a transmit signal. Telephone lines have a limited bandwidth for signal transmission. The term "bandwidth" refers to the range of transmit signal frequencies which can be passed without significant attenuation. The range of frequencies of a transmit signal, and thus the amount of bandwidth of the telephone line occupied, is dependent upon the baud rate at which data is being sent. As the speed of data transmission increases, the amount of available bandwidth occupied also increases.

Typically, data transmission rates over telephone lines will be 300, 1200, 2400, 4800, 7200 or 9600 bits per second ("bps"). At the fastest speed of 9600 bps, essentially the entire bandwidth is occupied by the transmit signal frequencies. For two way communication between data terminals, half-duplex operation is typically used. This involves each modem alternately placing its transmit signal on the line. At the slower speeds, less of the total available bandwidth is occupied. The total available bandwidth can be separated into upper and lower frequency bandwidths. By selecting separate carrier frequencies, the transmit signals will occupy separate bandwidths. This allows both transmit signals to be placed on the line at the same time for two way communication. Such communication is referred to as full-duplex operation.

The required communication speed is generally dictated by the data transmission demands of a particular application. For the transfer of files of data between data terminals, high speed data transmission is demanded to reduce the required time the telephone line is in use. For interactive communication between data terminals, full-duplex operation is desired. In some circumstances, there is the desire to both send data files and to have interactive communication. In such circumstances, the call connection often must be terminated and reestablished in order to change between operation protocols. Alternatively, time-consuming command exchanges must be made to reverse the communication roles or "turn the line around."

There is a need for higher-speed data transmission over dial-up telephone lines while retaining a full-duplex appearance at the data terminal interface. Further, there is a desire for error control along with maximum thruput and minimum echo character delay. However, economic considerations also are of concern.

Full-duplex, 9600 bps communication can be achieved using echo cancellation per V.32 standard. This solution is expensive because of the complex apparatus involved. Other approaches include fast poll, half-duplex operation using a single channel multiplexer in accordance with the V.29 standard. This operation involves line turn-around to get a minimum echo delay but does not achieve maximum thruput with error control. Alternatively, slow poll, half-duplex operation can be used but minimum echo character delay is not achieved.

The present invention economically provides the desired higher-speed data transmission and satisfies the full-duplex appearance, error control and minimum echo character delay requirements.

SUMMARY OF THE INVENTION

In one aspect of the present invention, data transmission automatically changes from lower-speed, full-duplex operation to higher-speed, half-duplex operation based upon data transmission demands. The transmission mode transparently changes from a lower-speed, interactive mode to a higher-speed data transmission mode as data transmission demands dictate. In accordance with this aspect of the present invention, during the handshake sequence between calling and answering modems, operation is in the lower-speed, full-duplex mode. When a large amount of data is to be sent, as in a file transfer, transition is made to the higher-speed mode.

In accordance with the present invention, a transmit data buffer is monitored. The lower-speed, full-duplex transmission mode is maintained until the buffer contains a predetermined number of characters. Operation then switches to higher-speed transmission. The transmitter is selectively operable in either a lower-speed, full-duplex mode or a higher-speed, half-duplex mode.

In another aspect of the present invention, data communication automatically changes between lower-speed, full-duplex operation and higher-speed, half-duplex operation based upon data transmission demands during a communication. In accordance with this aspect, during interactive communication, operation is in the lower-speed, full-duplex mode. When a large amount of data is to be passed, operation is changed to the higher-speed, half-duplex mode.

In yet another aspect, the present invention provides for incremental changes in the speed of data transmission based upon determinations of data transmission error. In accordance with this aspect, data transmission speed is adapted to the quality of the telephone line as determined by the extent of data retransmissions. Frequent data retransmission directs a fallback in speed. As the number of errors is reduced, the data transmission can fall-forward in speed.

BRIEF DESCRIPTION OF THE DRAWINGS

A written description setting forth the best mode presently known for carrying out the present invention, and of the manner of implementing and using it, is provided by the following detailed description of an illustrative embodiment represented in the attached drawings herein:

FIGS. 3 and 4 combined provide a functional diagram of the modem more generally diagrammed in FIG. 1;

FIGS. 5a-b, 6a-c, 7a-b, 8a-b and 9a-b are detailed schematic diagrams of a modem implementation of the present invention;

FIGS. 13.1 to 13.51 are a listing of the program ROM contents of the implementation of FIGS. 5-9.

DETAILED DESCRIPTION OF AN ILLUSTRATIVE EMBODIMENT

Figure 1:
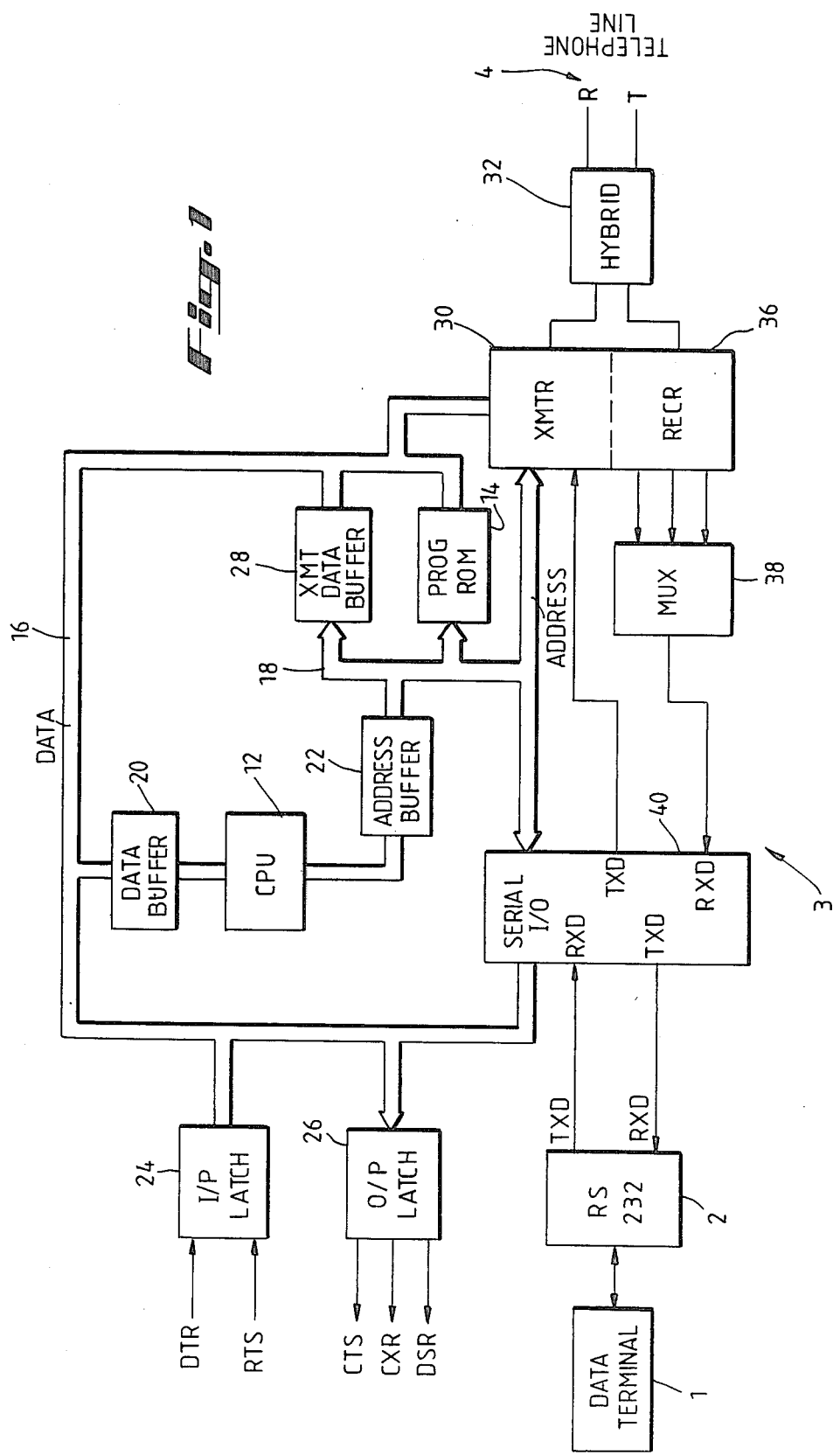
FIG. 1 is a generalized block diagram of a modem in accordance with the present invention.

Referring to FIG. 1 of the drawings, there is presented a generalized functional block diagram of apparatus for implementing the present invention. The apparatus provides for communication of data and control commands over a telephone line to a remote site. The apparatus of FIG. 1 provides a data communication unit which generally includes a data terminal 1, an RS-232 interface 2 (port 1) and a modem 3 coupled by a hybrid circuit (port 2) to the ring (R) and tip (T) conductors of a telephone line 4. The RS-232 interface refers to a standard established by the Electronics Industries Association which defines the signal interface couplings between data terminal equipment and data communications equipment employing serial binary data interchange. As used herein, the term "data terminal" refers to any external device having an RS-232 interface for providing or receiving digital data. In particular, the data terminal may be a computer, including any of the so-called "personal computers." However, the data terminal may be a printer or an information display system. Further, a parallel interface may be used and such would be fully functionally eqivalent to the serial interface in the context of the present invention.

The general function of the modem 3 is, of course, to send and receive digital data. The modem accepts digital data from a data terminal and places a transmit data signal on a telephone line for communication to a remote modem coupled to a data terminal. The transmit data signal is an analog signal obtained through modulation of a carrier by a digital input. During data communication to a remote modem, the transmit data signal will contain data from the data terminal which has been encoded into the appropriate signal structure according to the applicable Bell Telephone or CCITT standards. It is to be understood that the modem also places signals on the telephone line that allow the answering modem to link with the originating modem. This involves communication of a number of parameters that allow the receiver to establish carrier detection, adjust automatic gain control circuits, establish timing synchronization, converge and adapt the equalizer to the initial line conditions (i.e., a training sequence), and synchronize the descrambler. Also, in the initial linking procedure, referred to in the art as the "handshake" sequence, tones will be placed on the telephone line.

In addition to accepting digital data from the data terminal for communication, i.e., TXD, and providing received digital data to the data terminal, i.e., RXD, there may be an exchange between the modem and the data terminal of various control signals such as data terminal ready (DTR), request to send (RTS), data set ready (DSR), clear to send (CTS) and Carrier (CXR). The various exchanges between an originating modem and an answering modem in the handshake sequence and in linking are well known to those of skill in the modem art. Similarly, the various exchanges between a modem and the data terminal to which it is coupled including the above-mentioned DTR, RTS, DSR, CXR and CTS signals are also well-known to those of skill in the modem art.

In the modem shown in FIG. 1, a control circuit in the form of a processor is provided to direct the overall operation of the modem and execute a sequence of instructions to control the various elements of the modem. The processor includes a central processing unit (CPU) 12 and a program read only memory (ROM) 14. The program ROM 14 contains instructions for directing the various operations necessary to effect the overall operation of the modem. The CPU obtains instructions from the ROM 14 and interacts with the various modem elements over a data bus 16 and an address bus 18. CPU 12 is coupled to the data bus by a data bus buffer 20. Similarly, the CPU is coupled to the address bus by an address bus buffer 22. An input latch 24 is also coupled to the data bus and receives inputs to be obtained by the CPU during the course of its operation. Among the inputs are those of DTR and RTS received from the data terminal through the RS-232 interface. An output latch 26 couples to the data bus and permits the CPU to place output information to elements requiring command code inputs. Also, among the outputs from the CPU handled by the output latch 26 are the DSR, CXR and CTS outputs to the data terminal.

As will be appreciated, the control circuit functions of data control and modem control may be assumed by the data terminal. For example, the CPU in the data terminal may in accordance with appropriate software instructions provide some or all of the functions of data and modem control. Alternatively, a separate circuit, peripheral to both the data terminal and the modem, may be interconnected to provide the control circuit functions.

Further, while the data terminal 1 in the illustrative embodiment provides a local site data source, data for communication may be otherwise provided. Similarly, while communication may be to a remote modem coupled to a remote data terminal serving as a remote data source and receiver, other data receivers are contemplated. For example, the remote modem may be interfaced to a remote data receiver in the form of an information display system such as a printer or character generator for a display device. Moreover, a remote data receiver may include data transmission capability, for communication back to the local site.

The modem 3 in FIG. 1 further includes a transmit data buffer 28 receiving digital data from the data terminal for communication. The transmit data buffer may be physically located on either side of interface 2. Also, the buffer can be within the data terminal or in an interconnected peripheral. The data is routed through serial I/O device 40 onto the data bus 16. Digital data from the transmit buffer is provided via serial I/O device 40 to a transmitter 30. The transmitter is selectively operable to transmit in either a higher-speed, half-duplex mode or in a lower-speed, full-duplex mode. Selection of the particular mode of operation is under the direction of the processor. The transmitter output is coupled to the ring and tip conductors of the telephone line by a hybrid circuit 32. Coupled to the hybrid circuit 32 is a receiver 36. The receiver is capable of receiving at various data rates and in various modes. Selection of one of the receiver outputs is made by a multiplexer 38. The serial interface circuit 40 under the direction of the processor provides received data for passage through the RS-232 interface to the data terminal.

Although the operation of an implementation of the structure generally diagrammed in FIG. 1 will be presented, a summary overview of the operation of the diagrammed modem should be mentioned to aid in understanding the description which follows. In operation, the transmit buffer holds data from the data terminal. The transmitter receives data from the transmit data buffer and places a transmit data signal on the telephone line. The transmitter is selectively operable in either a lower-speed, full-duplex mode or a higher-speed, half-duplex mode in response to a mode control command from the processor. The processor monitors the amount of data being held in the transmit data buffer and produces the mode control command to the transmitter to establish the mode of transmitter operation based upon the amount of data in the transmit data buffer. If the data transmission demands of the data terminal are such that the transmit data buffer does not fill rapidly enough to require the higher-speed operation, the processor selects the lower-speed, full-duplex mode of transmission. However, with such operations as file transfers or full-screen applications when data is required to be rapidly transmitted, the lower-speed mode cannot prevent the buffer from rapidly filling. When the processor determines that a predetermined number of characters is reached in the transmit data buffer, it directs the transmitter to enter the higher-speed mode of operation. When the data transmission demands decrease, the processor so determines and can direct the transmitter to enter the lower-speed mode. Also, during the connect sequence between an originating modem and an answering modem, the initial exchange of link parameters and other required control frame exchanges proceeds with the transmitter being directed to operate in the lower-speed, full-duplex mode. When the modems have been linked and data communication ensues, the processor directs the transmitter to operate in the higher-speed, half-duplex mode.

Figure 2:
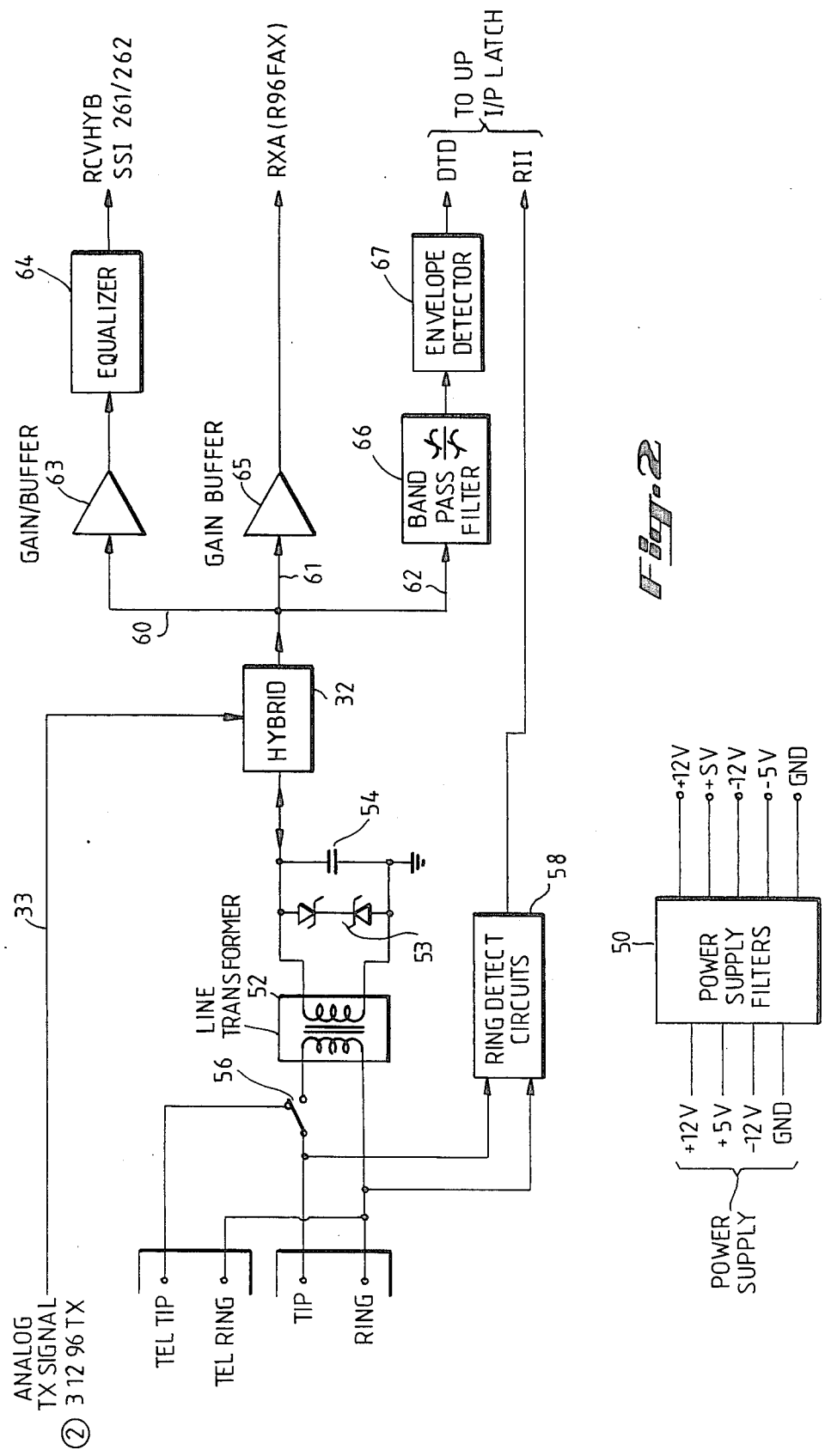
FIG. 2 is a functional diagram of the telephone line interface.
Figure 5B:
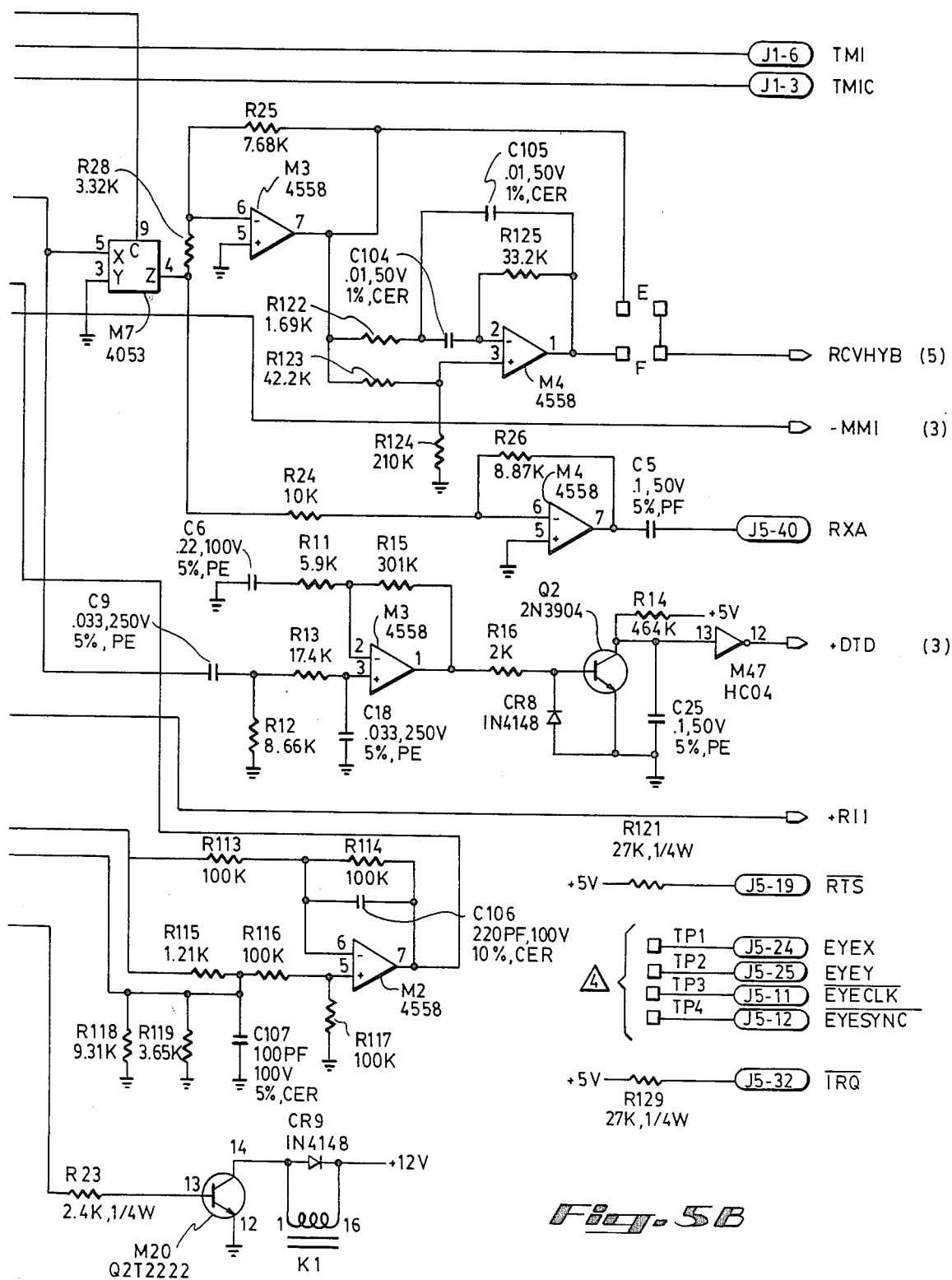

Referring next to FIG. 2, there is presented a functional diagram of the telephone line interface and power supply circuits. The power supply (not shown) is conventional and provides voltage levels of +12, +5, −12, and ground. The power supply output is applied to power supply filtering circuits to obtain the voltages for operating the various circuit elements. The hybrid circuit 32 is shown to receive the analog signal to be placed on the telephone line. This signal is provided over conductor 33. The analog signal is applied to an isolation line transformer 52 having protective diodes 53 and filter capacitor 54 connected across its terminals. The transformer is coupled to the tip and ring conductors of the telephone line connector by a hook control relay 56. Also connected to the tip and ring conductors is ring detect circuit 58.

An incoming signal is routed through the line transformer and hybrid circuit to separate signal paths 60, 61, and 62. Signal path 60 includes a gain stage 63 and equalizer circuit 64. Signal path 61 includes gain stage 65. Signal path 62 includes bandpass filter 66 and envelope detector 67. The outputs of the signal paths are variously applied to the circuitry shown in FIGS. 3 and 4.

With reference now to FIGS. 3 and 4, there is presented a more detailed functional diagram of the modem which is generally diagrammed in FIG. 1. The embodiment being described utilizes a microprocessor as the control circuit. Accordingly, there is provided a data bus 70, an address bus 72, and the control bus 74. The CPU 80 is coupled to the data bus by data bus buffer 82 and coupled to the address bus by address buffer 84. Coupled to the data bus are input latches 86, 88, and 90. Latch 86 accepts and holds signals from the data terminal interface. Latch 88 holds various internal modem signals. Latch 90 holds various inputs from the front panel switches. The latch enable signals are provided from decoding circuits 92 which is coupled to the control bus 74 and address bus 72.

The program for execution by the processor is contained in program ROM 94. This ROM is addressed by addresses output from the CPU over the address bus 72, and the ROM contents are provided to the CPU over data bus 70. The selection of the ROM is also under the direction of the CPU through decoding circuits 92.

Digital data from a data terminal for communication is placed in the transmit data buffer which includes random access memories 96 and 98. Additional random access memory storage is provided by random access memory 100. This memory is a nonvolatile memory that stores information such as telephone numbers and other information which is historical. A battery circuit 102 maintains the contents of RAM 100 during the time power is off. Also, during the time of resetting the processor, battery circuits 102 disables RAM 100.

Turning now to FIG. 4, the higher-speed transmit and receive functions are performed by a combined transmitter/receiver device 104. This device is suitably an R96FAX system available from the Semiconductor Products Division of Rockwell International Corporation. Device 104 is coupled to the data and address busses in order to receive directions as to the configuration for the operation desired. Serial digital data for serving as the modulating signal is provided to device 104 on the TXD line 105. The serial digital data is routed through a multiplexer 106. Referring again to FIG. 3, the TXD signal is obtained from serial input/output device 110 through switch 112. Device 110 is coupled to the data bus and receives frames of data from the data buffer random access memories 96 and 98 under the direction of the CPU. Digital data from the data terminal is provided through the RS-232 interface and applied serially to device 110 for conversion to parallel form. The CPU directs the parallel-form data from device 110 to data buffer random access memories 96 and 98. The CPU monitors the data frames being placed in the data buffer and keeps a running tabulation of the amount of data being placed in the data buffer. In a synchronous mode of operation of the transmitter, the TXD serial data stream from the RS-232 interface is passed around device 110 over line 114 and applied through switch 112 to multiplexer 106. It is only in the asynchronous mode of operation that the CPU directs data to be communicated through the serial input/output device 110.

Returning to FIG. 4, the transmitter further includes a lower-speed, full-duplex transmit and receive device 116. The serial data stream TXD is applied to the lower-speed transmitter/receiver device 116 from multiplexer 106 over signal path 118. Control of the lower-speed device 116 is provided by the CPU. Configuration and control instructions are placed in output latch 120 and provided to device 116.

The R96 FAX system implementing device 104 is a slow turnaround device. The use of the full-duplex device 116 provides fast carrier acquisition and link management. The fast carrier acquisition facility in combination with the high data throughput facility provides the desired high-speed data transmission over dial-up telephone lines and a full-duplex appearance at the data terminal interface.

As further shown in FIG. 4, the modem includes a dual tone multifrequency (DTMF) generator 122 which provides tones for dialing. Device 122 is controlled by the CPU with control commands placed in output latch 124. The analog transmit signal from the lower-speed transmitter 116 is applied to an amplifier 126. The output from tone generator 122 is also provided as an input to amplifier 126. The output of amplifier 126 and the analog transmit signal from higher-speed transmitter 104 are applied to a buffer amplifier 128. The output of amplifier 128 is the modem transmit signal applied over line 33 to hybrid circuit 32 in FIG. 2.

Further included in FIG. 3 is a set of drivers 130 providing signals to the RS-232 interface. Certain of the signals provided to the drivers are obtained through output latch 132 which is loaded through the data bus.

Another output latch 134 connected to the data bus provides controls for the front panel light-emitting diode displays 136.

Referring again to FIG. 2, the receive signal paths 60 and 61 provide the transmit signal from a remote modem to the lower-speed and higher-speed receiver portions, respectively. The signal RXA shown in FIG. 4 is being applied to device 104 which yields the receive signal on line 140. This signal is applied in FIG. 3 to multiplexer 142. When selected by multiplexer 142, the signal on line 40 is applied to the serial input/output device 110. The CPU may obtain received data from device 110 or direct passage of the serial data onto switch 144. The output from switch 144 is applied through driver 146 to the RS-232 interface as the receive signal RXD.

Referring again to FIG. 4, the receive signal from signal path 60 in FIG. 2 is applied to the lower-speed device 116. The receive signal from device 116 is provided over line 148 to multiplexer 150 in FIG. 3. The output of multiplexer 150 is applied to the input of the serial input/output device 110. The CPU acquires the receive signal data to descramble it and provide it back through device 110 to line 143 to become the RXD output to the data terminal interface.

A counter timing circuit 160 is controlled by the CPU. Device 160 includes timers which can be turned on or off by the CPU. Device 160 generates the various baud rate timing signals for the serial input/output communication device 110 from the T0 output over line 161. Another timer in device 160 provides a signal from output T1 over line 162 to multiplexer 164. When line 162 is selected by the multiplexer to be applied to device 110, the signal is provided to device 110.

Referring now to FIGS. 5–13, there is presented a detailed implementation of the modem diagrammed in FIGS. 1–4. This implementation corresponds to the Racal-Vadic Model 9600 VP modem product.

The 9600 VP is a triple speed switched network modem that a user can operate at 9600 bps, 1200 bps, or 300 bps asynchronously, as well as 9600 bps, 7200 bps, 4800 bps, or 1200 bps synchronously. The 9600 VP provides full-duplex terminal operation in all asynchronous modes and 1200 bps synchronous. Operating synchronously, the 9600 VP provides half-duplex terminal operation at 9600 bps, 7200 bps, or 4800 bps. Modem operation includes a link protocol which involves dynamically switching between a full-duplex, lower-speed mode for data acknowledgments and interactive transfers, and a half-duplex, higher-speed mode for data transfer. If the modem can keep its transmit data buffer from filling using the lower-speed mode, it will not go to high speed. However, in a screen oriented application, or for file transfers, the modem cannot keep the buffer from filling and as the predetermined number of characters is reached, the higher-speed mode is entered, emptying the buffer at 9600 bps, while the far end transmitter buffers its data. The modem then drops back to the lower-speed mode for acknowledgement. This operation repeats based on data transmission demand. Switching between modes is transparent to users in all cases where the transmitted data is distributed unevenly or asymetrically (i.e., more data from one end than from the other end). Asymetrical distribution of data is typical of most applications, except for some mainframe file transfer applications and multiplexer applications.

CCITT V.29 and V.27 modulations (9600, 7200, 4800 and 2400 bps) are used for the higher-speed, half-duplex mode, and Bell 212A is used for the full-duplex, lower-speed mode. The modem also conforms to Bell 212A and 103 standards. The modem includes, among other features, full-duplex emulation, a superset MNP error correction protocol, data compression/decompression, automatic speed detection, as well as fall-back and fall-forward operation from 9600 asynchronous mode, speed conversion, auto dialer command sets, front panel operations, and auto answer/originate. Automatic origination is accomplished by an integrated automatic dialer operated from the data terminal keyboard, the modem front panel, or communication software for unattended operations.

The modem is packaged in a VIP II standalone case having membrane switches, an LED display, and jacks for detachable interconnection of programmable line connections, RS-232 interface, and power cables.

Connection of the modem to the Data Terminal Equipment (DTE) is through an EIA RS-232 interface.

The interface connections according to connector pin number are as follows:

| PIN | SIGNAL |
|---|---|
| 1 | Chassis (Protective) Ground (FG): This is protective ground, tied to the AC power ground of the terminal equipment and is isolated from the signal ground (Pin 7; SG) unless optionally strapped. |
| 2 | Transmitted Data (TXD): (To Modem) Signals on this line are generated by the Data Terminal Equipment and transferred to the modem for transmission to the Remote Data Terminal equipment. The modem will transmit accept data from this line when an ON condition is present on the CTS line. |
| 3 | Received Data (RXD): (From Modem) Signals on this line are generated by the modem receiver in response to signals transmitted by the remote modem except when the modem is in a test mode. This line is clamped to "MARK" whenever the CXR circuit is OFF. |
| 4 | Request to Send (RTS): (To Modem) The signal on this line is normally generated by the DTE for use in half-duplex modems. In synchronous 9600, 7200, 4800 bps modes, an ON condition of the circuit is an indication to the local modem that the DTE wishes to send data. After the RTS circuit is turned ON, the DTE waits for an ON condition of the CTS circuit before starting transmission. In 212/103/9600 full-duplex operation, if RTS circuit is ON, CTS will go ON. |
| 5 | Clear to Send (CTS): (From Modem) An ON condition of the CTS line indicates to the terminal equipment that the modem will transmit any data which is present on the TXD line. CTS is turned ON in response to an ON condition of the RTS line from the DTE. |
| 6 | Data Set Ready (DSR): (From Modem) In synchronous modes, this signal indicates the line status of the modem. The ON condition of this line indicates that the modem is connected to the telephone line (OFF-HOOK) and is capable of transmitting and receiving data signals. Both DSR and CTS are required to be ON to transmit data. |
| 7 | Signal Ground (SG): Common ground reference point for all interface circuits. |
| 8 | Carrier Detect (CXR): (From Modem) Informs the DTE that the modem is receiving a data signal suitable for demodulation. |
| 9 | Testing Voltage (+V): (V = 12.5 ± 2.5 V) |
| 10 | Testing Voltage (−V): (V = 12.5 ± 2.5 V) These signals provide test points to verify the presence of power in the modem. |
| 11 | No Connection |
| 12 | No Connection |
| 13 | No Connection |
| 14 | No Connection |
| 15 | Serial Transmit Clock (SCT): (From Modem) This digital interface line is associated with the high or medium speed synchronous format when the transmit clock is set for internal timing. The signal on the SCT is a square wave and is used to provide the DTE with a signal element of the transmitted data (TXD) circuit. This signal is turned OFF when in asynchronous mode and turned ON when in synchronous mode. The first signal element of the transmitted data signal should be presented by the DTE on a positive (OFF to ON) transition of SCT which occurs after the CTS circuit has turned ON. The transmitted data is sampled by the modem on negative transitions of SCT. |
| 16 | No Connection |
| 17 | Serial Receiver Clock (SCR): (From Modem) This interface circuit is associated with the synchronous format in the high or medium speed mode. The squarewave signal on this circuit is used to provide the DTE with receiver timing information for the RXD circuit. This signal is turned OFF when in Async mode and turned ON when in Sync mode. The ON to OFF (negative-going) transition on circuit SCR indicates the center of each signal element on the RXD circuit. |
| 18 | No Connection |
| 19 | No Connection |
| 20 | Data Terminal Ready (DTR): (To Modem) Control signal used to prepare the modem for connection to the communications channel and maintain the connection once established. In automatic answering applications, the modem will connect to the line upon receipt of the trailing edge of the ringing signal if DTR is ON. DTR may be forced on internally regardless of interface voltage by programmable option. DTR must be turned ON for the modem to automatically originate or answer a call. |
| 21 | No Connection |
| 22 | Ring Indicator (RI): (From Modem) The ON condition of this line indicates that a ringing signal is being received by the modem. The ON condition is approximately coincident with the ON segment of the ringing cycle. When the telephone line is OFF-HOOK, or when ringing stops, the RI line will turn OFF. |
| 23 | No Connection |
| 24 | External Serial Transmit Clock (SCTE) (To Modem) Synchronous operation requires signals on this line to provide the modem transmitter with signal element timing information from the terminal when the external transmitter timing strap option is selected. The ON to OFF transition of this circuit should nominally indicate the center of each signal element on the TXD circuit. |
| 25 | No Connection |

The modem operates in five basic states: Idle, Data, Dialing, Interactive, and Test. These states can be entered by various commands from the Data Terminal Equipment (DTE), the modem front-panel keyboard, or through automatic operation.

The Idle State is the power-up state of the modem. Pressing the /RESET/ key at any time will return the modem to this state. When in the Idle State, the modem is ON HOOK, and will automatically answer an incoming telephone call. It is also prepared to respond to front panel or DTE comments. A phone plugged into the rear panel "TelSet" jack is connected to the phone line. The Idle state is entered from the Data state on loss of DTR or receipt of the on line disconnect code, loss of received carrier in 212 or 103 mode, or a specified number of consecutive unanswered link requests in 9600 mode. It is also entered from the Interactive State upon expiration of the activity timer or when the Idle Command is issued.

The Data State is the on-line communications state of the modem. This state is entered from the Idle state through the auto answer function in response to a ringing signal on the phone line or when the /DATA/ or /ANS/ keys are pressed. The Data state is entered from the Dialing state at the completion of any log-on sequences. The modem is equipped to automatically detect that a connection has been established with another 9600 VP, a 212A or 103. The modem will automatically identify a remote 9600 VP. The handshake protocol is depicted in the line drawings in FIG. 14. There are four types of modem handshakes and one error control handshake.

In asynchronous Originate mode, the modem attempts its proprietary handshake designed to identify another 9600 VP. If this handshake fails, the modem automatically attempts a 212A handshake. If this fails, the modem attempts a 103 handshake, if this fails, the modem reports "failed call" and disconnects the line. The auto answer mode, the 9600 VP attempts its own 9600 VP handshake first. If this fails, a 212A handshake is attempted. If this fails, the modem attempts a 103 handshake, and if this fails, the modem disconnects the line. No call progress messages occur on the auto answer side.

In the synchronous originate and answer modes, the modem attempts a proprietary handshake at 9600, 7200 or 4800 bps as indicated by the speed key LED. The 1200 bps synchronous handshake is the Bell 212A standard.

An error control protocol is entered by completing the proprietary 9600 VP asynchronous handshake (212A handshake with scrambled SPACE) with another 9600 VP. The Error Control Mode provides for synchronous data packets operation and enables selective ARQ, dynamic fallback/fallforward, and data compression with an outstanding packet window of 12.

In the Interactive state, commands are issued to the modem to control its operation or to configure its operating characteristics. There are two modes within this state, the terminal interactive mode and the front panel interactive mode. The modem stores the last interactive mode, and uses this memory in order to respond appropriately for auto answering. Commands and response are transmitted over the RS232 leads to the modem. There are two versions of this mode available. (1) The Vadic interactive mode and (2) the "AT" command mode.

The Vadic interactive mode is entered from the Idle state when the characters (!E)(CR) are received from the DTE. If a call is initiated from the interactive mode, and you receive loss of received carrier, or DTR or receive the On-Line Disconnect code, you leave Interactive Mode and enter Idle Mode. Upon "failed call", you remain in Interactive Mode. You remain in the Vadic Interactive Mode until the two-minute inactivity timeout. The Vadic options take precedence over the "AT" options, and continue to do so in all other modem states (i.e., Idle, Data, Test, etc.)

The "AT" command mode is entered from the Idle state when the characters "AT" are received from the DTE. When in the "AT" command mode, the "AT" mode take precedence over the Vadic mode, and continues to do so in both command and data states. Either the Vadic or the "AT" modes can be selected any time the modem is in the Idle or Command State by sending the appropriate commands to it. Once the "AT" command set is entered, the modem must return to the Command mode before the Vadic Interactive Mode can be entered.

In the front panel interactive mode, commands are issued by pressing the keys on the front panel. The responses are displayed on the DTE.

In the Dialing state the modem executes the dialing instruction stored in its dial-instruction register. The dial command is placed there by the Dial and Dial Stored Number terminal commands as well as by depressing the /REDIAL/ or the /DIAL/ Memory Location front panel keys. The Dialing state is entered from the Idle state by pressing the front panel /DIAL/ (Stored Number Memory Location) and /ENTER/ keys or /REDIAL/ keys. The dialing state is also entered from the Vadic Interactive Mode through the Dial, Dial Stored Number, and Redial Interactive commands. The Vadic dialer sequence may be aborted through the front panel /RESET/ command or by entering any character from the DTE. This state may also be entered from the AT Interactive mode through the ATD_ (CR) command. The "AT" dialer command may be aborted by sending any character to the modem from the DTE before the call is completed. If dialing is aborted from the DTE or the call fails, the modem returns to the state that invoked the dialer.

While executing the dialing instruction, the 9600 VP reports Vadic call progress to the DTE if in Vadic mode. The Vadic call progress messages include: Dialing, Busy!, disconnect, Ringing, No Dial Tone, Answer Tone, Error Control, Selected Speed Unavailable, On-Line, On-Line 300, On Line 1200 and On Line 9600.

In making a call, after dialing the last digit of the phone number portion of the dialing instruction, the modem will wait up to 60 seconds for valid carrier. If valid carrier is not received within this time, a "FAILED CALL" message will be displayed and the modem will return to the state that invoked dialing.

The Test state encompasses the many test functions provided to enable an operator to locate a failure in the data communications link via Analog or Digital Loopbacks. The Test state may be entered from Idle state and Data state though the front panel keys and from Vadic mode or from the Terminal Interactive state through the test commands in Vadic mode only.

The front panel of the modem consists of ten LEDs and a 12-position keypad with eight additional LEDs. The ON/OFF condition of the LEDs refers to the operational state of its respective switch. The keypad has most keys serving dual functions. The /DIAL/ key shifts all keys to their numeric functions. The keys are restored to nonnumeric function by the /ENTER/ key. The /DIAL/ key can only be followed by a one or two digit memory location number of stored phone numbers which is followed by the /ENTER/ key. The /DIAL/ and /REDIAL/ keys cause call progress messages to be put out to the DTE at the speed and parity of the last auto baud. The call progress messages are not sent to the DTE when using the /REDIAL/ or /DIAL/ keys with the synchronous LED ON, nor are they sent when manually originating or answering a call.

The ANS LED indicates the status of the two answer modes, auto answer and manual answer. With Auto Answer /ANS/ key LED ON, the modem will automatically answer the phone line assuming DTR is present or forced. /ANS/ key LED OFF means the modem will not answer the phone. In the manual answer mode, the modem that will be the answer side must have the /ANS/ key LED ON; the originate side modem should have its /ANS/ key LED OFF.

The modem will display the following EIA interface parameters with LED indicators:

| | |
|---|---|
| EC | ERROR CONTROL LED flashes from ON to OFF. The Error Control LED is ON when the modem is hooked up in error control mode. This LED flashes OFF with each retransmission of data. During diagnostics, the EC LED is normally OFF and flashes on with errors. |
| TXD | TRANSMIT DATA (flashes when transmitting "DATA"). |
| RXD | RECEIVED DATA (flashes when receiving "DATA"). |
| HS | HIGH SPEED asynchronous: OFF = 103, 1200; ON = 9600, 7200, 4800 or 2400 bps; synchronous: OFF = 1200, ON = 9600, 7200, 4800 bps. |

-continued

| | |
|---|---|
| CTS | CLEAR TO SEND (ON = CTS raised). |
| DSR | DATA SET READY (ON - Modem Off-Hook, computer system interface or test modes; OFF=Idle or interactive). |
| DTR | DATA TERMINAL READY (ON = Automatic Operation Enabled). |
| RI | RING INDICATOR follows the detected Ring Envelope. |
| CXR | CARRIER DETECT (ON = Carrier Received or computer system interface). |
| PWR | POWER (ON = Power ON). |

The functions of the front panel key switches are:

| | |
|---|---|
| REDIAL 1 | This key places the modem into Interactive Mode and redials the last number dialed automatically. The call progress messages are put to the DTE at the last auto baud speed and parity. This key can be used to dial when in Sync mode. However, call progress messages are not set to the DTE. When in numeric mode, this key enters the digit 1. |
| DIAL 2 | This command may be issued when the modem is in the Idle State. This key can be used to dial a memory location and hook up synchronously if the SYNC LED is ON. There are no call progress messages sent when the Sync LED is ON. The front panel keys are shifted to numeric and the memory address of a dialing instruction (1–15) is keyed in and followed by ENTER to start the dialing. If the Sync LED is OFF, the address prompt and address number as well as the telephone number are displayed on the DTE and dialing beings. The call progress messages: "Dial Tone", "Dialing", "Ringing", "Busy", "On Line" ↑, "On Line 300", "On Line 1200", "On Line 9600", "Ans Tone", "Speed Selected Unavailable", "Error Control", "Disconnected", and "Failed Call" are displayed as appropriate. When in numeric mode, this key enters the digit 2. |
| ALB 3 | When in the Idle Mode, pressing this key puts the modem into the Analog Loopback Test Mode, busies out the telephone line and lights the ALB LED indicator. When in numeric mode, this key enters the digit 3. |
| DLB 4 | When the data mode, pressing this key puts the modem into the digital loopback test mode and lights the DLB LED. In addition the DLB LED will go ON when an RTRT is received. The Digital Loopback Test has two modes. They are Local Digital Loopback, entered when the speed key indicates 300 bps (SPEED key LED OFF) and Remote Digital Loopback, which is conducted at 1200 (SPEED key LED red ON). When in numeric mode, this key enters the digit 4. |
| SELF TEST 5 | When in the Data or Test Modes, pressing this key enables the self-test circuitry and lights the SELF TEST indicator. This circuitry generates and detects a testing pattern and if an error occurs, the EC LED indicator flashes. After self-test is enabled, pressing this key again ends the self-test, while the modem remains in its current mode (Data, ALB, or RDLB). When in Numeric Mode, this key enters the digit 5. |
| RESET | From any mode, this key activates a hardware reset which causes the modem to go directly into the Idle Mode. If the modem was last in Vadic mode, the modem could auto answer the next call. If last mode was "AT", then "AT" messages are output. |
| VOICE DATA 6 | This key puts the modem in either Data or Voice Mode. The modem powers up in Voice Mode. When the LED is ON, this indicates the modem is attached (OFF HOOK) to the phone line. Pressing the key switches the modem to Data Mode, lighting the data LED indicator, and the DSR LED. When in numeric mode, this key enters the digit 6. |
| SPEED | This key selects the speed the modem will attempt to establish a manual connection or test. When dialing from the DTE, the last auto baud speed will be reflected by the SPEED key LED when the modem is in Idle or Interactive mode. The SPEED key reflects the data line speed when on-line. The SPEED key LED light will go off when 300 bps is selected. The LED will go red if 1200 bps is selected and will go green if the 9600 bps speed is selected. In synchronous mode, the SPEED key LED light will go OFF when 1200 bps is selected, Red when 7200/4800 is selected, and green when 9600 is selected. When in numeric mode, this key enters the digit 7. |
| ANS 8 | Answer Mode Key. The modem powers up in the Voice (ON-HOOK)/Originate Mode with the ANS key LED is ON. To manually answer a call after it has been established, press the DATA key with the ANS key LED lit and the modem will manual answer. To auto answer, the DTR LED should be ON, Option 4 is set to Code 1 or 3, and the ANS key LED is ON when the modem is ON HOOK. Upon receiving a ring indicator signal, the modem automatically gives OFF-HOOK and sends answer tone. When in numeric mode, this key enters the digit 8. |
| SYNC 9 | From Idle, Interactive, Dialing and test States, this key causes the current data format, modulation, speed and communications mode to toggle between SYNC and Async. The SYNC LED lights when in SYNC mode. This key automatically updates Option 14. Changes in Option 14 automatically update this LED after RESET has been depressed. When in numeric mode, this key enters the digit 9. |
| 0 | When in numeric mode, this key enters the digit 0. |
| ENTER 8 | When in the front panel interactive mode, this key indicates the end of a memory address key. |

In a view of the description of FIGS. 1-4, a detailed description of the schematic diagrams of FIGS. 5-9 is unnecessary. However, to indicate the correspondence between FIGS. 1-4 and 5-9, the following description is provided.

Figure 6B:
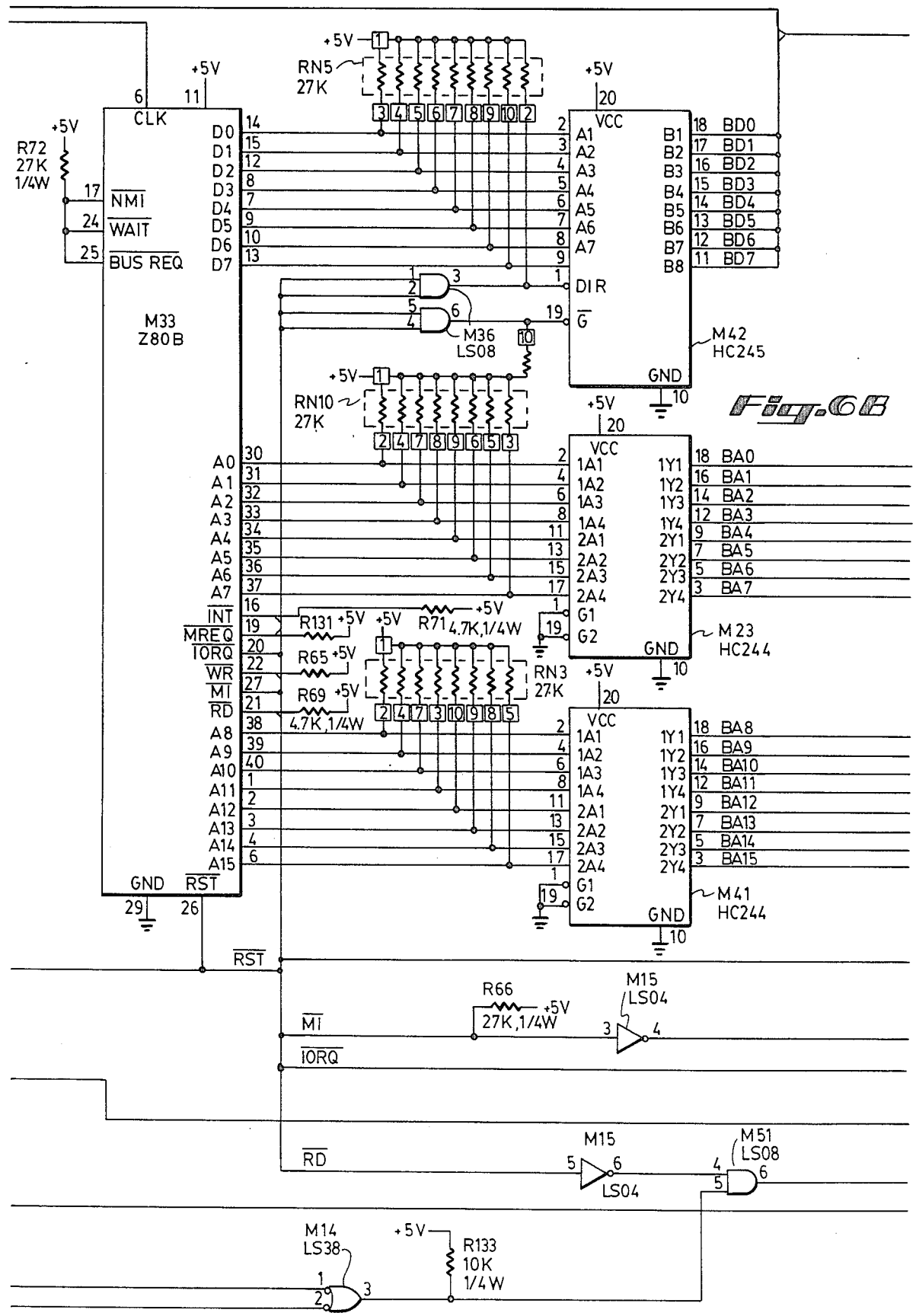
Figure 6C:
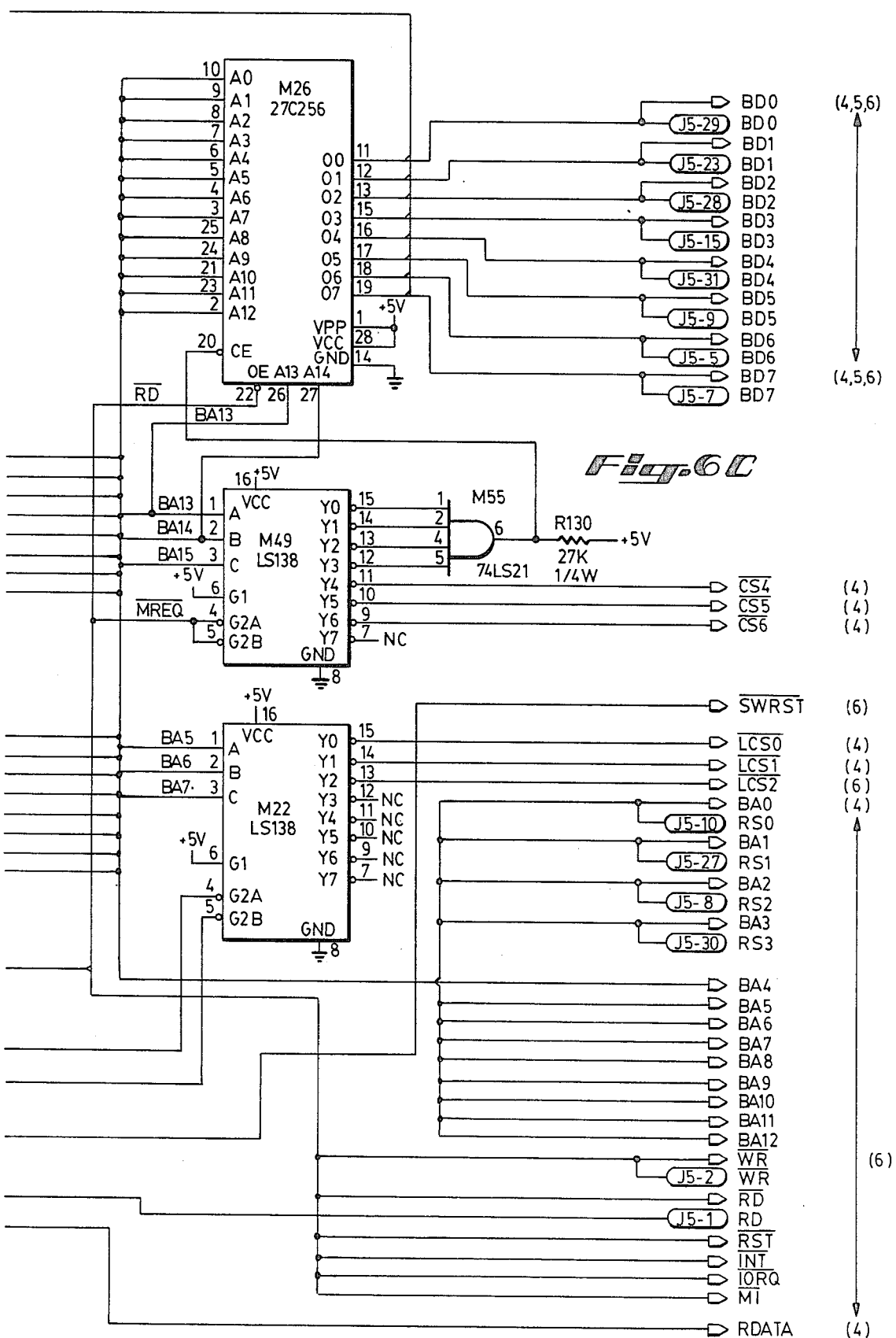

FIG. 6 corresponds to the diagram of FIG. 2, including the power supply, telephone line interface/hybrid, and received signal paths.

Figure 7A:
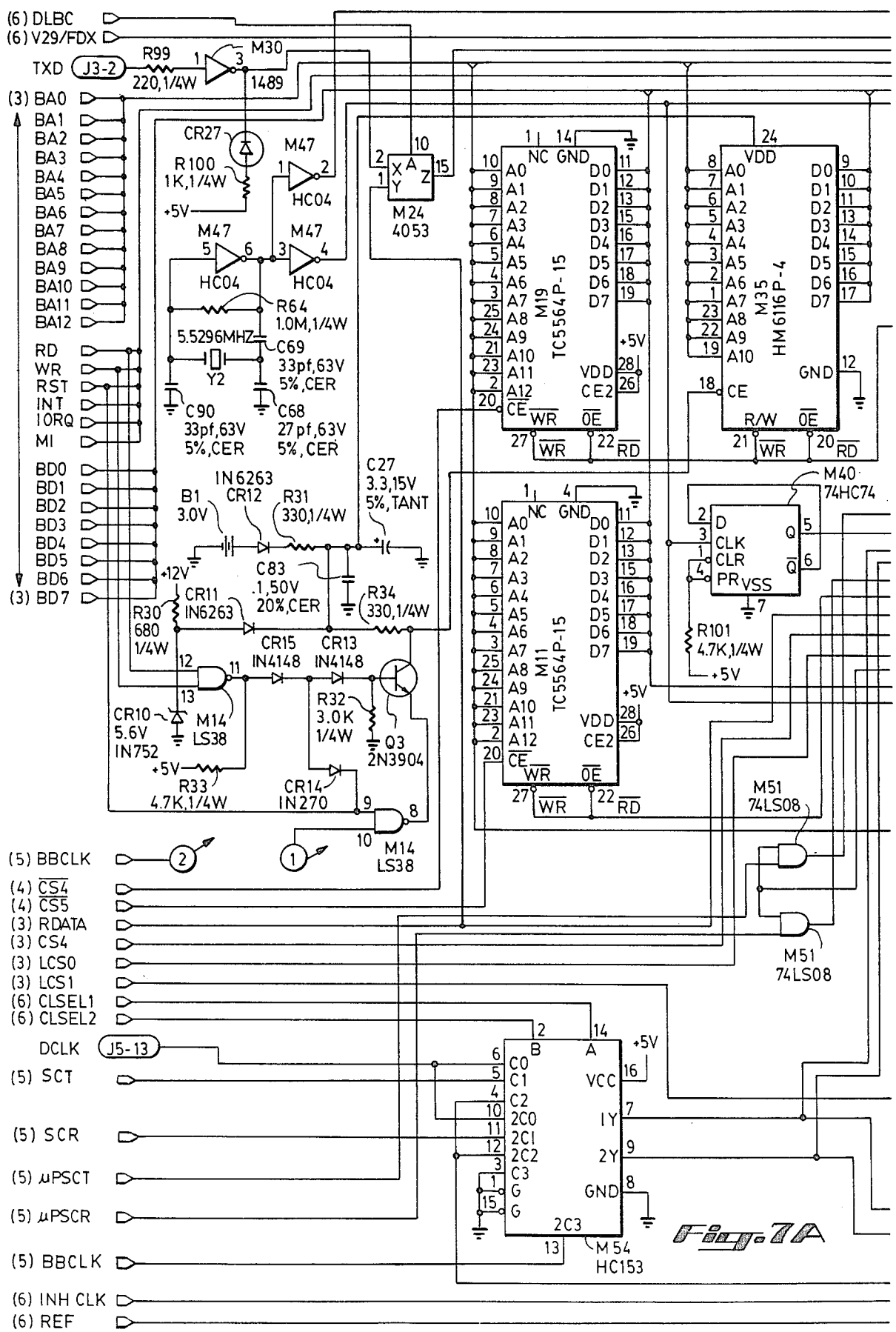
Figure 76:
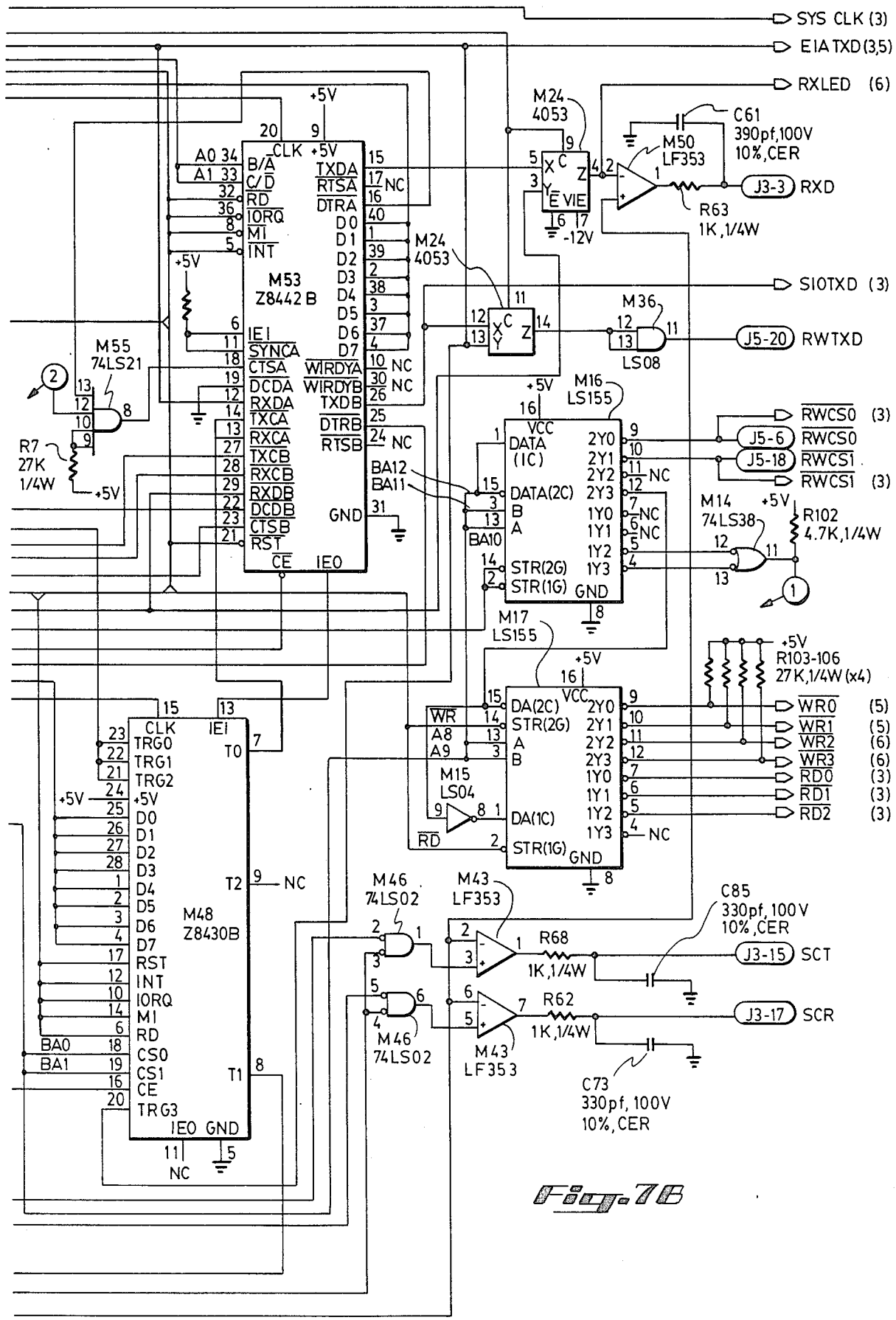
Figure 8A:
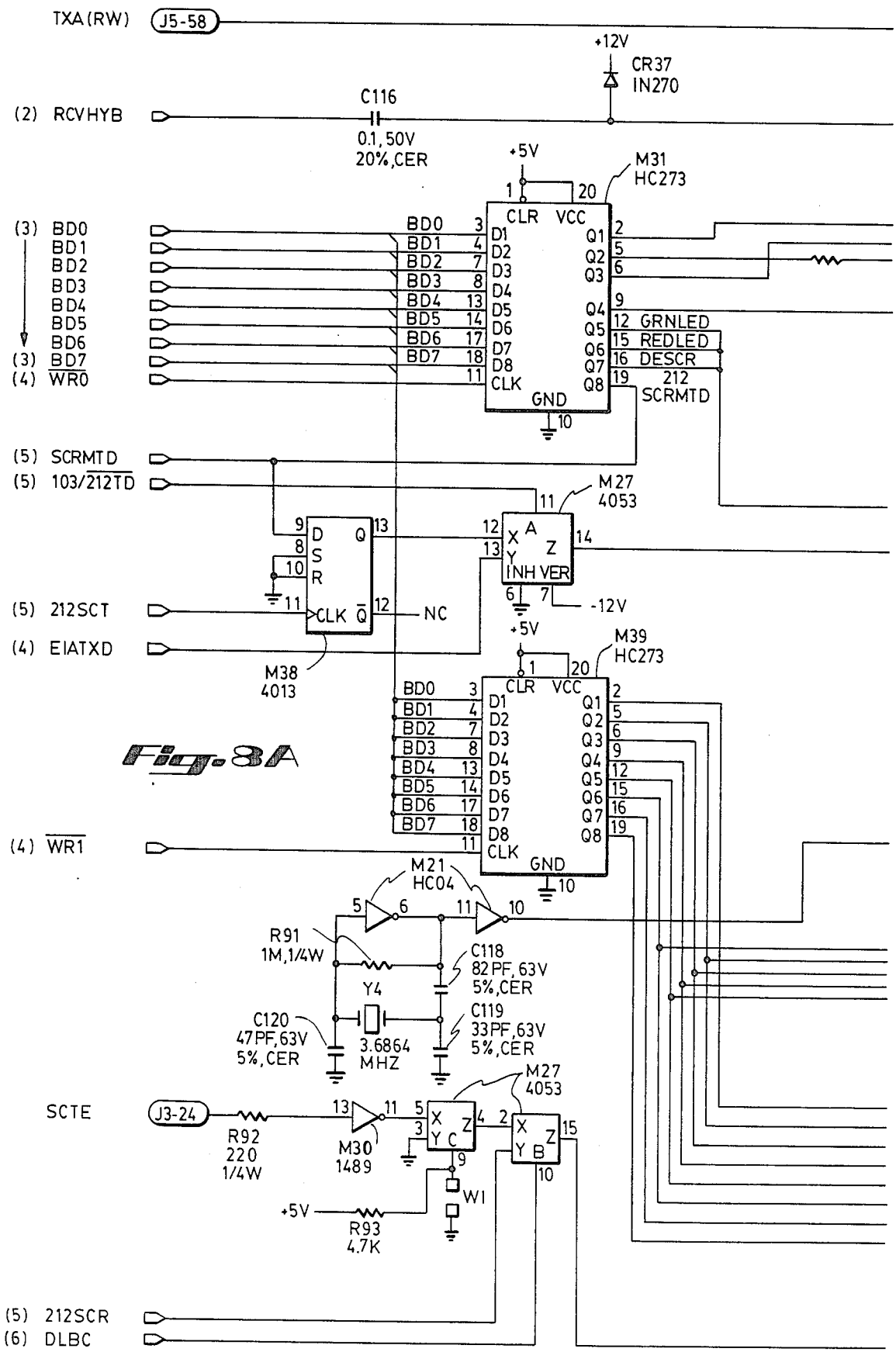
Figure 8B:
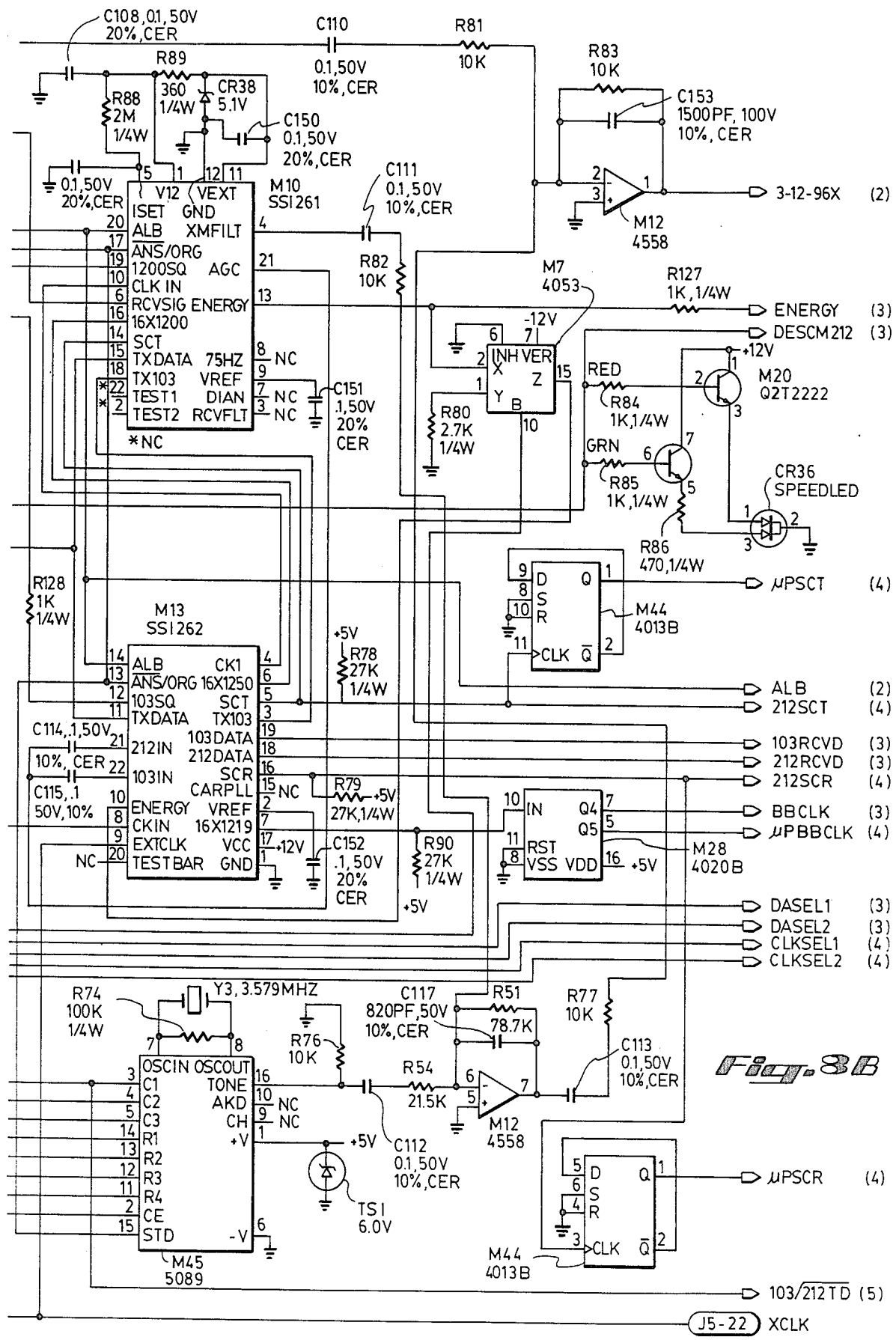
Figure 9A:
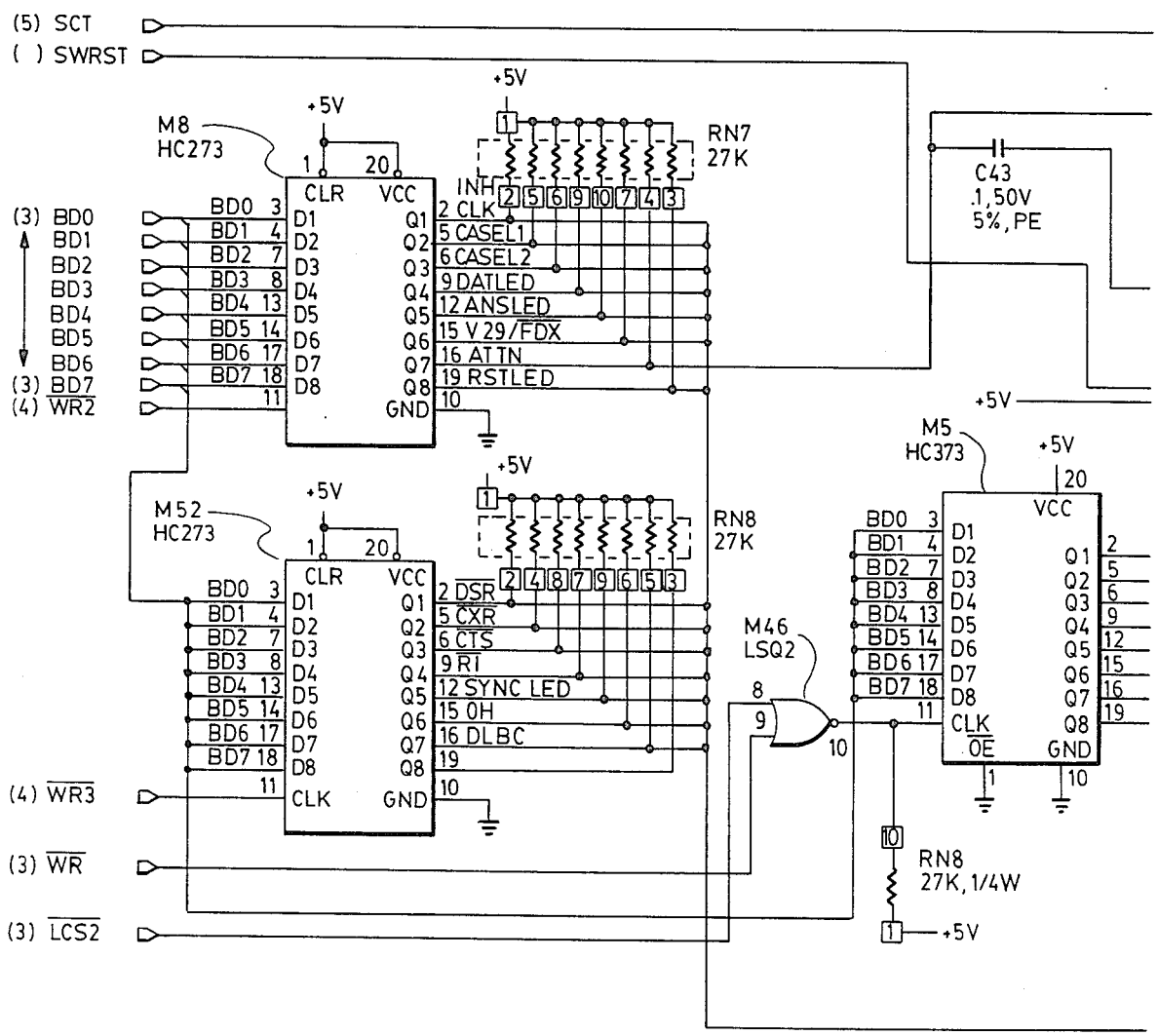

FIGS. 6-9 correspond to the diagrams of FIGS. 3 and 4 as follows:

| FIG. 6 | FIGS. 3-4 |
|---|---|
| M33 | CPU 80 |
| M18, M25, M34 | I/P Latch 86, 88, 90 |
| M23, M41, M42 | Buffer 82, 84 |
| M26 | EPROM 94 |
| M49, M22 | Address Decode 92 |
| M32 | MUX 142 |
| FIG. 7 | FIGS. 3-4 |
| M19, M11 | RAM 96, 98 |
| M35 | RAM 100 |
| M53 | Serial I/O 110 |
| M48 | Timer 160 |
| M54 | MUX 164 |
| FIG. 8 | FIGS. 3-4 |
| M10, M13 | XMTR/RECR 116 |
| M45 | DTMF Gen. 122 |
| M31, M39 | O/P Latch 120, 124 |
| M12 | Amp 126, 128 |
| FIG. 9 | FIGS. 3-4 |
| M5 | O/P Latch 134 |
| M8, M52 | O/P Latch 132 |
| M29, M37 | EIA Drivers 130 |

The following table lists the components used in the circuitry of FIGS. 6-9:

| Part Description | Ref. Designation |
|---|---|
| IC,4013B,CMOS DUAL D-FF | M38 |
| | M44 |
| IC,4020B,CHOS 14 STG BIN CNTR | M9 |
| | M28 |
| IC,74LSO4N,TTL HEX INVERTER | M15 |
| IC,74LS138N,TTL DECODER/DEMUX | M22 |
| | M49 |
| IC,74LS02N,TTL GUAD 2-INP NOR | M46 |
| IC,74LS08N,TTL QUAD 2-INP AND | M36 |
| | M51 |
| IC,5089,DTMF TONE GENERATOR | M45 |
| IC,6116P,CMOS 2K × 8 RAM | M35 |
| IC,74LS21N,TTL DUAL 4-INP 6.8V, M55 | |
| IC,74HCO4N,CMOS HEX INVERTER | M21 |
| | M47 |
| IC,74HC244N,CMOS OCTAL BUFFER | M18 |
| | M23 |
| | M25 |
| | M34 |
| | M41 |
| IC, 74HC245 BUFFER | M42 |
| IC,74HC74N,CMOS DUAL D-FF | M40 |
| IC,74HC373N,CMOS OCTAL D LATCH | M5 |
| IC,74HC273P,CMOS OCTAL D-FF | M8 |
| | M31 |
| | M39 |
| | M52 |
| IC,TC5564P-1,CMOS RAM 8K × 0 | M11 |
| | M19 |
| IC,74HC153 DUAL 4-INPUT MULTIPLEXER | M32 |
| | M54 |
| IC,Z80B SERIAL I/O | M53 |
| IC,CTC,Z80B COUNTER TIMER CKT | M48 |
| IC,Z80B,CPU | M33 |
| IC,74LS38N,TTL 2-INP NAND BFR | M14 |
| IC,74LS155,TTL DECODER/DEMUX | M16 |
| | M17 |
| IC,4558,DUAL AMPL NPN & PNP IN | M2 |
| | M4 |
| | M12 |
| | M29 |
| | M37 |
| IC,1489P,QUAD LINE RECVR | M30 |
| IC,4053B,CMOS 2 CHAN MUX/DEMUX | M7 |
| | M24 |
| | M27 |
| IC,393N,VOLTAGE COMPARATOR | M6 |
| IC, DUAL JFET OP AMP, 353N | M43 |
| IC,SSI262,212A CHIP | M50 |
| | M13 |
| IC,SSI261,212A CHIP | M10 |
| DIODE, SILICON, GP 1N4148 | CR3 |
| | CR8 |
| | CR9 |
| | CR13 |
| | CR15 |
| | CR39 |
| DIODE, SILICON, SCHOTTKY, 1N6263 | CR11 |
| | CR12 |
| LED, HIGH EFFICIENCY, RED | CR19 |
| | CR35 |
| LED, BI-COLOR,RED/GREEN | CR36 |
| DIODE, GER, IN270 | CR14 |
| | CR37 |
| DIODE, ZENER 5.6V 5%, 1N752A | CR10 |
| DIODE, ZENER, 5.1MW, +−5% | CR18 |
| DIODE, SI ZENER, 27V, 1N5254 | CR1 |
| | CR2 |
| DIODE, SILICON ZENER, 6.2V, 1N4735 | CR6- |
| | CR7 |
| DIODE, SILICON ZENER, 6.8V. 1W, 5% | CR17 |
| RECT, SILICON, 1N4005 | CR16 |
| XSTR, NPN, 2N3904 | Q2-Q3 |
| XSTR,ARRAY, QUAD N-P-N SILICON | M20 |
| PXSTR, OPTO-ISOLATOR, 4N35 | M1 |
| RELAY, ELECTROMECHANICAL | K1 |
| FERRIT BEAD,A.138,B2.75,C.35 | FB1 |
| XTAL, QTZ, 3.686400 HNZ | Y4 |
| XTAL, QTZ, 5.5296 MHZ | Y2 |
| RES, CARD, 1.0K, 1/40, 5% | Y3 |
| | R40 |
| | R46 |
| | R59-R60 |
| | R62-R63 |
| | R68 |
| | R84-R85 |
| | R94-R98 |
| | R100 |
| | R107 |
| | R120 |
| | R126-R128 |
| | R132 |
| RES, CARB, 100K, ¼W, 5% | R6 |
| | R9 |
| | R42 |
| | R74 |
| RES, CARB, 1.0 M, ¼W, 5% | R56 |
| | R64 |
| | R91 |
| RES, CARB, 1.2K, ¼W, 5% | R44 |
| RES, CARB, 200K, ¼W, 5% | R111 |
| RES, CARB, 2.0M, ¼W, 5% | R88 |
| RES, CARB, 20.M, ¼W, 5% | R8 |
| RES, CARB, 220., ¼W, 5% | R57 |
| | R73 |
| | R92 |
| | R99 |
| RES, CARB. 2.4K, ¼W, 5% | R23 |
| RES, CARB, 2.7K, ¼W, 5% | R31 |
| | R80 |
| RES, CARB, 27K, ¼W, 5% | R7 |
| | R35 |
| | R66 |
| | R72 |
| | R78 |
| | R79 |
| | R90 |
| | R103 |
| | R106 |
| | R121 |
| | R129 |
| | R130 |

-continued

| Part Description | Ref. Designation |
|---|---|
| RES, CARB, 3.0K, ¼W, 5% | R45 |
| | R58 |
| RES, CARB, 300K, ¼W, 5% | R110 |
| | R112 |
| RES, CARB, 2.0K, ¼W, 5% | R32 |
| | R34 |
| RES, CARB, 360, ¼W, 5% | R89 |
| RES, CARB, 470, ¼W, 5% | R86 |
| | R87 |
| RES, CARB, 4.7K, ¼W, 5% | R33 |
| | R65 |
| | R69 |
| | R71 |
| | R93 |
| | R101 |
| | R102 |
| | R131 |
| | R108 |
| RES, CARB, 560., ¼W 5% | R41 |
| RES, CARB, 680., ¼W, 5% | R30 |
| RES, CARB, 2.0K, ¼W, 5% | R38 |
| | R39 |
| RES, CARB, 5.6K, ¼W, 5% | R3 |
| RES, FILM, 383.0, ⅛W, 1%, TC-K | R17 |
| RES, FILM, 392.0, ⅛W, 1%, TC-K | R18 |
| RES, FILM, 976.0, ⅛W, 1%, TC-K | R19 |
| RES, FILM, 1.21K, ⅛W, 1%, TC-K | R115 |
| RES, FILM, 1.69K, ⅛W, 1%, TC-K | R122 |
| RES, FILM, 2.00K, ⅛W, 1%. TC-K | R16 |
| RES, FILM, 3.32K, ⅛W, 1%, TC-K | R28 |
| RES, FILM, 3.65K, ⅛W, 1%, TC-K | R119 |
| RES, FILM, 5.90K, ⅛W, 1%, TC-K | R11 |
| RES, FILM, 8.66K, ⅛W, 1%, TC-K | R12 |
| | R81 |
| RES, FILM, 8.87K, ⅛W, 1%, TC-K | R25 |
| | R26 |
| RES, FILM, 9.31K, ⅛W, 1%, TC-K | R118 |
| RES, FILM, 10.0K, ⅛W, 1%, TC-K | R24 |
| | R76 |
| | R77 |
| | R83 |
| RES, FILM, 17.4K, ⅛W, 1%, TC-K | R13 |
| RES, FILM, 21.5K, ⅛W, 1%, TC-K | R54 |
| RES, FILM, 33.2K, ⅛W, 1%, TC-K | R125 |
| RES, FILM, 42.2K, ⅛W, 1%, TC-K | R123 |
| RES, FILM, 78.7K, ⅛W, 1%, TC-K | R51 |
| RES, FILM, 100.K, ⅛W, 1%, TC-K | R113 |
| | R114 |
| | R116 |
| | R117 |
| RES, FILM, 210.K, ⅛W, 1%, TC-K | R124 |
| RES, FILM, 301.K, ⅛W, 1%, TC-K | R15 |
| RES, FILM, 464.K, ⅛W, 1%, TC-K | R14 |
| RES NET, SIP, 27KX9 | RN3 |
| | RN10 |
| RES. NET, 1K, ⅛W X9 | RN2 |
| RES. NET, DIGITAL SYS REESET CKT. | RN1 |
| CAP., MYLAR .1UF, 50V, 5% | C5 |
| | C25 |
| | C43 |
| CAP, POLYEST, RDL., .22MF, 100V, 5% | C6 |
| | C32 |
| CAP, POLYEST, RDL., 033UF, 250V, 5% | C9 |
| | C18 |
| CAP, POLYEST, RDL., .01UF, UF, 250V, 5% | C7 |
| CAP, MYLAR, .47UF, 250V, 10% | C1 |
| CAP, MYLAR, .47UF, 63V, 10% | C103 |
| CAP, CER, .1UF 50V, 10% | C111 |
| | C116 |
| CAP, CER, .1UF, 50V, 20% | C34 |
| | C83 |
| | C108 |
| | C109 |
| | C150 |
| | C152 |
| | C201 |
| | C240 |
| | C244 |
| | C261 |
| | C116 |

-continued

| Part Description | Ref. Designation |
|---|---|
| CAP, CER, 27PF, 63V, 5% | C68 |
| CAP, CER, 33PF, 63V, 5% | C69 |
| | C90 |
| | C119 |
| CAP, CER, 47PF, 63V, 5% | C120 |
| CAP, CER, 82PF, 63V, 5% | C118 |
| CAP, CER, .01UF, 50V, 10% | C104 |
| | C105 |
| CAP, CER, .1UF, 50V, 10% X7R | C110 |
| CAP, TANT, 3.3UF, UF, 15V, 5% | C27 |
| CAP, ELO, 100UF, 16V, 20% | C30 |
| | C38 |
| CAP, ELO, 25V, 20UF, +75%, −10% | C23 |
| | C24 |
| CAP, CER, 220PF, 100V 10% | C106 |
| CAP, CER, 390PF, 100V, 10% | C61 |
| | C73 |
| | C85 |
| CAP, CER, 330PF, 100V, 10% | C117 |
| CAP, CER, 1000PF, 100V, 10% | C26 |
| CAP, CER, NPO, 100PF, 100V, 5% | c107 |
| DIODE, ZENER, 5.1V, 1W, 5% | CR38 |
| CONN, SOCKET, 5 POS, DIN | P1 |
| CONN, HEADER, 4 PIN | P2 |
| XFMR, SWITCHED NTWK, 600-600 OHM | T1 |
| SUPPRESSOR, TRANSIENT, 6V + −10% | TS1 |
| CAP, CER, 1500PF, 100V, 10% | C153 |
| RES, CARB, 10K, ¼W, 5% | R133 |
| RES, FILM, 82.5K, ⅛W, 1% | R82 |

Figure 10:
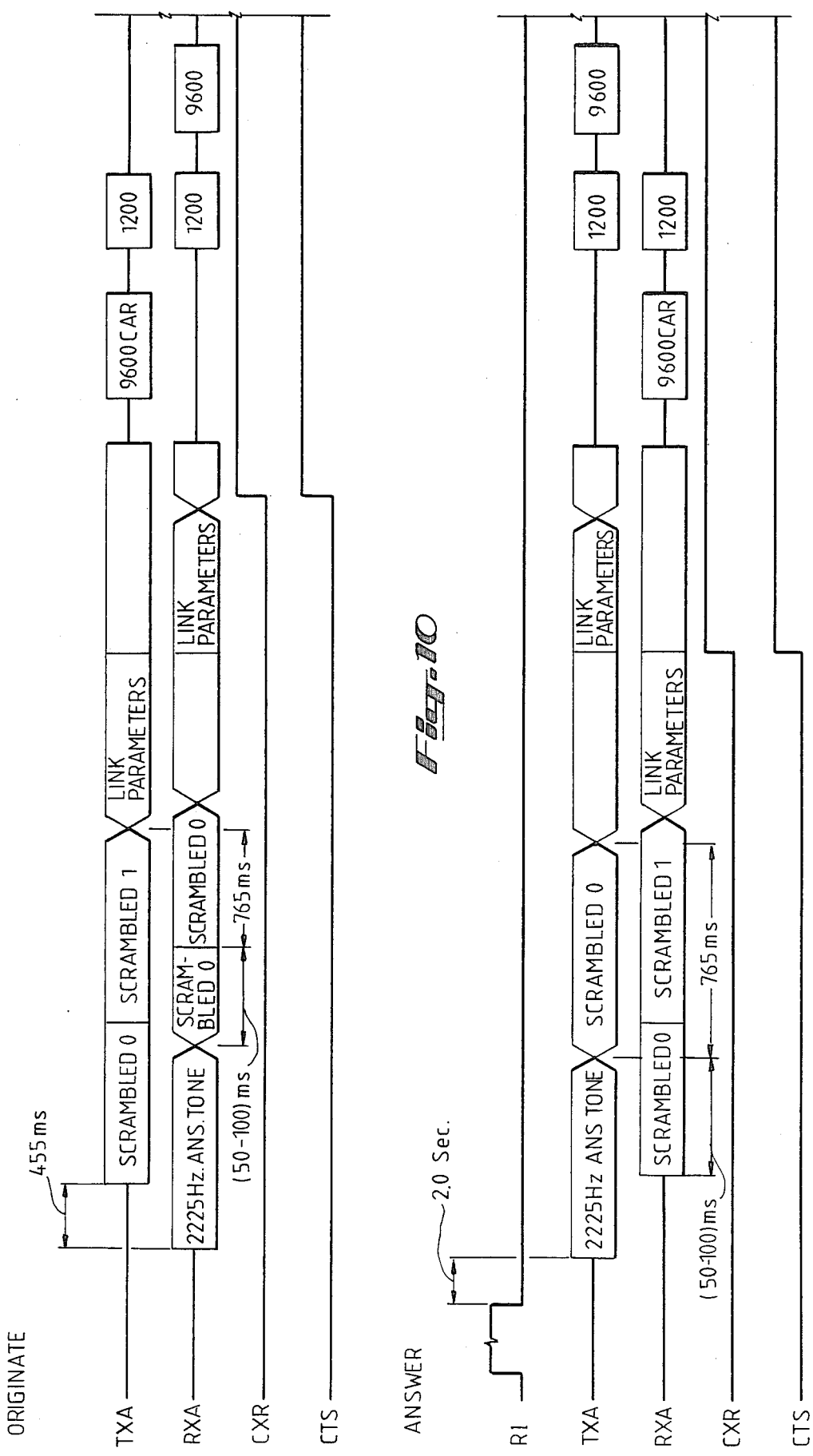
FIG. 10 is a diagram illustrating the connect sequence for the modem of FIGS. 1-4.

Referring to FIG. 10, there is presented a diagram illustrating the connect sequence for the modem of FIGS. 1-4 and 5-9. The diagram illustrates the transmitted and received signals for both an originate modem and an answer modem. When the originating modem initiates a call, the remote central office sends a ring signal to the answer modem which is detected on the ring indicator RI line. The answer modem goes off-hook and transmits an answer tone of 2225 Hz. This tone is received by the originate modem and after 455 milliseconds, the originate modem begins sending a carrier modified by logic 0 data, referred to as scrambled zeros for 100 milliseconds followed by scrambled ones. After approximately 50 to 100 milliseconds of scrambled zeros being received, the answer modem identifies that the originating modem is compatible and transmits scrambled zeros back to the originate modem. The originate modem then identifies that the answer modem is compatible.

The modems then exchange link parameters for error control. The originate modem first sends approximately 23 bytes of link parameter information. The answer modem receives the link parameters and if any parameters need to be changed, it sends update link parameters to the originate modem. After the update link parameters are exchanged, the CXR and CTS lines are turned on at both modems.

When enough data accumulates in the transmit data buffer at either end to go high speed, the modems exchange control frames. Both modems then go into a squelch for a period of time, and the transmitter of the corresponding modem begins sending data at 9600 bps. At the end of data transmission, the modems squelch and 1200 bps, full-duplex transmission is resumed and acknowledgments sent for frames received. The speed is maintained until it is time for either modem to transmit data to the other modem at higher speed. At that time, both modems squelch, and thereafter the operation continues as described above. Data transmission proceeds as required by the data transmission demands of the data terminals for the modems.

Figure 11:
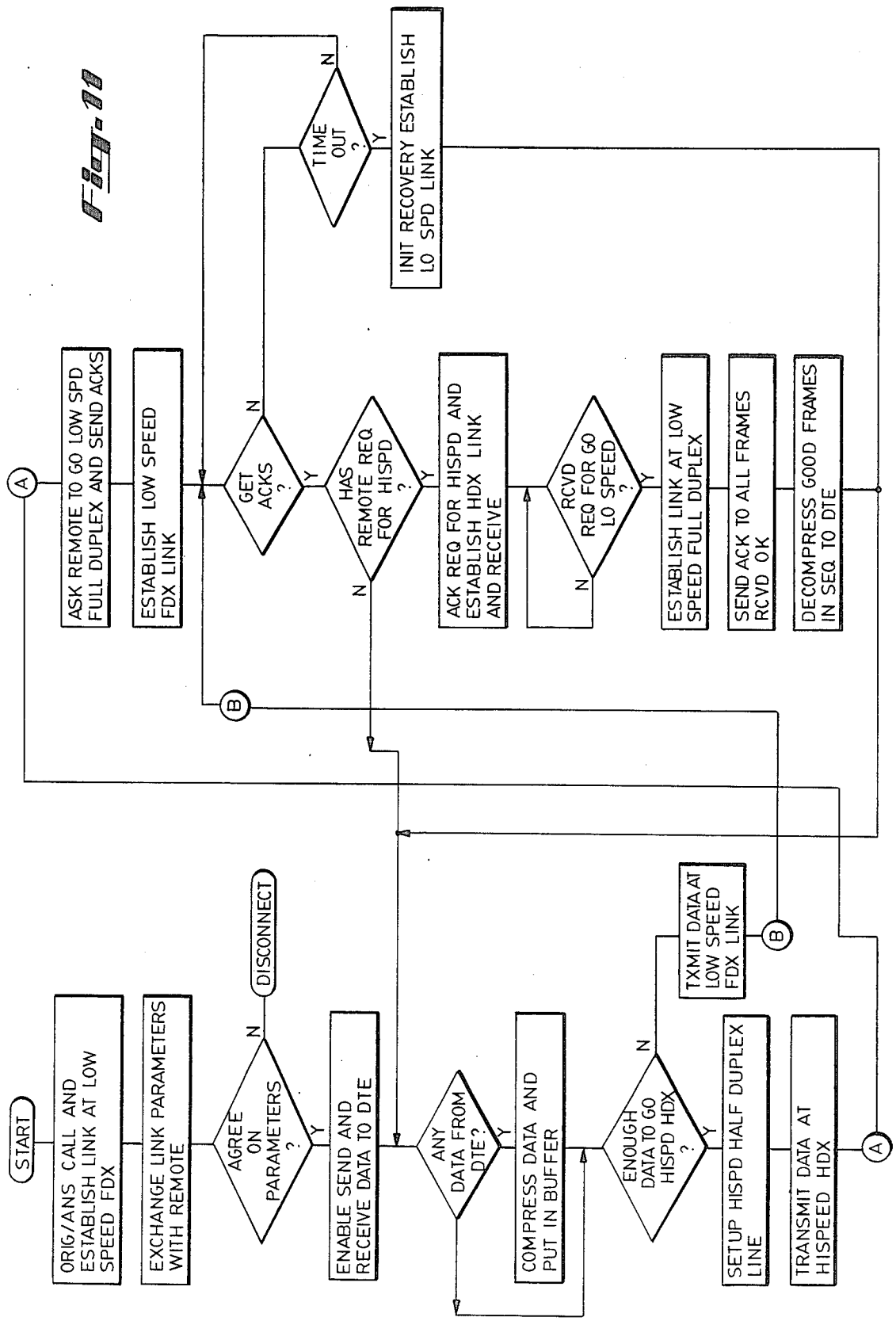
FIG. 11 is a flow chart diagram of an operational sequence of the modem of FIGS. 1-4 involving lower-speed, full-duplex linking of the modem and subsequent higher-speed, half-duplex data transmission.

Referring next to FIG. 11 there is a flowchart of the data transmission routine followed by the modem operating as an originate modem. At the start of operation, the modem performs the originate/answer connect sequence by calling and establishing a link with the answer modem in a lower-speed, full-duplex mode. There follows an exchange of link parameters with the remote answer modem and confirmation of agreement on the parameters. The modem then enables the sending and receiving of data to the data terminal equipment. If the link parameters do not agree, the modem disconnects.

When the sending and receiving of data begins, a check is made for data from the data terminal. If data is being received from the data terminal, it is compressed and put into the transmit data buffer. A check is made to see whether there is enough data to go higher-speed, half-duplex. If so, the modem sets up the higher-speed, half-duplex link and data is transmitted in that mode. If there is not enough data to go higher-speed, data is transmitted at lower-speed in the full-duplex mode.

At the the end of data transmission in the higher-speed mode, the originate modem asks the remote modem to go lower-speed, full-duplex and to send an acknowledgement. The modems establish the lower-speed, full-duplex link. The modem then checks for acknowledgment from the remote modem. If the acknowledgement does not come within a prescribed time out period, the modem initiates a recovery to establish the lower-speed link. If the acknowledgment is received, the modem determines whether the remote modem has requested higher-speed operation. If so, the originate modem acknowledges the request for higher-speed and establishes the half-duplex link and sets up in a receive mode. There continues to be monitoring for a request to go lower-speed. When the request is received, the modem establishes the lower-speed, full-duplex link and sends an acknowledgement that all data frames have been received. The received data frames are decompressed and sent to the data terminal. The originate modem then returns to check for any data from the data terminal. The diagrammed sequence continues until completion of the required data communication task.

Figure 12:
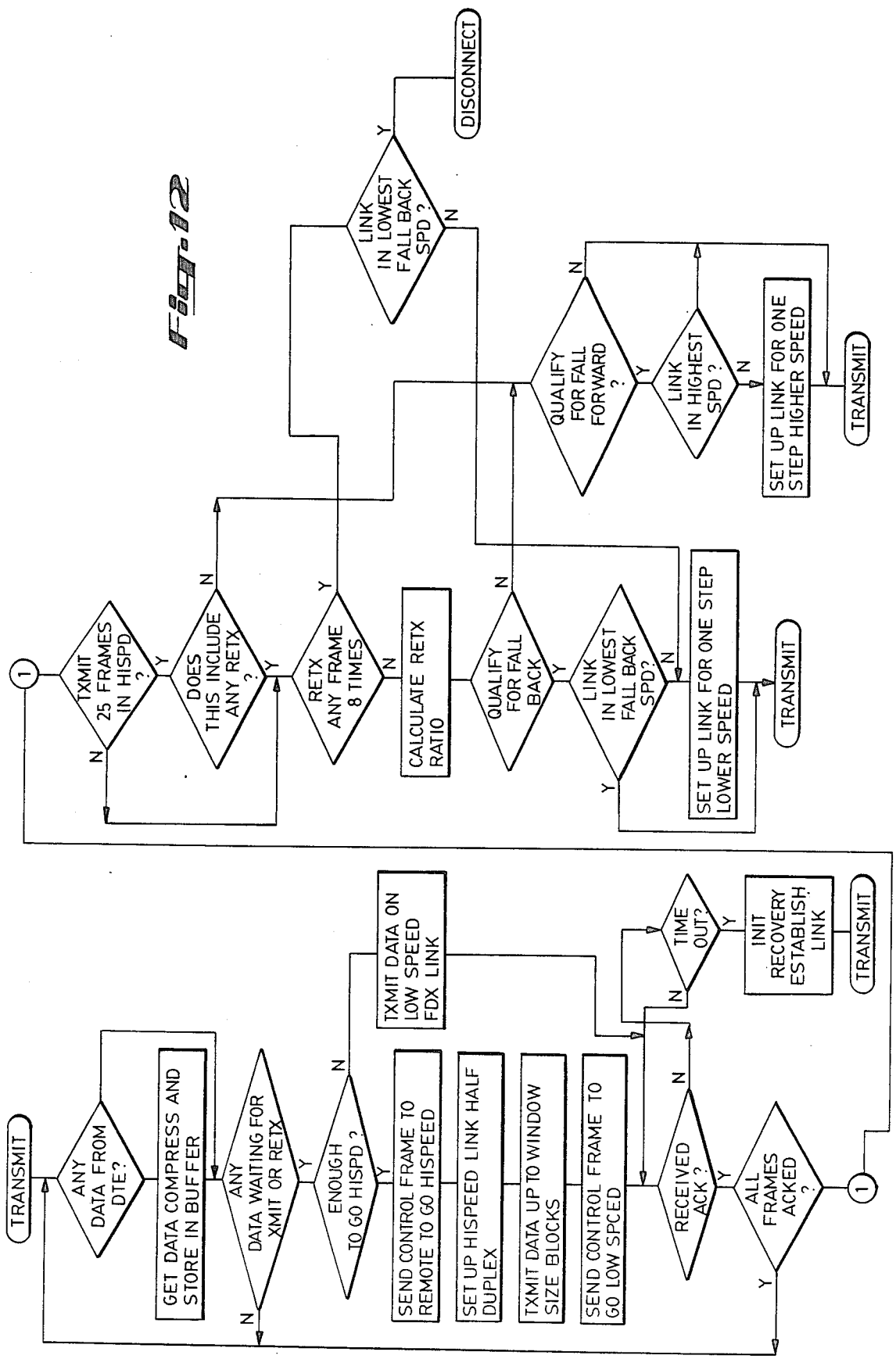
FIG. 12 a flow chart diagram of an operational sequence of the modem of FIGS. 1-4 involving data transmission that automatically changes between lower-speed, full-duplex and higher-speed operation based upon data transmission demands during a communication and the quality of the transmissions.

FIG. 12 flowcharts an operational sequence of the modem involving data communication that automatically changes between speeds of transmission based upon data transmission demand during a communication and upon the quality of the data transmissions. When the modem begins transmitting, it checks for data from the data terminal. The data for transmission is compressed and stored in the transmit data buffer. Next, there is evaluation of whether any data is waiting for retransmission. If so and there is enough to go higher-speed, the modem sends control frame information to the remote modem to go higher-speed. The higher-speed, half-duplex link is set up and transmission of data begins. At the conclusion of data transmission, a control frame is sent requesting the remote modem to go into the lower-speed mode. The modem then awaits reception of an acknowledgement. If the acknowledgement does not come within a prescribed time out period, the modem initiates recovery by establishing the link and reentering the transmit sequence. If the request to go lower-speed is acknowledged, the routine goes back to the beginning of the transmit sequence.

If there is no acknowledgement that all data frames were received properly, there is consideration of whether a predetermined number of data frames have been transmitted at higher-speed (e.g. 25 frames). If so, there is a check to determine whether the transmitted data frames included any retransmissions. If there was retransmission of any data frame for a predetermined number of times (e.g. 8 times), there is a calculation of the retransmit frame ratio. Based upon the calculated ratio, a determination is made whether the quality of the data transmission indicates qualification for a fallback in speed. If there had been retransmission of any data frame at least the predetermined number of times, and if the modem is linked in the lowest fallback speed, then the modem disconnects. If the link is not in the lowest fallback speed, the modem sets up the link for one step lower in speed and reenters the transmit sequence.

If the evaluation to determine whether a predetermined number of preceding transmitted frames included any retransmitted data indicates that none were retransmitted frames, the routine makes an evaluation for qualification to fallforward to a higher speed. If the qualification is not met, the transmit sequence is reentered at the same speed. But if the data transmission quality qualifies for a fallforward in speed, and the link is not already in the highest speed, the modem sets up the link for a one step higher speed of transmission.

The routine in FIG. 12 illustrates the ability of the modem to adapt its speed to the quality of the telephone line. As indicated, the modem can either fallback to a lower speed or fallforward to a higher speed. In general, to determine the quality of the line, the processor of the modem constantly monitors the number of errors in data transmission as reflected by the number of retransmitted data frames. If the number of retransmissions is high, indicating too many errors are encountered and line quality is poor, the modem drops down to the next lower speed until an acceptable reduction in errors in transmission is achieved. If the line quality improves and the number of errors is reduced, the modem will automatically fallforward to the next higher speed.

FIG. 13 provides a listing of the program ROM contents for the modem implementation of FIGS. 5-9. This program includes the routines diagrammed in FIGS. 10-12 as well as other operations for the modem described above in FIGS. 5-9.

The foregoing description of the present invention has been directed to particularly preferred embodiments for purposes of explanation and illustration. It will be apparent, however, to those skilled in this art that modifications and changes may be made in the apparatus and operation described without departing from the scope of the invention.

What is claimed is:

1. Apparatus for communication of data over a telephone line, comprising:
   a transmit data buffer for accepting digital data;
   a transmitter receiving data from the transmit data buffer, for placing a transmit signal on the telephone line;
   said transmitter being selectively operable in either a lower-speed, full-duplex mode or a higher-speed, half duplex mode in response to a mode control command; and
   a control circuit coupled to the transmitter to provide the mode control command;

the control circuit providing a mode control command to the transmitter to select the lower-speed, full-duplex mode during a handshake sequence, and for thereafter monitoring the transmit data buffer and providing a mode control command to the transmitter to select the higher-speed, half-duplex mode when there is a predetermined amount of data in the buffer for transmission and providing a mode control command to select the lower-speed, full-duplex mode when there is less than the predetermined amount of data in the buffer for transmission.

2. Apparatus for communication of data over a telephone line to a remote data receiver, comprising:
- a transmit data buffer for holding data;
- a transmitter receiving data from the transmit data buffer, for placing a transmit signal on a telephone line to communicate date and control frames;
- said transmitter being selectively operable in either a lower-speed, full-duplex mode or a higher-speed, half-duplex mode in response to a control command; and
- a control circuit coupled to the transmitter, for providing a control frame to be sent by the transmitter to the remote data receiver to signal higher-speed operation and producing the control command to the transmitter to select the higher-speed, half-duplex mode based upon the amount of data in the transmit data buffer.

3. The mode of claim 2 wherein said control circuit further provides a control frame to be sent by the transmitter to the remote data receiver to signal lower-speed operation and producing the control command to the transmitter to select the lower-speed, full-duplex mode.

4. Apparatus for communication of data over a telephone line between a local data terminal and a remote modem, comprising:
- a transmitter for accepting data and control frame information and placing a transmit signal on a telephone line;
- said transmitter being selectively operable in either a lower-speed, full-duplex mode or a higher-speed, half-duplex mode in response to a mode control command;
- a receiver for accepting a transmit signal of link control frame information from a remote modem over the telephone line and providing a receiving signal of control frame information;
- a transmit data buffer for accepting data from a local data terminal at a rate established by data transmission demand, said buffer being coupled to the transmitter;
- a control circuit coupled to the transmitter to provide control frame information and the mode control command, and coupled to the receiver to obtain the receive signal of the control frame information; and
- the control circuit for providing the mode control command to the transmitter to select the lower-speed, full-duplex mode during an exchange of control frame information with a remote modem, and for thereafter monitoring the transmit data buffer and providing a mode control command to the transmitter to select the higher-speed, half-duplex mode based upon the data transmission demand.

5. A modem for providing communication of data over a telephone line between a local data terminal and a remote modem, comprising:
- a transmitter for accepting data and control frame information and placing a transmit signal on a telephone line to the remote modem;
- said transmitter being selectively operable in either a lower-speed, full-duplex mode or a higher-speed, half-duplex mode in response to a control command;
- a receiver for accepting a transmit signal from a remote data communication unit over the telephone line in either a higher-speed, half-duplex mode or a lower-speed, full-duplex mode in response to a mode control command and providing a receive signal;
- a transmit data buffer for accepting data from a local data terminal;
- a processor coupled to the transmitter and the receiver and providing mode control commands thereto;
- the processor controlling transmitter and receiver operation during a connect sequence with a remote modem to effect an exchange of control frame information therebetween and thereafter controlling transmitter and receiver operation to effect data communication with the remote modem based upon the data transmission demands by monitoring the data going to the transmit data buffer and providing a mode control command to the transmitter to select the higher-speed, half-duplex mode upon determining a predetermined number of characters in the buffer for communication and providing a mode control command to the transmitter to select the lower-speed, full-duplex mode upon determining that insufficient data is in the buffer to require higher-speed operation.

6. The modem of claim 5 wherein the processor further monitors the receive signal to determine a request by the remote modem for higher-speed operation and provides a control command to the receiver to accept the remote modem transmit signal in a higher-speed, half-duplex mode.

7. The modem of claim 5 wherein the processor further monitors the receive signal to determine a request by the remote modem for lower-speed operation and provides a control command to the receiver to accept the remote modem transmit signal in a lower-speed, full-duplex mode.

8. Apparatus for communication of data over a telephone line, comprising:
- a receiver for accepting a transmit signal of data or control frame information over the telephone line and providing a receive signal;
- said receiver being selectively operable to accept a transmit signal in either a higher-speed, half-duplex mode or a lower-speed, full-duplex mode in response to a mode control command; and
- a control circuit coupled to the receiver to obtain the receive signal of control frame information,
- said control circuit for providing the mode control command to the receiver to select the lower-speed, full-duplex mode or the higher-speed, half-duplex mode based upon a receive signal of control frame information.

9. The apparatus of claim 8 further comprising:
- a transmitter for placing a transmit signal on a telephone line.

* * * * *